United States Patent [19]

Rozman et al.

[11] Patent Number: 5,438,614
[45] Date of Patent: Aug. 1, 1995

[54] MODEM MANAGEMENT TECHNIQUES

[75] Inventors: Christopher J. Rozman, Park Ridge; Scot W. Salzman, Vernon Hills, both of Ill.

[73] Assignee: U.S. Robotics, Inc., Skokie, Ill.

[21] Appl. No.: 249,169

[22] Filed: May 25, 1994

[51] Int. Cl.[6] .................................. H04M 11/00
[52] U.S. Cl. ........................... 379/93; 379/98
[58] Field of Search ............. 379/98, 93, 94, 96, 379/97; 375/8, 121; 340/825.06, 825.07, 825.08

[56] References Cited

U.S. PATENT DOCUMENTS

| | | | |
|---|---|---|---|
| 4,385,384 | 5/1983 | Rosbury et al. | 371/22 |
| 4,652,874 | 3/1987 | Loyer | 340/825.05 |
| 4,751,510 | 6/1988 | de Saint Michel et al. | 340/825.07 |
| 4,797,878 | 1/1989 | Armstrong | 370/96 |
| 4,879,716 | 11/1989 | McNally et al. | 371/8.2 |
| 5,063,523 | 11/1971 | Vernjak | 364/514 |
| 5,119,403 | 6/1992 | Krishnan | 375/39 |
| 5,148,435 | 9/1992 | Ray, Jr. et al. | 371/20.5 |
| 5,199,071 | 3/1993 | Abe et al. | 379/98 |
| 5,210,530 | 5/1993 | Kammerer et al. | 379/98 |
| 5,237,561 | 8/1993 | Pyhalammi | 370/29 |
| 5,237,620 | 8/1993 | Deaton et al. | 382/7 |
| 5,315,647 | 5/1994 | Araujo | 379/96 |

OTHER PUBLICATIONS

D. C. Balton, "Using the U.S. Robotics Total Control PC to Manage a Dial Modem Network", *International Journal of Network Management*, vol. 2, No. 3, pp. 125–137 (Sep. 1992).

*Primary Examiner*—Curtis Kuntz
*Assistant Examiner*—Stella L. Woo
*Attorney, Agent, or Firm*—Allegretti & Witcoff, Ltd.

[57] ABSTRACT

Apparatus and method for managing transmission of digital data between a digital telephone line and a computer network. First and second modems, a telephone control circuit and a network control circuit respond to management instruction signals to execute predetermined management objectives and generate management response signals representing one or more conditions of the first and second modems, telephone control circuit and network control circuit. In response to a single packet of management signals from the network, a management circuit generates the management instruction signals and independently addresses them to one or more of the first and second modems, telephone control circuit and network control circuit.

27 Claims, 32 Drawing Sheets

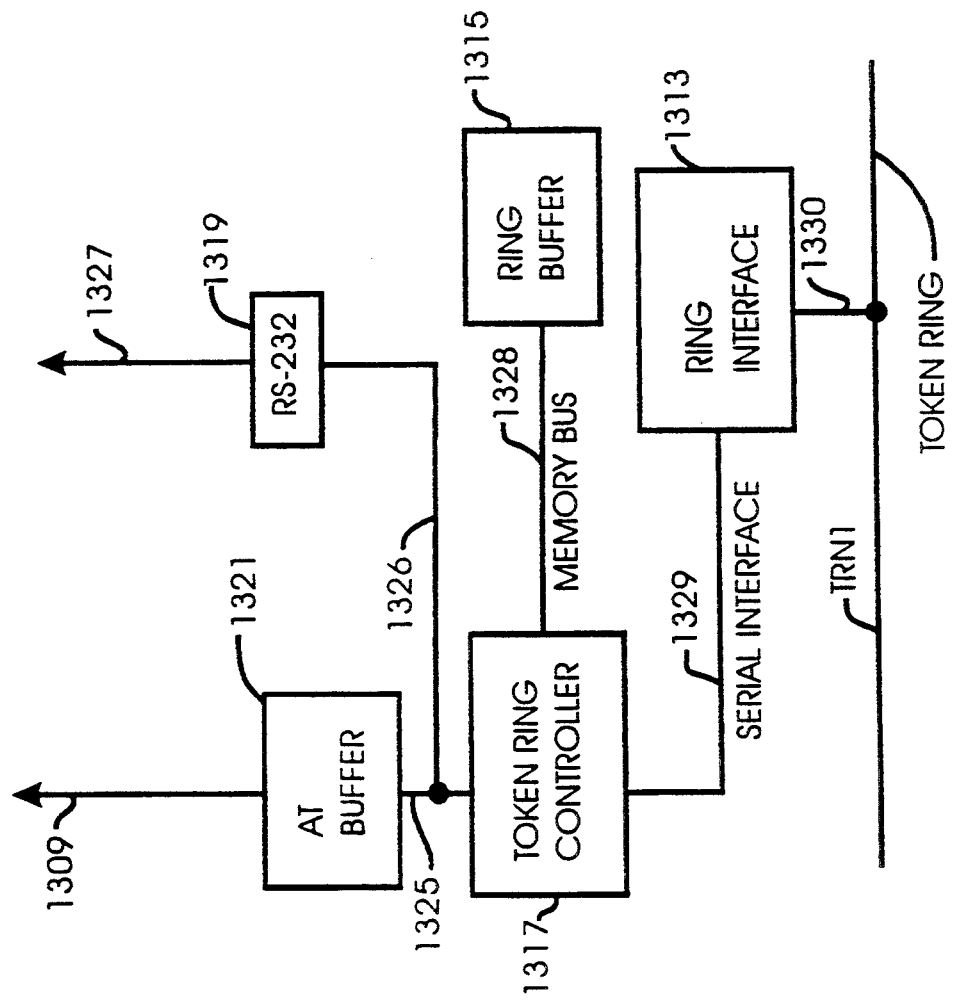

Fig. 15

| Offset | | | |
|---|---|---|---|
| +0 | SIGNATURE CCB_SIG | | |
| +4 | COMMAND CODE CCB_CMD | MODEM ID CCB_MID | FLAGS CCB_FLAGS |
| +8 | CBX ADDRESS CCB_CBX | | |
| +12 | CBX ADDRESS CCB_CBX | NEXT CBX ADDRESS CCB_CCB | |
| +16 | NEXT CBX ADDRESS CCB_CCB | | |
| +20 | DE CCB_DE | RC CCB_RC | RCS CCB_RCX |

Fig. 16

| Offset | | |
|---|---|---|
| +0 | FLAGS CBX_FLAGS | BYTE COUNT (OF DATA OR FOB) CBX_BCOUNT |
| +4 | ADDRESS OF XMIT/RECV BUFFER OR FOB CBX_BUFF_FOB | |
| +8 | CBX_BUFF_FOB | TIMER-1 CBX_TIMER1 |
| +12 | TIMER-1 CBX_TIMER1 | TIMER-2 CBX_TIMER2 |
| +16 | TIMER-2 CBX_TIMER2 | NOT USED |

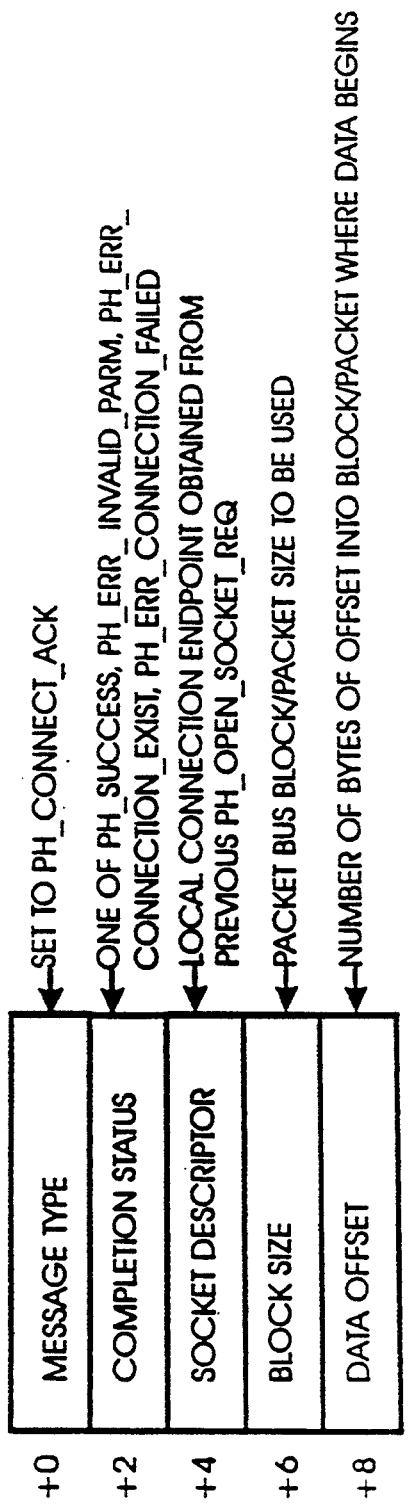
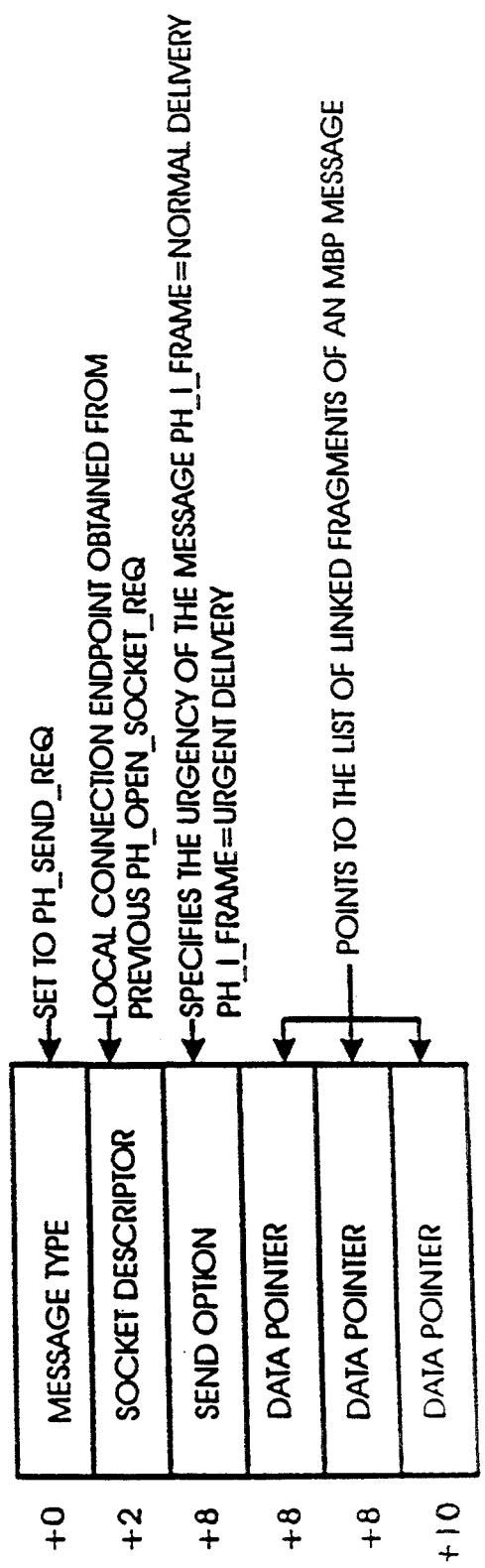

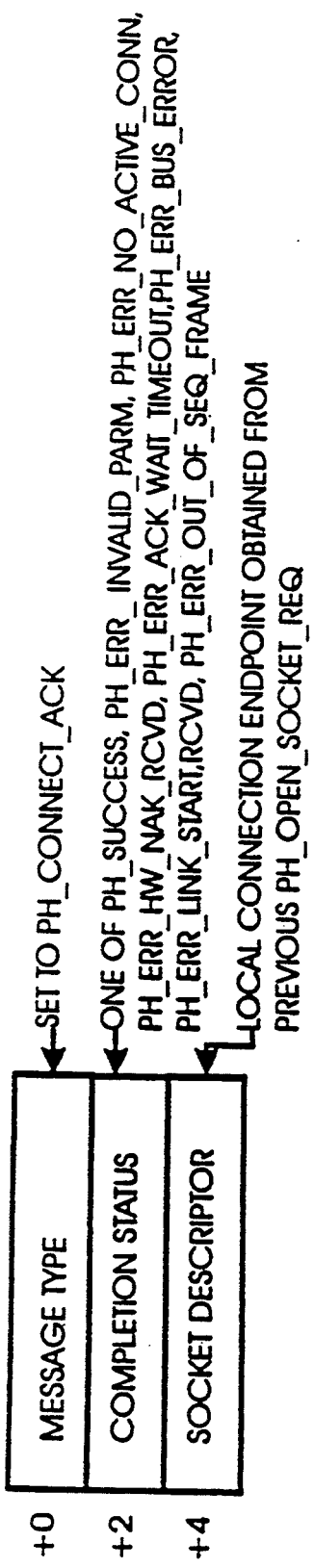
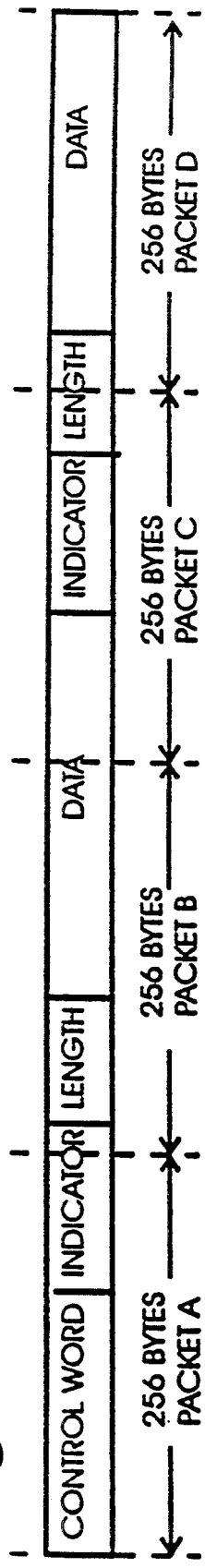
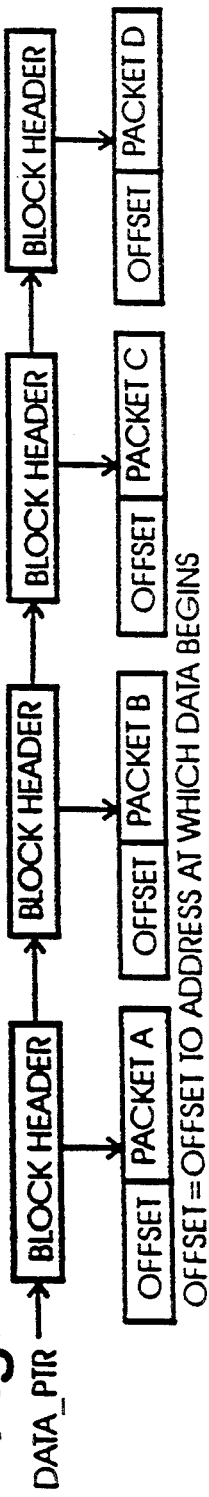

MODEM MANAGEMENT TECHNIQUES

FIELD OF THE INVENTION

This invention relates to modems for enabling data communication between multiple data signal sources over a combination of analog and digital telephone company lines, and more particularly relates to techniques for management of such modems.

DESCRIPTION OF THE PRIOR ART

In the past, multiple modems have been managed as part of a network management system employing a standard protocol, such as the simple network management protocol (SNMP). The network is managed from a network management station that addresses multiple network elements. The network elements are devices, such as host computers or terminal servers, which have management agents responsible for performing the network management functions requested by the network management stations. SNMP is used to communicate management information between the network management stations and the agents in the network elements.

In order to be controlled, a modem is connected to a network and must be addressed by the network management station through the network element. Each network element is connected to the network at a separate point. A separate address is required for each modem sought to be controlled. Since network elements are expensive, only limited control of modems has been feasible in the past.

SUMMARY OF THE INVENTION

In order to overcome the deficiencies of the prior art, a primary object of the invention is to enable a plurality of modems to be managed by connection to a single point of a local area network.

Another object of the invention is to enable individual modems to be accessed and controlled by the issuance of a single packet of network signals from a network management station connected to a local area network.

Still another object of the inventions is to parse a single network request into multiple requests and to execute the multiple requests on multiple devices.

Yet another object of the invention is to improve the efficiency and ease with which multiple modems can be managed and controlled from a local area network.

The present invention has been found useful in a system comprising a digital telephone line carrying a digital first telephone signal resulting from modulation by a first analog modem of a first digital computer signal representing digital first data from a digital first computer. The telephone line also carries a digital second telephone signal resulting from modulation by a second analog modem of a second digital computer signal representing digital second data from a digital second computer. The system includes a network which transmits a digital first network signal representing digital third data from a digital third computer and which transmits a digital second network signal representing digital fourth data from a digital fourth computer. The network also transmits digital network management signals adapted for use by a management station executing a predetermined management application using a first management protocol. In such a system, one aspect of the invention provides improved apparatus for managing transmission of the digital data between the digital telephone line and the network.

The apparatus comprises a first modem responsive to the first network signal for modulating signals representing the third data and responsive to the first telephone signal for demodulating signals representing the first data so that the first data and third data are communicated between the first and third computers. The first modem also is responsive to management instruction signals for executing predetermined management objectives and for generating management response signals representing one or more conditions of the first modem.

The apparatus further comprises a second modem responsive to the second network signal for modulating signals representing the fourth data and responsive to the second telephone signal for demodulating signals representing the second data so that the second data and fourth data are communicated between the second and fourth computers. The second modem also is responsive to management instruction signals for executing predetermined management objectives and for generating management response signals representing one or more conditions of the second modem.

The apparatus also comprises telephone control means for transmitting the first, second, third and fourth digital telephone signals between the telephone line and the first and second modem means, responsive to management instruction signals for executing predetermined management objectives and for generating management response signals representing one or more conditions of the telephone control means.

The apparatus also comprises network control means for transmitting the first, second, third and fourth network signals between the first and second modem means and the network, responsive to management instruction signals for executing predetermined management objectives and for generating management response signals representing one or more conditions of the network control means.

The apparatus also comprises management means responsive to the network management signals for generating the management instruction signals, for independently addressing the management instruction signals to one or more of the first modem means, second modem means, telephone control means and network control means, for converting the management response signals to the network management signals, and for transmitting the network management signals to the management station, whereby the management station can manage the first and second modem means, the telephone control means and the network control means in real time while the first and second modem means enable bilateral communication among the first, second, third and fourth computers.

According to a method aspect of the invention, in a system of the above-described type, the management of first and second modem means is improved by the steps of:

modulating signals representing the third data and demodulating signals representing the first data in the first modem means so that the first data and the third data are communicated between the first and third computers;

executing predetermined management objectives directed to the first modem means in response to management instruction signals;

generating first management response signals representing one or more conditions of the first modem means;

generating first digital network management signals in response to the first management response signals;

transmitting the first digital network management signals over the network means;

modulating signals representing the fourth data and demodulating signals representing the second data in the second modem means so that the second data and the fourth data are communicated between the second and fourth computers;

executing predetermined management objectives directed to the second modem means in response to management instruction signals;

generating second management response signals representing one or more conditions of the second modem means;

generating second digital network management signals in response to the second management response signals;

transmitting the second digital network management signals over said network means;

generating the management instruction signals according to a second management protocol different from the first management protocol in response to the network management signals;

transmitting the management instruction signals to the first and second modem means while the steps of modulating and demodulating are being carried out; and processing the management response signals while the steps of modulating and demodulating are being carried out, whereby the first and second modem means are managed while data communication between the first and third computers and between the second and fourth computers is enabled.

By using the foregoing techniques, computers linked by telephone lines and networks can be managed with a degree of control and speed unattainable by prior techniques.

BRIEF DESCRIPTION OF THE DRAWINGS

These and other objects, advantages and features of the invention will appear for purpose of illustration, but not of limitation, in connection with FIGS. 1–28, wherein like numbers refer to like parts throughout and in which:

FIG. 9G is a schematic block diagram of a preferred form of the management token ring interface card shown in FIG. 2;

FIG. 15 is a schematic diagram of a preferred form of command control block used by the programs illustrated in FIG. 14;

FIG. 16 is a schematic diagram of a preferred form of command block extension used by the programs illustrated in FIG. 14;

FIG. 20 is a schematic diagram of a preferred form of message type PH Connect_Ack used by the programs illustrated in FIG. 14;

FIG. 21 is a schematic diagram of a preferred form of message type PH Send_Req used by the programs illustrated in FIG. 14;

FIG. 22 is a schematic diagram of a preferred form of message type PH Send_Ack used by the programs illustrated in FIG. 14;

FIG. 23 is a schematic diagram of a preferred form of PAP message used by the programs illustrated in FIG. 14;

FIG. 24 is a flow diagram illustrating a preferred method of linking PAP fragments according to the programs illustrated in FIG. 14;

DETAILED DESCRIPTION OF THE PREFERRED EMBODIMENT

Figure 1:
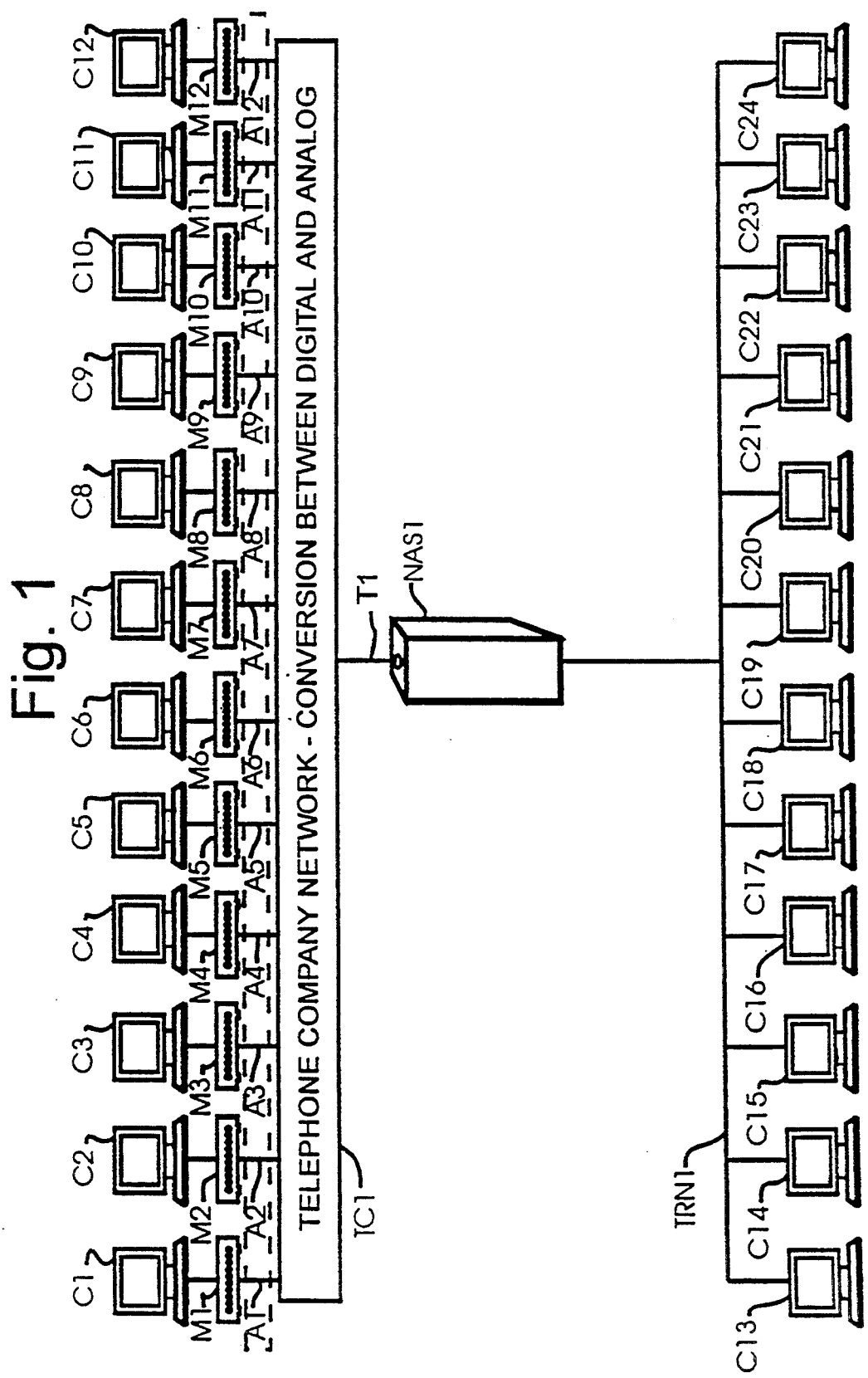
FIG. 1 is a block diagram of a preferred form of network access server made in accordance with the present invention enabling management of a plurality of modems that facilitate computers to communicate over telephone company networks, including both analog and digital telephone lines.

Referring to FIG. 1, a preferred form of the present invention is shown as network access sewer NAS1. The invention may be used in connection with computers C1-C12, modems M1-M12, multiplexed telephone company line T1 and telephone company networks TC1. Computer C24 serves as a host computer that serves network TRN1.

Digital computers C1-C12 communicate with a telephone company network TC1 via conventional modems M1-M12, respectively. Each of computers C1-C12 is a separate source of digital data signals representing digital data. In a well known manner, modems M1-M12 convert the digital data signals into corresponding analog telephone signals for transmission over conventional pairs of analog telephone wires A1-A12, respectively. The analog telephone wires typically extend to a telephone company central station at which the analog telephone signals are converted to digital telephone signals for transmission and switching through the telephone company digital network. The telephone company typically uses a digital conversion called CODEC which samples the analog telephone signals at 8,000 samples per second using 8 digital bits per sample. The resulting digital telephone signals typically are transmitted over a four wire digital telephone span line commonly called a T1 line. Each T1 telephone line carries 24 digital channels that are multiplexed onto the T1 lines by a well known time division multiplex technique. For each of the digital channels, the telephone company adds layers of call set-up information according to the conventions established by the International Standards Organization (ISO). The call set-up information typically includes the telephone number being called.

Server NAS1 demodulates digital telephone signals on telephone line T1 into corresponding digital network data signals suitable for use by host computer C24 without converting the digital telephone signals to analog telephone signals. This feature results in substantial savings in equipment and modem costs. Due to the unique designs of the modems in server NAS1, there is no need to separate the digital multiplexed T1 telephone signals into individual analog telephone signals before demodulation. Conversely, server NAS1 modulates digital network data signals from computers C13-C24 into digital telephone signals suitable for transmission by telephone line T1 without converting the digital network data signals into analog telephone signals. Server NAS1 achieves the foregoing results while enabling full duplex communication between computers C1-C12 and computers C13-C24. This is a significant advantage that increases accuracy and reduces costs compared with the prior art systems.

Server NAS1 also employs a unique bus structure that enables rapid and accurate communication between telephone line T1 and computers C13-C24.

Computers C13-C24 are capable of communicating with computers C1-C12 over separate data channels. Network data signals are communicated between computers C13-C24 and server NAS1 over a token ring network TRN1 that is served by host computer C24.

Figure 2:
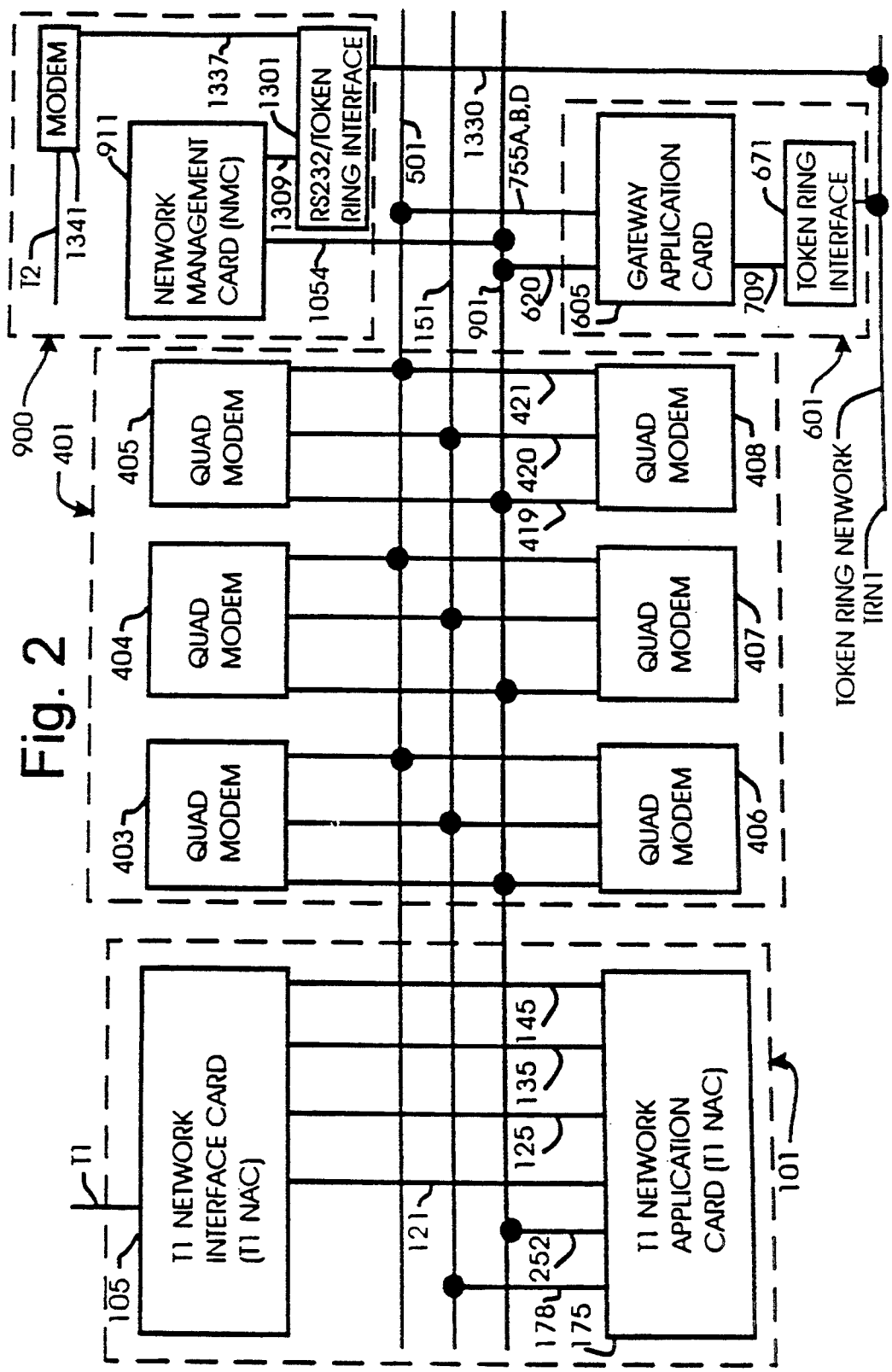
FIG. 2 is a schematic block diagram illustrating major modules of the network access server shown in FIG. 1.

Referring to FIG. 2, server NAS1 basically comprises a telephone control module 101, a TDM bus 151, a modem module 401, a packet bus 501, a network control module 601, a management module 900, and a management bus 901. Telephone control module 101 comprises a T1 network interface card (T1 NIC) 105 and a T1 network application card (T1 NAC) 175. Modem module 401 comprises identical quad modem cards 403-408 connected to TDM bus 151 as shown. Network control module 601 comprises a gateway application card 605 and a token ring interface card 761 connected as shown. Management module 900 comprises a network management card (NMC) 911, a management token ring interface card 1301, a modem 1341 and a telephone line T2 connected as shown.

T1 NIC 105 has three primary functions:
(1) to provide the necessary interface for 1.544 MHz telephone span line T1;
(2) to process incoming calls from the telephone company service and connect those calls to modem module 401; and
(3) to process outgoing calls from modem module 401 and connect those calls to telephone company service.

T1 NIC 105 provides a CSU interface which recovers clock signals and data from the incoming T1 signals, and also provides the transmission of digital telephone signals representing digital data to line T1. NIC 105 is connected to T1 NAC 175 via a backplane connector. T1 NAC 175 provides framing of recovered T1 data to extract the T1 DSO channel data and then switches the channel data to quad modems 403-408.

Figure 3:
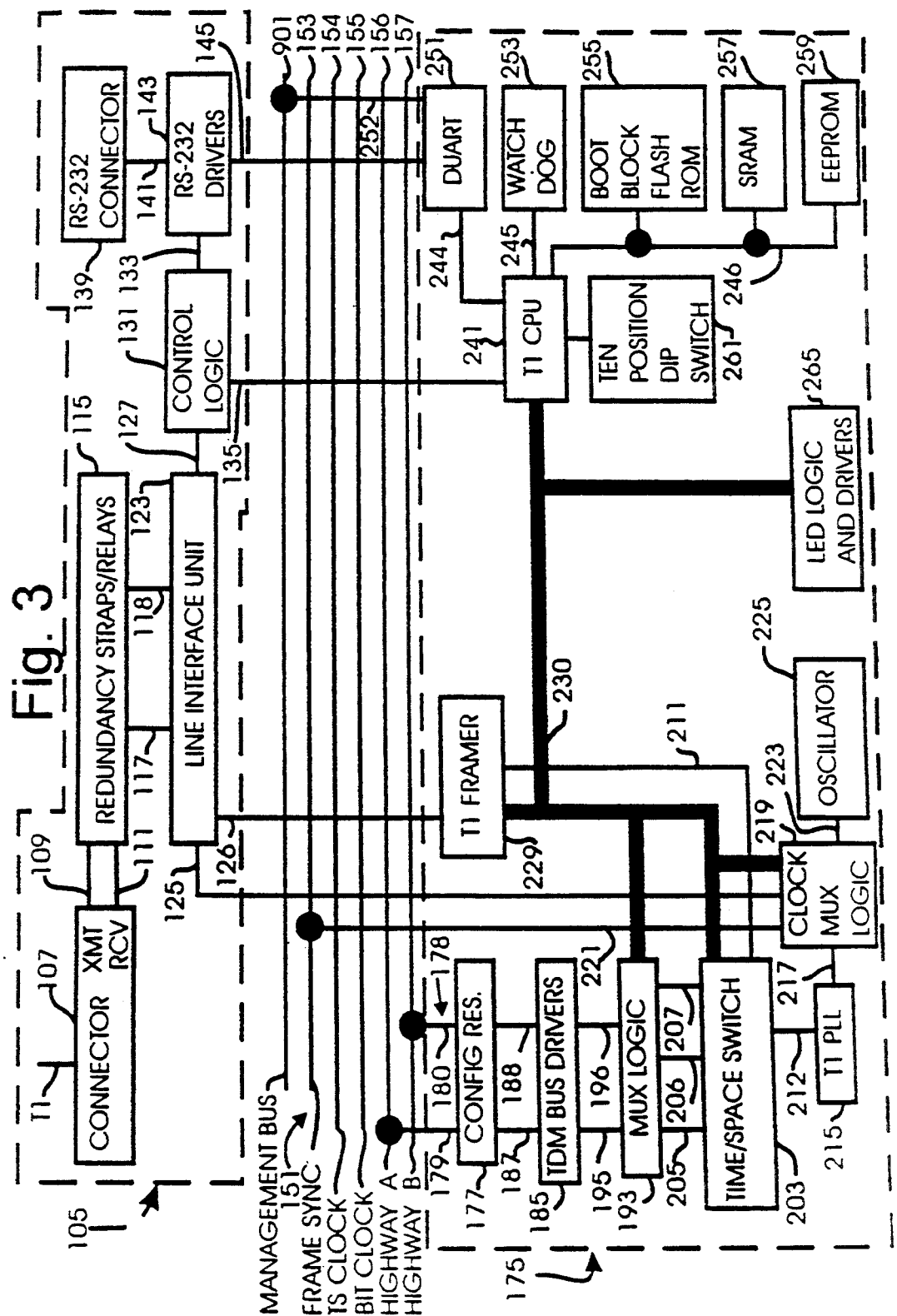
FIG. 3 is a schematic block diagram of a preferred form of T1 network interface card and T1 network application card of the type shown in FIG. 2.

Referring to FIG. 3, T1 NIC 105 comprises a connector 107 connected to telephone line T1 which carries 24 channels of digital telephone signals via time division multiplexing. Each of the channels is created by sampling an analog telephone signal 8,000 times per second using eight digital bits per sample.

Connector 107 transmits the T1 digital telephone signals over a conductor 109 and receives such signals over a conductor 111. Connector 107 is a modular 8

RJ48 connector, 4 bantam jack for monitoring each span's transmit (XMT) and receive (RCV) lines. Redundancy straps and relays 115 provide a redundancy capability and are used for switching the T1 signals to another T1 module like NIC 105, if present. The digital telephone signals are transmitted over conductors 117 and 118 to a line interface unit 123 which demultiplexes the signals and produces corresponding demultiplexed telephone output signals on a conductor 126 and clock signals on a conductor 125. For outgoing calls, interface unit 123 multiplexes digital telephone signals for transmission by line T1. Unit 123 is controlled by signals received over a conductor 127 from a control logic unit 131 which receives control signals over conductors 133 and 135. An RS-232 connector 139 can be connected to an external computer and monitor in order to receive management signals that are passed through a conductor 141 to RS-232 drivers 143. The drivers also supply RS-232 signals over a conductor 145 to T1 NAC 175.

Still referring to FIG. 3, telephone control module 101 also includes a time division multiplex (TDM) bus 151 comprising a frame sync line 153, a time slot (TS) clock line 154, a bit clock line 155 and data highway lines 156-157.

The frame sync signal is used to identify the first time-slot in each TDM bus frame. The time slot signal represents the bit clock signal divided by 8. All modules use the TS clock signal to keep track of the current active time-slot. The bit clock signal is the internal TDM bus master clock. All modules accessing the TDM bus use the bit clock to control the transfer of data. The bit clock has a clock frequency of 4.096 Mhz and is derived from the received line interface from telephone network TC1.

TDM bus 151 operates with standard TTL voltage levels and supports a maximum clock frequency of 4.096 MHz. There exist 64 time-slots during each frame on the TDM bus. During a time-slot, a module will read one octet (8 bits) of data from one of the TDM bus highways, and write one octet of data to the other TDM bus highway. There is no need to distinguish one bus frame on the TDM bus from another bus frame on the TDM bus. There is however a need to distinguish between time-slots on the TDM bus. Therefore, each time-slot will be numbered 1-64.

The TDM bus will provide 8 kilo bytes per second (Kbps) connections between as many as 64 end devices or modules. In order to provide 64 Kbps (full duplex) connections, each end device must be able to transmit and receive one octet (8 bits) every 125 microseconds (us). Therefore, the duration of each frame is 125 us. Since 64 time-slots exist per frame, the period of a time-slot is 1.95 us.

Figure 4:
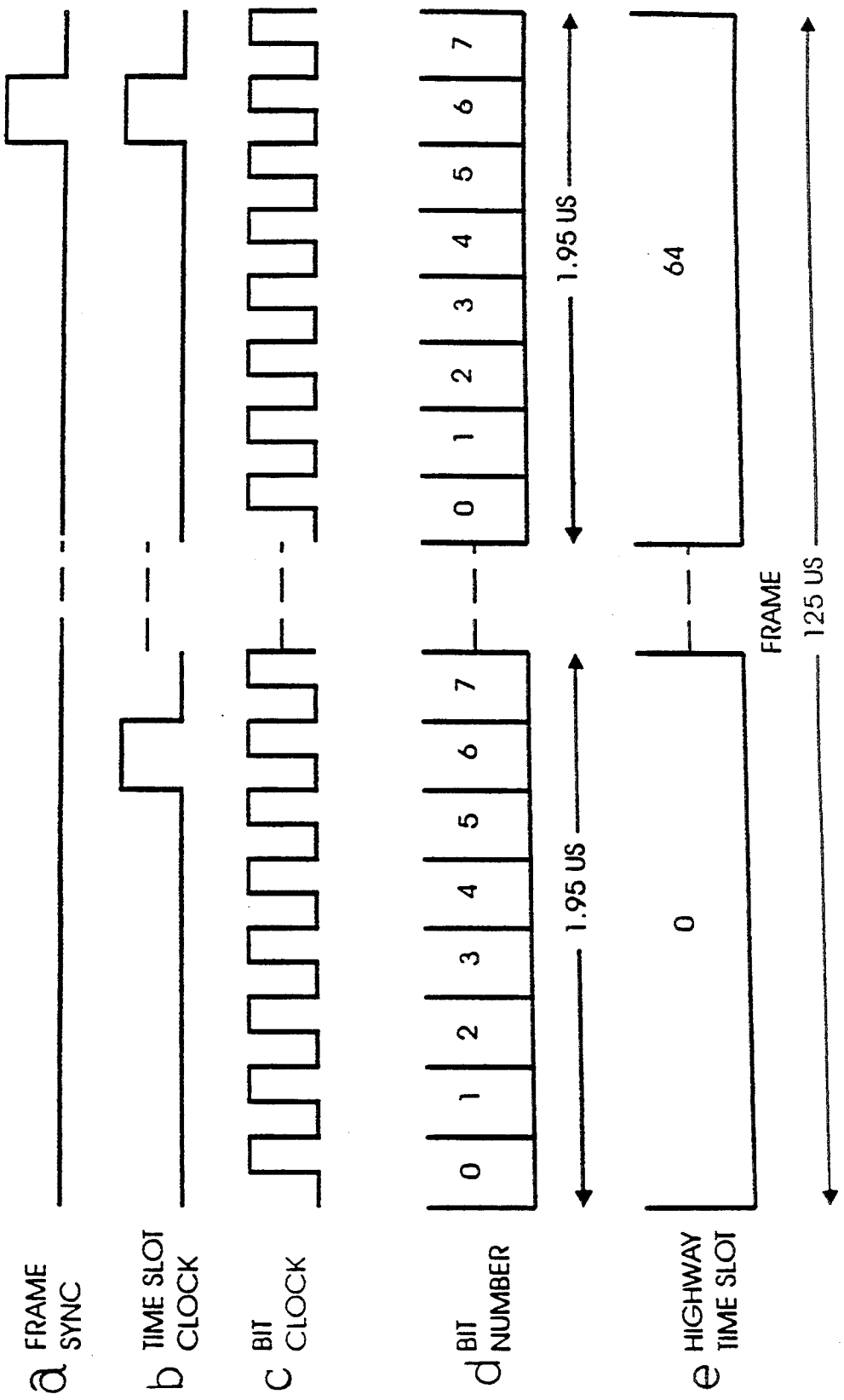
FIG. 4 is a timing diagram showing the relationship of signals appearing on the TDM bus illustrated in FIG. 2.

FIG. 4 shows the relationship between the duration of a TDM bus time-slot, the duration of a TDM bus bit time, the bit clock, TS clock and frame sync signals. Each bit of a data octet will be driven onto the bus at the falling edge of the bit clock, and will be sampled by the receiving module at the rising edge of the bit clock.

As can be seen from FIG. 4, a new bit time begins on each falling edge of the bit clock, and a new time-slot begins on the falling edge of the next bit clock after a TS clock signal. The next bit clock after a frame sync signal identifies the beginning of the first time-slot of a TDM bus frame.

Figure 5:
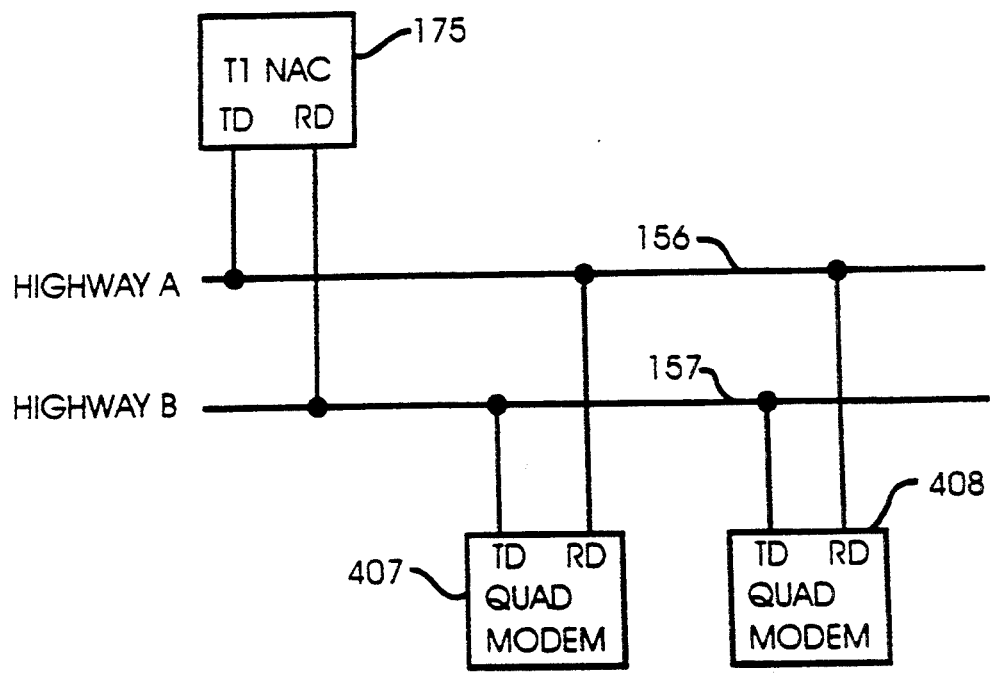
FIG. 5 is a schematic block diagram showing the connection to the TDM bus of the T1 NAC card and quad modems cards shown in FIG. 2.

As shown in FIG. 5, data is directly written from the transmit (TD) terminal of T1 NAC 175 to the receive terminal (RD) of one of the quad modems (e.g., 407 or 408) and vice versa.

T1 NAC 175 occupies rack slot 1 and assigns DSO channels 1-24 from span line T1 to time-slots 1-24 on highways 156-157 of TDM bus 151. Quad modem cards 403-408 use the time-slots in groups of four and occupy the rack slots as defined in the following chart:

| Physical Slot Nos. | Time-Slot Nos. on TDM Bus | Card Type |
| --- | --- | --- |
| 1 | 1-48 | T1 NAC 175 |
| 2 | 1-4 | Quad modem card 403 |
| 3 | 5-8 | Quad modem card 404 |
| 4 | 9-12 | Quad modem card 405 |
| 5 | 13-16 | Quad modem card 406 |
| 6 | 17-20 | Quad modem card 407 |
| 7 | 21-24 | Quad modem card 408 |

Referring to FIG. 3, T1 network application card (T1 NAC) 175 includes configuration resistors 177 that are connected as shown over a bus 178 comprising conductors 179-180 to TDM bus 151. Configuration resistors 177 receive drive signals from TDM bus drivers 185 over conductors 187-188. The bus drivers, in turn, receive signals from multiplex logic circuit 193 over conductors 195-196. Logic circuit 193 is controlled by a time/space switch 203 over conductors 205-207. Switch 203 receives a control input over a conductor 212 from a T1 phase lock loop (PLL) circuit 215 that receives input over a conductor 217 from a clock multiplex logic circuit 219. Logic circuit 219, in turn, receives 4.096 MHz clock signals generated by an oscillator 225 over a conductor 223 and receives the frame sync signal over a conductor 221. A T1 framer unit 229 frames telephone signals from line interface unit 123 and makes the resulting data frames available to an 8 bit data bus 230. Framer 229 receives control signals from time/space switch 203 over a conductor 211.

T1 NAC 175 is controlled by a T1 central processing unit (CPU) 241 that controls bus 230 and controls logic circuit 131 over conductor 135. T1 CPU 241 also receives input signals over conductors 244-246 from a dual universal asynchronous receiver transmitter (DUART) 251, a watchdog timer 253, a boot block flash ROM 255, an SRAM memory 257 and a EEPROM memory 259. T1 CPU 241 also receives inputs from a ten position DIP switch 261. The status of T1 NAC 175 is displayed on light emitting diodes (LEDs) that are controlled by an LED logic and drivers unit 265.

DUART 251 is connected to management bus 901 by a bus 252.

T1 CPU 241 uses an Intel 80C186 embedded processor to control all peripherals on T1 NAC 175 and T1 NIC 105, including framer 229, time/space switch 203, multiplex logic circuit 193, clock multiplex logic unit 219, bus 230 and LED logic and drivers unit 265. RS-232 connector 139, drivers 143 and DUART 251 provide an operator with the ability to manage T1 NAC 175. T1 CPU 241 initializes all hardware with default values, settings and configurations. These defaults are stored in flash ROM memory 255 and can be altered via a conventional software download.

The memory for T1 NAC 175 consists of 512K of boot block flash ROM 255 and 512K of SRAM 257. EEPROM memory 259 is expandable from 8K to 65K. Boot blocked flash ROM 255 has the ability to update the operational code without jeopardizing the BOOT code during a software download. This is an important feature since T1 NAC 175 is guaranteed operable code to execute if operation code is lost during software download.

T1 framer 229 is dedicated to the incoming telephone span line T1 and handles all of the T1 receive flaming and transmit flaming tasks. T1 CPU 241 accesses and controls framer 229 via bus 230. Framer 229 operates in the SF flaming mode, and is capable of supporting all flaming modes, signaling, line coding and performance monitoring required for interfacing to line T1. The outputs of framer 229 are concentrated highway interface (CHI) compatible which is an AT&T standard. The CHI outputs of framer 229 are wire OR'ed together to time/space switch 203 which switches the T1 DSO channels to the TDM bus 151 time-slots. Framer 229 receives span line T1 recovered data and clock from line interface unit 123.

The A and B signaling information from the telephone company is decoded by framer 229. T1 CPU 241 polls the framer's internal registers to extract the received A and B signaling states. T1 CPU 241 programs outbound A and B signaling states for framer 229.

Time/space switch 203 controls which DSO channel is to fill a given time-slot on TDM bus 151. The switching capability of time/space switch 203 allows connection between any of the 24 time-slots from T1 framer 229 and the 64 time-slots on the TDM bus. Time/space switch 203 has a microprocessor interface via bus 203 which provides T1 CPU 241 with access to internal configuration registers and time-slot data. Time/space switch 203 has four CHI busses (TTL compatible) which can be controlled independently. Switch 203 also can be programmed for frame integrity for wide area network (WAN) compatibility. Frame integrity means that all the time-slots in the output frame came from the same input frame, even if the time-slots were on different CHI highways. This allows equal delay of all time-slots through the time/space switch. Thus, time-slots data can be contiguous.

Time/space switch 203 uses the TDM bus 151 clock signals to pass data between the TDM bus time-slots and T1 framer 229. The internal connection memory of time/space switch 203 is programmed by T1 CPU 241 with the proper connections. Time/space switch 203 allows T1 CPU 241 access to each of the 24 DSO channels. T1 CPU 241 monitors the DSO data being transmitted to modem module 401 or data being received from modem module 401. T1 CPU 241 also can program time/space switch 203 to replace the DSO data being transmitted to modem module 401 or framer 229 with any desired 8-bit pattern. T1 NAC 175 uses this feature for in-band communications with modem module 401. The programmability of DSO channel data via time/space switch 203 allows T1 NAC 175 to connect the telephone company trunk with modem time-slot data or disconnect the two sides completely. T1 CPU 241 uses this feature to isolate the in-band signaling between modem module 401 and T1 NAC 175 from the telephone company.

Multiplex logic circuit 193 is controlled by T1 CPU 241 and is used to connect any one of the CHI highways from time/space switch 203 to TDM bus highways 156-157. TDM bus drivers 185 consist of 4 bi-directional TTL bus drivers. Configuration resistors 177 have been added to T1 NAC 175 to allow configuration of the transmit and receive highways 156-157. These resistors will allow T1 NAC 175 to talk to another NAC without the use of a network management system.

T1 NIC 105 provides the line interface circuitry between the T1 trunk and T1 framer 229. Line interface unit 123 provides an interface for span line T1. Unit 123 contains automatic gain control (AGC), auto-equalization, and data/clock recovery and recovers the T1 1.544 MHz network clock which is used by T1 NAC 175 to clock data to T1 framer 229 and, depending on configuration, may be used by T1 NAC 175 as a timing source.

Connector 139 and drivers 143 form an RS-232 serial interface which is used for basic T1 NAC 175 management functions and software download via DUART 251. T1 NIC 105 is managed completely by NAC 175.

Figure 6:
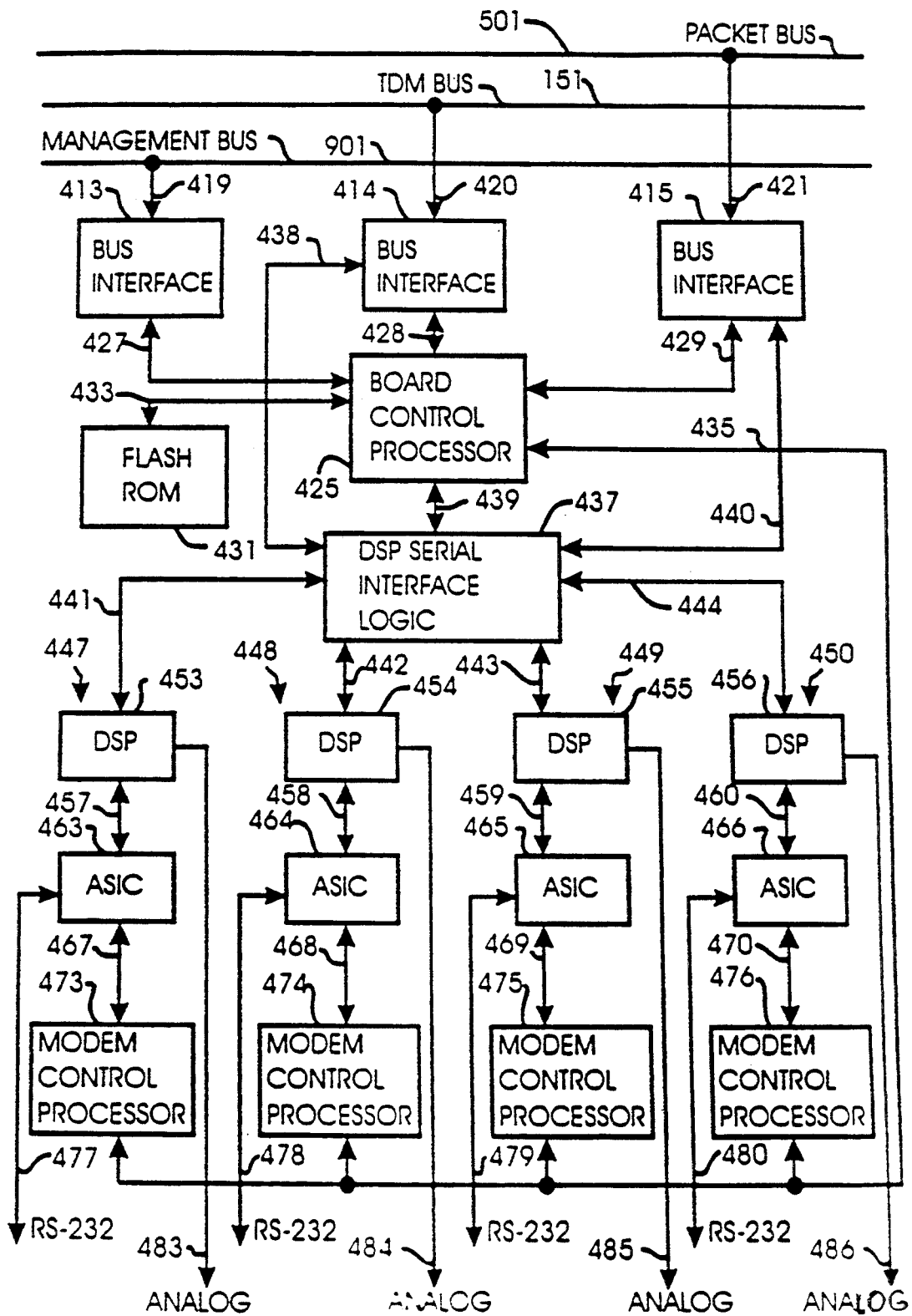
FIG. 6 is a schematic block diagram of a preferred form of quad modem card of the type shown in FIG. 2.

FIG. 6 illustrates quad modem card 408 which is identical to quad modem cards 403-407. Each of cards 403-408 contains four modems for a total of 24 modems. As a result, server NAS1 can handle a total of 24 simultaneous full duplex channels of data communication.

Card 408 comprises a bus interface unit 413 that communicates with NAC management bus 901 through an output bus 419, a bus interface unit 414 that communicates with TDM bus 151 through an output bus 420 and a bus interface unit 415 that communicates with packet bus 501 through an output bus 421. A board control processor 425 communicates over busses 427, 428, 429, 433 and 435. Bus 429 transmits control signals as well as some data. A flash ROM 431 provides memory for processor 425. Flash ROM 431 also contains the code for modem control processors 473-476, as well as digital signal processors 453-456.

Digital signal processor serial interface logic 437 communicates with processor 425 over a bus 439 and communicates with individual modems 447-450 over busses 441-444, respectively. Data is transmitted between interface logic 437 and bus interfaces 414 and 415 over busses 438 and 440, respectively. Each of modems 447-450 is identical. The modems comprise digital signal processors 453-456, application specific integrated circuits (ASICs) 463-466 and modem control processors 473-476 connected as shown over busses 457-460 and 467-470. Processors 473-476 communicate with processor 425 over bus 435. ASICs 463-466 provide RS-232 ports 477-480. These ports, together with the comparable ports from quad modem units 403-407, form a coupling circuit enabling the modem units to communicate with a processors not connected to network TRN1 (FIG. 1). DSPs 453-456 provide analog outputs 483-486, respectively. The analog outputs can be connected to analog modems that communicate with computers not connected to network TRN1.

The hardware for each of modems 447-450 is identical to the hardware found in modem model USR Courier Dual Standard manufactured by U.S. Robotics, Inc., Skokie, Ill. Each modem will support the following modulation standards: V.32bis, V.32, V.22bis, V.22, Bell 212, Bell 103 and Bell 208B, and the following error correction and data compression protocols: V.42, V.42bis and MNP2-5.

Figure 7:
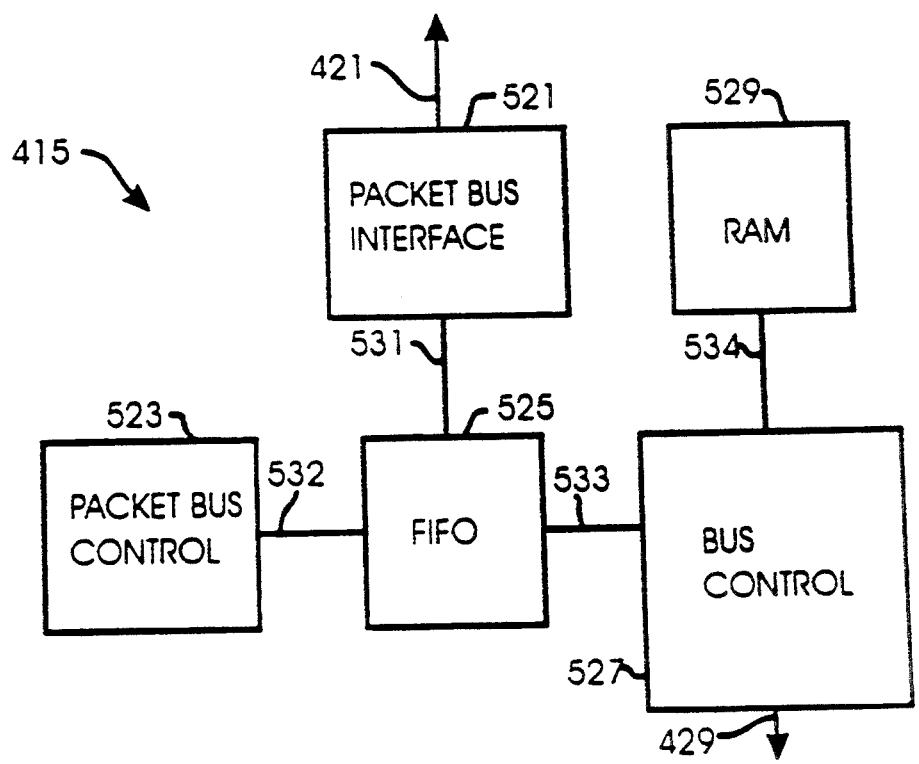
FIG. 7 is a schematic block diagram of a preferred form of interface for the quad modem card shown in FIG. 6.

Board control processor 425 controls the reception and transmission of signals between modems 447-450 and packet bus 501, controls the code set for quad modem card 408, and distributes code to quad modem 408 during a software download. Interface logic 437 handles the interfacing of modems 447-450 to TDM bus 151, including counting of time slots on TDM bus 151 and the multiplexing and demultiplexing of signals transmitted between modems 447–450 and TDM bus 151. The circuits shown in FIGS. 4 and 7 are available commercially as indicated in the following table:

| Circuits | Manufacturer & Model Number |
| --- | --- |
| Line interface unit 123 | Level One LT310 |
| Control logic 131 | AMD PAL 22V10 |
| T1 framer 229 | AT&T T7230 |
| DUART 251 | Signetics SCC2692 |
| TDM bus drivers 185 | Texas Instruments 74F126 |
| T1 CPU 241 | Intel 80C186 |
| Watch dog 253 | Maxim 697 |
| MUX logic 193 | AMD 22V10 |
| Boot block flash ROM 255 | Intel 28F001 |
| Time/space switch 203 | AT&T T7270 |
| SRAM 257 | Hitachi HM 628128 |
| T1 PLL 215 | SG ULLA VX0 |
| Clock MUX logic 219 | AMD PAL 16V8 |
| Oscillator 225 | Pletronics 32 MHz |
| LED logic and drivers 265 | Texas Instruments 74ALS573 |
| EEPROM 259 | Intel 28F64 |
| Bus interface 414 | XILINX 3064 |
| Board control processor 425 | Intel 80C188EB |
| Flash ROM 431 | Intel 28F020 |
| DSP serial interface logic 437 | XILINX 3042 or 3064 |
| DSPs 453–456 | Texas Instruments 3L0C52 or 320C51 |
| ASICs 463–466 | U.S. Robotics 1.016.684 |
| Modem control processors 473–476 | Intel 80C188EB |

The operation of modems 447–450 is coordinated by the clock and sync signals shown in FIG. 4. For example, referring to modem 447 (FIG. 6), on the trailing edge of the next bit clock following detection of the frame sync signal (FIG. 4), the assigned time slot number of modem 447 is loaded from a latch in DSP serial interface logic 437 (FIG. 6) to a set of counters. A time slot counter counts the number of time slot clock pulses relative to the frame sync signal. When the counter reaches terminal count, the serial I/O (via tri-stateable buffers) of DSP 453 is switched to the TDM bus highway lines 156–157. One octet of data is then transmitted or received within that slot time (1.95 microseconds (us)). The bus is then released. Synchronization for data transfer is done via the TDM bit clock and a bit clock counter.

Processing of data by DSP 453 (filtering, demodulation, detection, etc.) is similar to that done when data transfer took place via an AIC. However, the 4.096 MHz bit rate must be accommodated. The synchronous serial port on the DSP can operate at one fourth the machine clock rate of 20.48 MHz or 5.12 MHz. Hence the 4.096 MHz data does not pose a problem.

Referring to FIG. 7, bus interface 415 (FIG. 6) comprises a packet bus interface 521, a packet bus control circuit 523, a FIFO memory 525, a bus control circuit 527, and a random access memory (RAM) 529 that are connected as shown by busses 531–534.

The circuits shown in FIG. 7 are available commercially as indicated in the following table:

| Circuits | Manufacturer & Model Number |
| --- | --- |
| Packet bus interface 521 | Texas Instruments NuBus Chip Set SN 74 BCT 2420 and SN 74 ACT 2440 |
| Packet bus control circuit 523 | Xilinx 3064 |
| FIFO memory 525 | Texas Instruments 74 ABT 7820 |
| Bus control circuit 527 | PLDs 22V10, 26V12 and 16V8 |

Figure 8A:
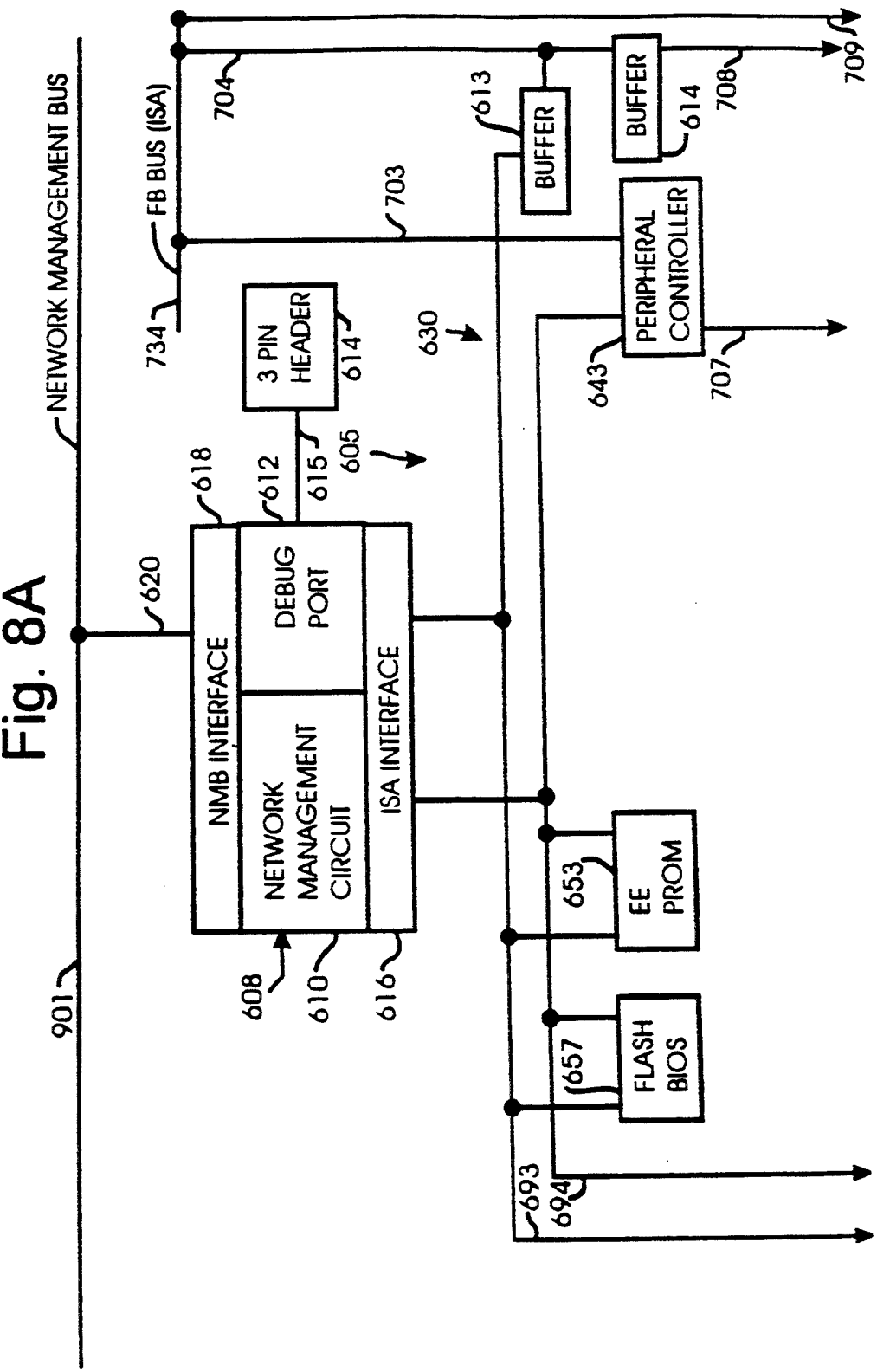
FIGS. 8A–8C are schematic block diagrams of a preferred form of gateway card of the type shown in FIG. 2.
Figure 8B:
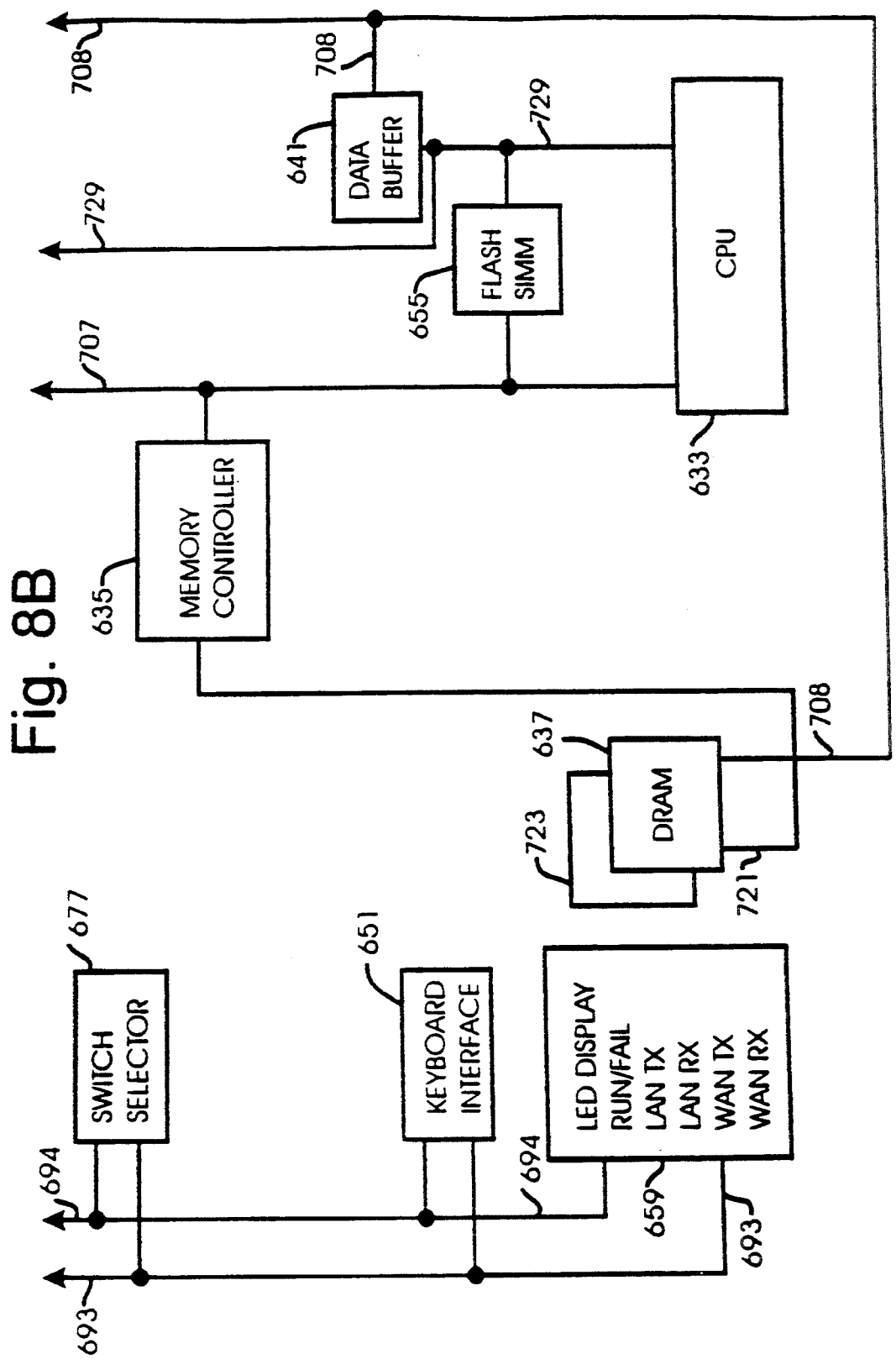
Figure 8C:
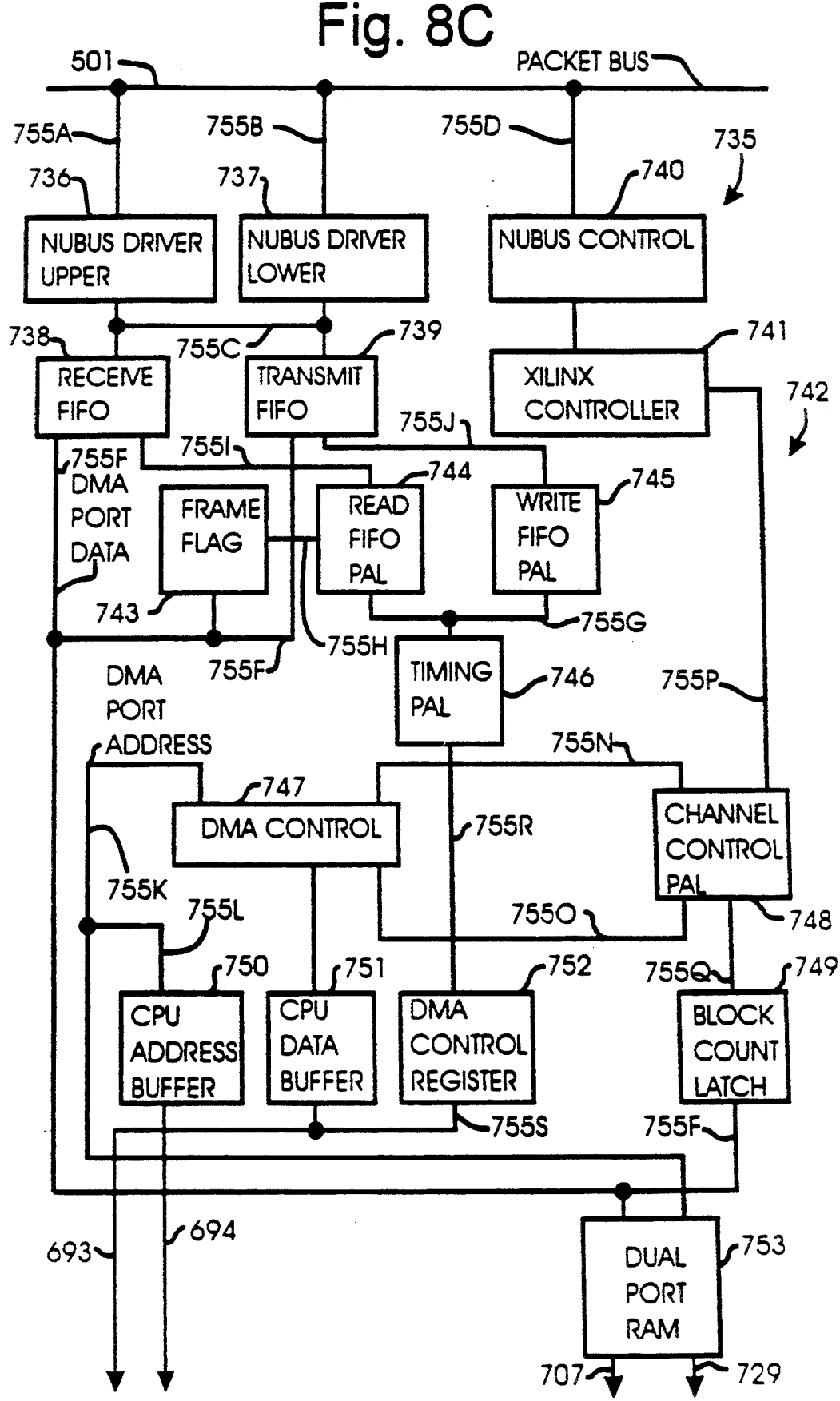

Referring to FIGS. 8A–8C, gateway application card 605 comprises network management interface 608, control engine circuits 630, a packet bus control engine 735, and a direct memory access (DMA) engine 742.

Referring to FIG. 8A, interface 608 comprises a debug port 612, a 3 pin header that is connected to port 612 by a bus 615, an ISA interface 616, network management bus (NMB) interface 618, and a bus 620 that connects interface 618 with network management bus 901. Interface 616 is connected to data bus 693 and address bus 694 as shown. Interface 608 is a Signetics 2692 DUART. Half of the DUART is used as debug port 612.

Referring to FIGS. 8A and 8B, control engine circuits 630 include a central processing unit (CPU) 633, a memory controller 635 (Chips & Technology 82C351), a DRAM memory 637, a data buffer 641 (Chips & Technology 82C355), a peripheral controller 643 (Chips & Technology 82C356), a debug port 645, an EEPROM 653, a flash SIMM interface 655, a flash BIOS 657, an LED display 659, a three pin header 669, and a switch selector 677. The components are connected as shown by busses 693, 694, 703, 704, 707–709, 721 and 729, and by an ISA bus 734.

Referring to FIG. 8C, packet bus engine 735 comprises a NuBus driver 736 for upper address bits 0–15 and a NuBus driver 737 for lower address bits 16–31. A receive FIFO 16 bit register 738 and a transmit FIFO 16 bit register 739 enable the receipt and transmission of information on packet bus 501. Engine 735 also includes a NuBus control circuit 740 that is operated by a Xilinx controller 741.

Still referring to FIG. 8C, DMA engine 742 comprises a frame flag circuit 743, a read FIFO programmable array logic (PAL) 744, a write FIFO PAL 745, a timing PAL 746, a DMA control circuit 747, a channel control PAL 748, a block count latch 749, a CPU address buffer 750, a CPU data buffer 751, a DMA control register 752, and a dual port RAM 753.

The circuits in engines 735 and 742 are connected as shown by busses 755A–755S. Bus 755C is an 18 bit bus; bus 755F is a 17 bit bus; bus 755L is an 8 bit address bus; bus 755M is a 16 bit bus; bus 755S is an 8 bit bus; bus 694 is an 8 bit address bus; bus 693 is a 16 bit data bus; bus 755N is a 4 bit bus; bus 755O is a 4 bit bus; and bus 755Q is a 6 bit bus.

Figure 8D:
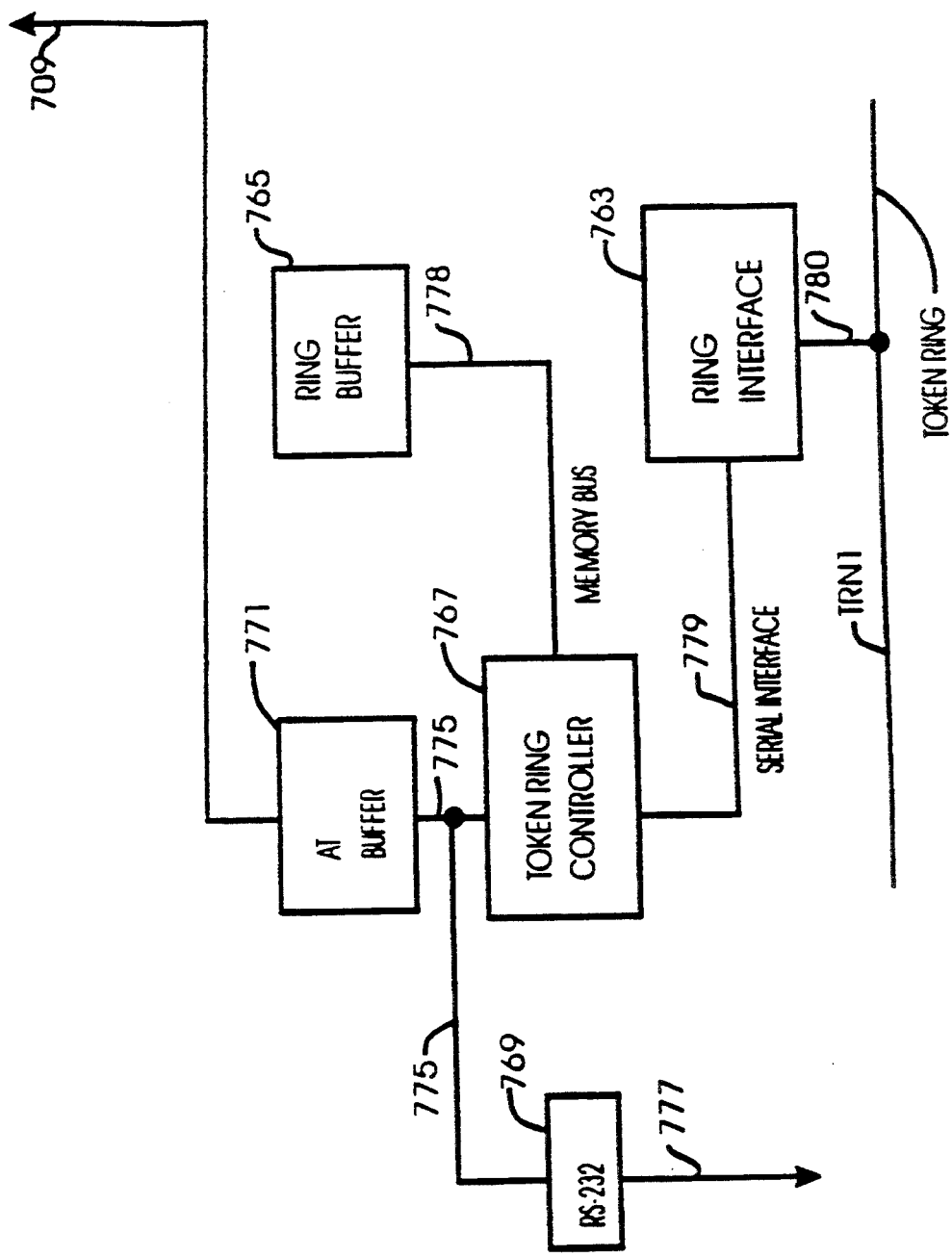
FIG. 8D is a schematic block diagram of a preferred form of token ring interface card of the type shown in FIG. 2.

Referring to FIG. 8D, token ring interface 761 (FIG. 2) comprises a ring interface 763, a ring buffer 765, a token ring controller 767, an RS-232 interface 769 and an AT buffer 771. The components are connected together as shown by busses 775 and 777–780.

CPU 633 (FIG. 8B) is an 80386DX running at 33 MHz. All CPU instructions are located in DRAM 637. The CPU footprint supports either the Intel 132-pin PQFP or the Advanced Micro Devices (AMD) version of the same processor.

Processor 633 has a watchdog function to detect possible hardware or software errors. The watchdog timer will initially power up disabled and can be software enabled. This is to allow BIOS 657 to initialize the system without interruption. After the watch dog timer is enabled, the time out period is 1.6 sec. for all applications. The software application is responsible for these enables. The timer will be responsible for (1) uniform reset state after power up; (2) NMI (non-maskable interrupt) when the first timer interrupt occurs; and (3) reset when the second consecutive timer interrupt occurs.

Memory controller 635 (FIG. 8B) provides the DRAM to CPU 633. Controller 635 controls all bus accesses including CPU 633, DRAM 637 and ISA bus 734. Timing parameters for DRAM 637 accesses and refresh are controlled by controller 635. The main chip in controller 635 is a 82C351 CPU/DRAM controller, a 160 pin PQFP. The following parameters are controlled from controller 635: reset and shutdown logic; bus 734 and CPU clock selection logic; control logic for CPU 633, DRAM 637, bus 734 access, bus arbitration, and 0 or 1 wait-state buffered write; memory control logic for DRAM access, refresh cycle, flash BIOS access and shadow RAM support; index registers for system control; fast reset; and fast gate A20.

DRAM 637 includes two SIMM banks of DRAM. Each bank can support the following DRAM modules: 256KX36 DRAM module—1 MB per bank; 1MegX36 DRAM module—4 MB per bank; and 4MegX36 DRAM module—16 MB per bank.

Data buffer 641 provides all the logic required to interface memory data bus 708 to local bus 729. The main chip in buffer 641 is an 83C355, a 120 pin PQFP. Buffer 641 buffers data between busses 708 and 729; generates and checks parity for DRAM 637; latches data for DRAM buffered writes; latches data from bus 734 during reads of CPU 633 from bus 734; performs data steering for accesses to bus 734; and provides paths for busses 704 and 693.

Peripheral controller 643 (FIG. 8A) controls all the peripheral devices on ISA bus 734. It contains the address buffers used to interface local address bus 707 to I/O channel address bus 694. The main chip in controller 643 is an 83C356, a 144-pin PQFP. It contains all the necessary peripheral control devices for basic ISA bus interconnection to ISA bus 734: DMA controllers (8237); interrupt controllers (8259); a timer/counter (8254); and an RTC (real time clock) with CMOS RAM+battery SRAM (MC14618).

Debug port 618 is a debug UART port. It is used to connect a debug terminal for software debugging. It is controlled by a 2692 DUART. This chip is interfaced to local bus 734 via data buffer 613 through bus 704.

Keyboard interface 651 (FIG. 8B) uses the Intel UPIC42 with a chip and technology keyboard algorithm mask on board. This part is a 44-pin PQFP. This part emulates the 8042 chips and technology keyboard interface and is interfaced via data buffer 613 through bus 704.

Electrically erasable PROM 653 (FIG. 8A) is an 8KX8 EEPROM which stores board information, such as serial number and all configuration data to run and initialize application programs. This device has the ability to be software write-protected. Once enabled, the device can be automatically protected during power-up and power-down without the need for external circuitry. The 8KX8 EEPROM is interfaced via data buffer 613 through bus 704. Accesses to this device are through a paging interface whereby 2K pages are accessed via a pre-loaded page register. The chip is a 32-pin PLCC.

Flash SIMM Interface 655 (FIG. 8B) supports up to 8 1MegX8 symmetrically blocked flash memories. The flash SIMM interfaces to processor 633 via local bus 729. All operating system and application code are stored in the flash SIMM.

BIOS ROM 657 (FIG. 8A) stores a ROM-based code common to all IBM PCs and is executed at power-up or reset just after RAM refresh is started and a program stack is created. BIOS provides power-on diagnostics and low-level driver support and executes the operating system at the end of the power-on sequence. The BIOS resides in a flash ROM and is executed out of the 64 Kbyte area located at the top of the 4 Gbyte address space. After the PC engine has been fully initialized and tested, the extended BIOS initializes all specific devices on card 605 and loads operational software from the flash SIMM to DRAM 637. Once all initialization and testing is complete, BIOS can be shadowed down to a 128 Kbyte address area located in the first Mbyte of memory.

LED display 659 (FIG. 8B) contains the LEDs on card 605. All LEDs can be controlled by software via a 16-bit register. All LEDs are interfaced from ISA bus 734 via data buffer 613 through bus 693.

Referring to FIG. 8C, NuBus upper and lower buffers 736 and 737 are responsible for buffering both the 32 bit NuBus address and data busses 755A and 755B to and from packet bus control engine 735.

NuBus control 740 is responsible for handling all the interface control signals to and from packet bus 501. Control 740 is monitored and controlled by the state machines of Xilinx controller 741.

Receive FIFO 738 represents 512×18 bits of FIFO memory used to buffer data from NuBus data buffers 736 and 737 to dual port RAM 753. FIFO 738 is controlled by Read FIFO PAL 744 and can be accessed through program control using a maintenance buffer (not shown). FIFO 738 also can be reset via program control.

Transmit FIFO 739 represents 512×18 bits of FIFO memory used to buffer data from the dual port RAM 753 to NuBus data buffers 736 and 739. FIFO 739 is controlled by write FIFO PAL 745 and can be accessed through program control using a maintenance buffer (not shown). FIFO 739 also can be reset via program control.

Xilinx controller 741 represents a Xilinx FPGA used to control, through state machines, the movement of data to and from FIFOs 738 and 739, and to and from NuBus buffers 736 and 737. Controller 741 has internal control and status registers, and can be programmed from the CPU interface.

DMA controller 747 represents the 20 Mhz 82C257 DMA controller. It is responsible for creating the address and handshake signals needed to move data to and from the dual port RAM 753 and to and from FIFOs 738 and 739. Control 747 contains internal control registers and status registers.

Read FIFO PAL 744 generates, through the use of timing queues from timing PAL 746, DMA control 747 and Xilinx controller 741, the necessary signals to unload the read data from receive FIFO 738 and present the data on bus 755F to dual port RAM 753.

Write FIFO PAL 745 generates, through the use of timing queues from timing PAL 746, DMA controller 747 and Xilinx controller 741, the necessary signals to load the write data from dual port RAM 753 to transmit FIFO 739.

Timing PAL 746, through status and start queues generated from program control and the FIFO full and empty lines, generates seven timing cycles which are divided across the DMA cycle to control the movement of data and the correct execution of control signals.

Channel control PAL 748, through the use of control information from program control and from block count latch 749, routes request and end of DMA information to their appropriate places.

Frame flag 743 is a bit register, loaded into the FIFO by Xilinx controller 741 at the end of a block, that is used to queue the hardware when the block count information for the next transfer is present, at which time the logic will read that information out, and write it to the block count latch. Flag 743 can be written to via program control.

Block count latch 749 represents a latch which stores the block count information for the next block transfer. Latch 749 is loaded from read FIFO PAL 744.

CPU address buffer 750 represents the buffers used by CPU peripheral bus 694 to access the DMA controllers address bus 755K to load or read control information.

CPU data buffer 751 represents the bi-directional buffers used by CPU peripheral bus 693 to access the DMA controllers data bus 755M for loading and unloading of control and status information.

DMA control register 752 represents the control register used to queue start up processes for the DMA logic. The DMA can be turned off and turned on via processor control through register 752 both on the transmit side and on the receive side.

Dual port RAM 753 stores data for packets and blocks and channel control programs for the DMA. RAM 753 is accessed from port 1 by the CPU, and from port 2 by the DMA control logic. RAM 753 is made up of 256 k bytes of static RAM under the control of a dual port arbiter.

Referring to FIG. 8D, ring interface 763 contains the digital interface to the digital portion of the token ring control and buffer logic and the analog interface to the token ring medium to make a full duplex electric interface as per IEEE Std. 802.5-1989. Interface 763 consists of a TMS38054 ring interface device and associated analog circuitry to handle clock and data recovery at both 4 and 16 Mbps, using either shielded or unshielded twisted pair connection. The chip is a 44-pin PCCP.

Ring buffer 765 carries four 256KX4-100 DRAMS used to hold the ring data. This DRAM array is used to buffer the token ring frame when it comes in from the token ring network TRN1. It also holds all the MAC and LLC software that runs the TMS380 controller in controller 767. The DRAM in buffer 765 is controlled by controller 767. The software and data contained in the DRAM is executed by controller 767.

Token ring controller 767 is made up of the TMS38C16 token ring comprocessor. It is a complete IBM token ring, IEEE 802.5-1989 compatible chip capable of running at both 4 and 16 Mbps data rates. It also handles all the data transfers to and from dual port RAM 753 (FIG. 8C). The chip is a 132-pin PQFP.

RS-232 interface 769 provides an interface to the outside world to communicate with the application software running on card 605. The interface connection is via a RJ45 female port. It is made using a 16C550 UART. This chip interfaces to ISA bus 734 via bus 709. The baud rate of the interface is selected via selector switch 677 (FIG. 8B).

Figure 9A:
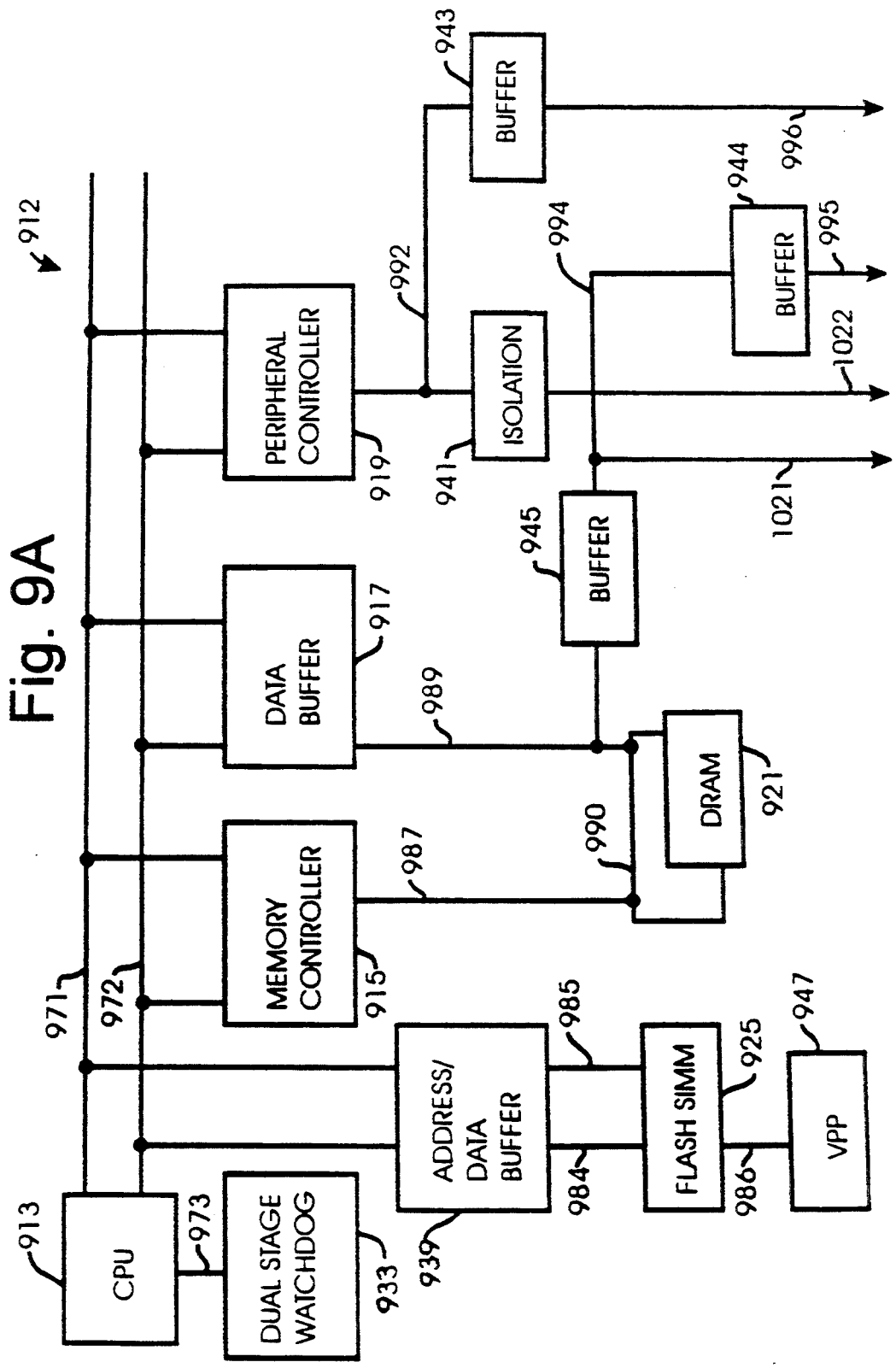
FIGS. 9A–9C are schematic block diagram of a preferred form of management card of the type shown in FIG. 2.
Figure 9B:
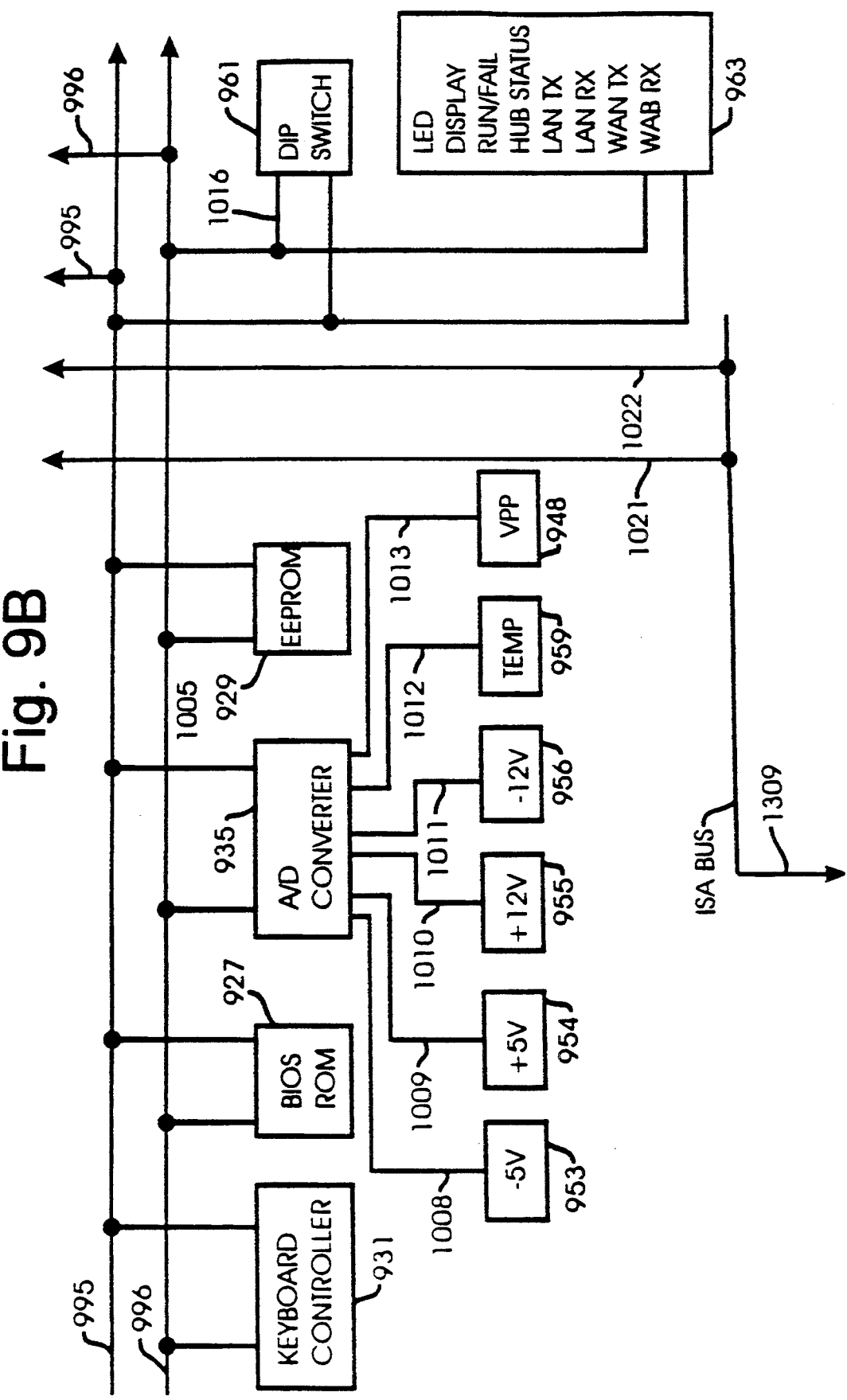
Figure 9C:
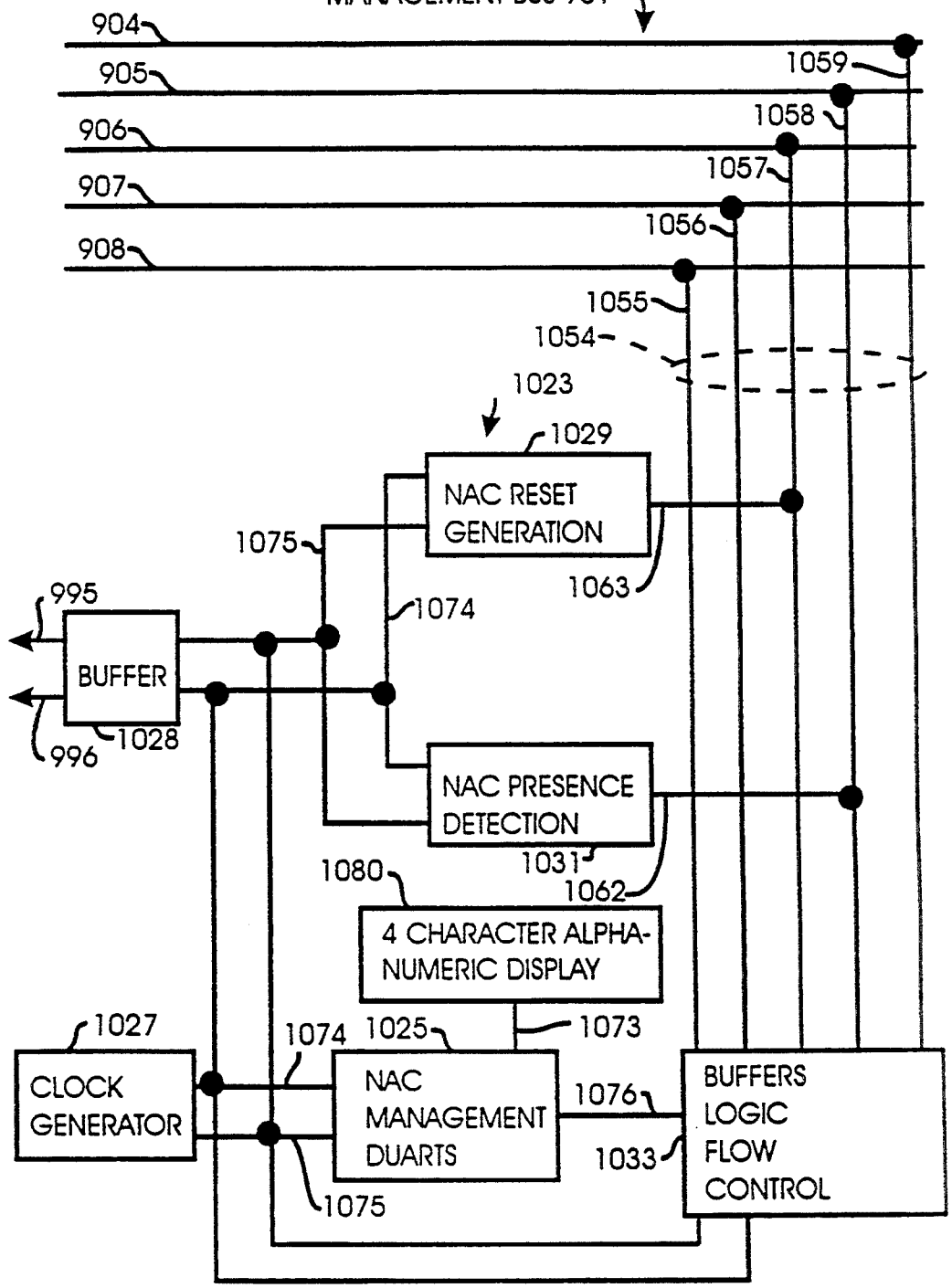

Referring to FIGS. 9A-9C, management card 911 basically comprises a PC engine circuit 912 and an NAC management bus interface circuit 1023.

Referring to FIGS. 9A and 9B, PC engine circuit 912 comprises a central processing unit (PCU) 913, a memory controller 915 (a Chips & Technology 82C351), a data buffer 917 (a Chips & Technology 82C355), a peripheral controller 919 (a Chips & Technology 82C356), a DRAM 921, a flash SIMM interface 925, a flash BIOS 927, an EEPROM 929, a keyboard controller 931, a dual stage watchdog circuit 933, an analog to digital (A/D) converter 935, an A/D buffer 939, an isolation buffer 941, general buffers 943-945, VPPs 947-948, voltage supply outputs 953-956, a temperature sensor 959, a DIP switch assembly 961, a light emitting diode assembly 963, and a daughter board interface 965 that are connected as shown by busses 971-973, 984-987, 989-990, 992, 994-996, 1008-1013 and 1021-1022.

As shown in FIG. 9C, management bus 901 comprises conductors 904-908 that are explained in detail in connection with FIG. 9D. FIG. 9C shows management bus interface circuit 1023 that comprises NAC management DUARTs 1025, a clock generator 1027 that generates both clock and strobe signals, a buffer 1028, an NAC reset generation circuit 1029, an NAC presence detection circuit 1031, and a buffers and logic flow control circuit 1033. Conductors 1055-1059, connected respectively to conductors 908-904, form a bus 1054 that interconnects control circuit 1033 with management bus 901. The remaining components of FIG. 9C are interconnected with busses 1062-1063 and busses 1074-1076 as shown.

VPP stands for flash programming voltage. Each of VPPs 947-948 (FIGS. 9A-9B) includes transistors which shift voltage from 5 to 12 volts. DIP switch 961 is a selector switch which can be used to select baud rate for the user interface port. LEDs 963 are used to display RUN/FAIL, HUB status, LAN Tx, LAN Rx, WAN Tx and WAN Rx. A four character alpha-numeric display 1080 (FIG. 9C) is used to show status, including rack number and alarms. Display 1080 receives operating signals over a bus 1073 from DUARTs 1025.

Buffers logic flow control circuit 1033 (FIG. 9C) provides flow control which prevents loss of data when the UART receive FIFOs in circuit 1025 become full. Representative components of circuit 1033 are NAND gate 1119, flipflop 1125 and resistor 1121 (FIG. 9D). Such components are repeated eight times in circuit 1033, one set for each NAC card.

Referring to FIG. 9A, CPU 913 is an 80386DX microprocessor running at 25 Mhz. All CPU instructions are located in DRAM 921. The CPU 913 footprint supports a 132-pin PQFP surface mount package style which is currently supported by two vendors: Intel and AMD.

Memory controller 915 provides the DRAM to CPU 913. Controller 915 controls all bus accesses, including CPU 913, DRAM 921, and AT bus 1020 cycles. Timing parameters for DRAM 921 refresh and timing also are controlled by controller 915. The main chip in controller 915 is a 82C351 CPU/cache/DRAM controller manufactured by Chips & Technology, Inc., a 160 pin PQFP. The following parameters are controlled from controller 915: reset and shutdown logic; AT bus 1020 and CPU 913 clock selection logic; control logic for CPU 913, DRAM (local) memory 921, AT bus 1020 access, bus arbitration, and 0 or 1 wait-state buffered write; memory control logic for DRAM 921 access, refresh cycle, flash BIOS access, and shadow RAM support; index registers for system control; fast reset; and fast gate A20.

Data buffer 917 provides all the logic required to interface memory data bus 972 to the local bus 989. The main chip in buffer 917 is an 82C355, a 120 pin PQFP. Buffer 917 does the following: buffers data between busses 972 and 989; generates and checks parity for DRAM 921; latches data for DRAM 921 buffered writes; latches data from AT bus 1020 during CPU AT bus reads; performs data steering for AT bus 1020 accesses; and provides paths for busses 994, 995 and 997.

Peripheral controller 919 controls all the peripheral devices on ISA bus 1020. It contains the address buffers used to interface local address bus 971 to the I/O channel address bus 996. The main chip in controller 919 is an 82C356 manufactured by Chips & Technology, Inc., a 144-pin PQFP. It contains all the necessary peripheral control devices for basic ISA bus 1020 interconnections.

All operational code is executed from dynamic random access memory (DRAM) 921. Upon power up, the BIOS loads the operating system and application from FLASH ROM 925 into DRAM 921. DRAM 921 also stores data used by the application during runtime. Since DRAM is volatile (memory is lost upon power loss) each time the management card is reset or power is cycled, DRAM 921 needs to be reloaded. DRAM 921 is configured as two single inline memory modules (SIMMs) which make up two banks of memory. Each module has a 36 bit interface, a 32 bit data bus and 4 bits for parity checking. Parity is handled by memory and cache controller 915. Two banks are used to increase performance by using a process called interleaving. Interleaving is a method of accessing DRAM 921 in which access time can be improved, thus reducing wait states to CPU 913. When interleaving takes place, CPU 913 reads from one bank and then the next; alternating from bank to bank is called interleaving.

Flash ROM 925 is used to store non-volatile code and data.

BIOS ROM 927 (FIG. 9B) is used to perform several functions. Upon power up, BIOS code is the first to be executed. CPU 913 starts executing code at the jump vector (FFFF0) where initialization of the chipset begins (i.e., starting RAM refresh and setting up a program stack). The BIOS also performs power-on diagnostics, low level driver support and transfers control to the operating system. After the BIOS code is executed, the extended BIOS code takes over The extended BIOS code configures and tests specific hardware. The extended BIOS code also contains the software download loader. This extended code is located in the same physical EPROM as the BIOS code.

EEPROM 929 is required for non-volatile items, such as serial numbers, product codes, releases dates, software enable/disable keys, etc. The management card uses an 8K×8 EEPROM for this information. The EEPROM is located in the I/O space of the management card. For devices larger than 2K, all access is accomplished through a paging interface. Each page is 2K deep and is controlled by an I/O register.

Keyboard controller 931 is a standard device used to scan the keyboard input in which the scan codes are converted to ASCII characters and are sent to CPU 913. The keyboard controller performs many vital functions besides keyboard scanning. One of these functions is switching from "flat mode" to "protect mode" and back again through software control. Keyboard controller 931 uses an Intel UPIC42 chip with a Phoenix Technologies keyboard algorithm mask and is a 44-pin PQFP.

Watchdog circuit 933 (FIG. 9A) supervises the operation of CPU 913 and related circuitry. Circuit 933 contains a supervisor chip (MAX697) and some discrete logic which generates a power-on-reset pulse for CPU 913 and all circuitry using a RESET line and generates a watchdog reset if a WDI (Dog Tickle) line is not toggled within the time-out period. This method of tickling the watchdog ensures that the software being executed by CPU 913 is sane. Watchdog circuit 933 is initialized by software at the beginning of the extended BIOS code execution. Once initialized and after the first watchdog tickle, the supervisor time-out period is 1.6 seconds. Watchdog circuit 933 traps the reset pulse from the supervisor chip in case there is a watchdog time-out. If circuit 933 detects a watchdog time-out condition, it generates an NMI instead of a RESET. If a second watchdog time-out is detected by watchdog 933, a reset is asserted to the entire management card. If after the first watchdog time-out the software tickles the watchdog, the watchdog hardware is reset. The watchdog supervisor chip has an output bit that will be readable by CPU 913 to indicate a watchdog time-out condition or a power-up condition. This output of the supervisor chip is cleared (indicating a power-up state) as soon as the watchdog is tickled or when the reset occurs (i.e., the second NMI occurs). The management card NMI handler queries this bit and, if set, (i.e., NMI is due to watchdog time-out) the card sets a reserved byte in the CMOS static RAM area. During the extended BIOS code execution, this byte is checked to determine if the boot is due to a watchdog reset; this value is passed to the management card operational code once the extended BIOS execution is completed.

A/D converter 935 (an ADC0848 chip) is used to monitor all system voltages which include +5 V, −5 V, +12 V, −12 V, and the programming voltage used for FLASH ROM 925 programming. A/D 935 also monitors the output of temperature sensor 959 which indicates the temperature in the NAS1 chassis. A/D converter 935 is an 8 channel device.

Referring to FIG. 9C, management bus 901 transfers data (management information) among network management card 911, T1 network application card 175, quad modem network application cards 403–408 and gateway network application card 605 (FIG. 2) (hereafter "NACs"). Card 911 has a dedicated serial data path to each such card This data path includes an upstream data line 905, a downstream data line 906 and a flow control line 904. Card 911 has eight DUARTs, each of which is dedicated to one of the NACs 175, 403–408 and 605. Card 911 generates a 512 KHz clock which is sent over line 907 for all NACs to receive. This clock is used by both card 911 and the NACs to transmit and receive the serial data. Card 911 also drives a flow control strobe onto line 908 which enables NACs 175, 403–408 and 605 to retrieve flow control information from a bi-directional flow control line.

Hardware flow control allows card 911 to transmit data to an NAC without over-running the NAC's DUART receiver and vice versa. Hardware flow control is very important in real-time applications, such as T1 NAC 175, modem NACs 403–408 or gateway NAC 605 where the NAC's highest priority is to transfer data over packet bus 501. Since management bus 901 is a lower priority interface, the DUART's receiver FIFO might fill. This automatically causes a flow control condition to occur to card 911. Flow control continues until the NAC has time to service the DUART's receiver. The same applies for card 911's flow controlling of the NACs. Since card 911 is managing many devices and also is communicating over a LAN (TRN1), one of the eight DUARTs receiving data from the NACs may fill up. The DUARTs in card 911 assert flow control automatically when this condition occurs, thus preventing data loss.

Management bus 901, besides passing data to and from card 911 and the NACs, also supports two other management functions. Card 911, through hardware control, can reset single or multiple NACs. If desired by card 911, an NAC can be held in reset, thus removing it from service. Card 911 also, through hardware control, can detect the presence of an NAC. Card 911 requires four 2692 Signetics dual universal asynchronous receiver transmitters (DUARTs) to provide eight dedicated channels to the application cards. Each DUART is a 44 pin LCC package.

Clock generator 1027 is a 512 KHz clock used for most applications. The clock is used to generate a strobe signals used on management bus 901.

Network management bus 901 provides a communications path between network management card (NMC) 911 and other network application cards (NACs) 175, 403-408 and 605. NMC 911 maintains constant communications with all NACs in server NAS1 via network management bus 901. Through bus 901, NMC 911 performs all management functions, such as configuring cards, performing tests, issuing commands, querying statistics and other management functions.

Network management bus 911 includes bus interfaces which NMC 911 uses to communicate with all NACs. Management bus 901 provides a dedicated 512 Kbps full duplex serial channel from NMC 911 to each NAC. Each channel supports a full duplex hardware flow control signal to throttle management bus traffic automatically without processor intervention. The communication is performed using an asynchronous data format accompanied by a 512 KHz data clock and flow control strobe transmitted over bus lines 907 and 908, respectively. Thus, data is transmitted over bus 901 a periodically at irregular intervals of time.

Management bus 901 consists of eight dedicated downstream data lines, eight dedicated upstream data lines, eight dedicated bi-directional flow control lines, common data clock line 907 and common flow control strobe line 908. FIG. 9D shows one such group of lines connected between NMC 911 and gateway card 605: a flow control line 904; an upstream data line 905; a downstream data line 906; clock line 907 and strobe line 908. Lines like lines 904-906 are connected between NMC 911 and each of NACs 175 and 403-408. Lines 907-908 also are connected to each of NACs 175 and 403-408 and 605.

Management bus 901 provides additional management functions that are performed via hardware. These functions include presence detection and hardware reset of NACs by NMC 911. Presence detection is used by the software to detect the presence of NACs, thereby enabling NMC 911 to differentiate an NAC failure from an NAC not present condition. It also is used to determine whether an NAC is present if communication is lost. Reset is performed by NMC 911 to the NACs. A reset causes a one second strobe to the NACs upstream data line, thereby performing a hardware (physical) reset of the entire card. NMC 911 can also hold an NAC in a continuous state of reset (thus removing it from service). Reset can be used if a card is not responding to NMC 911 or if communications are lost.

Figure 9D:
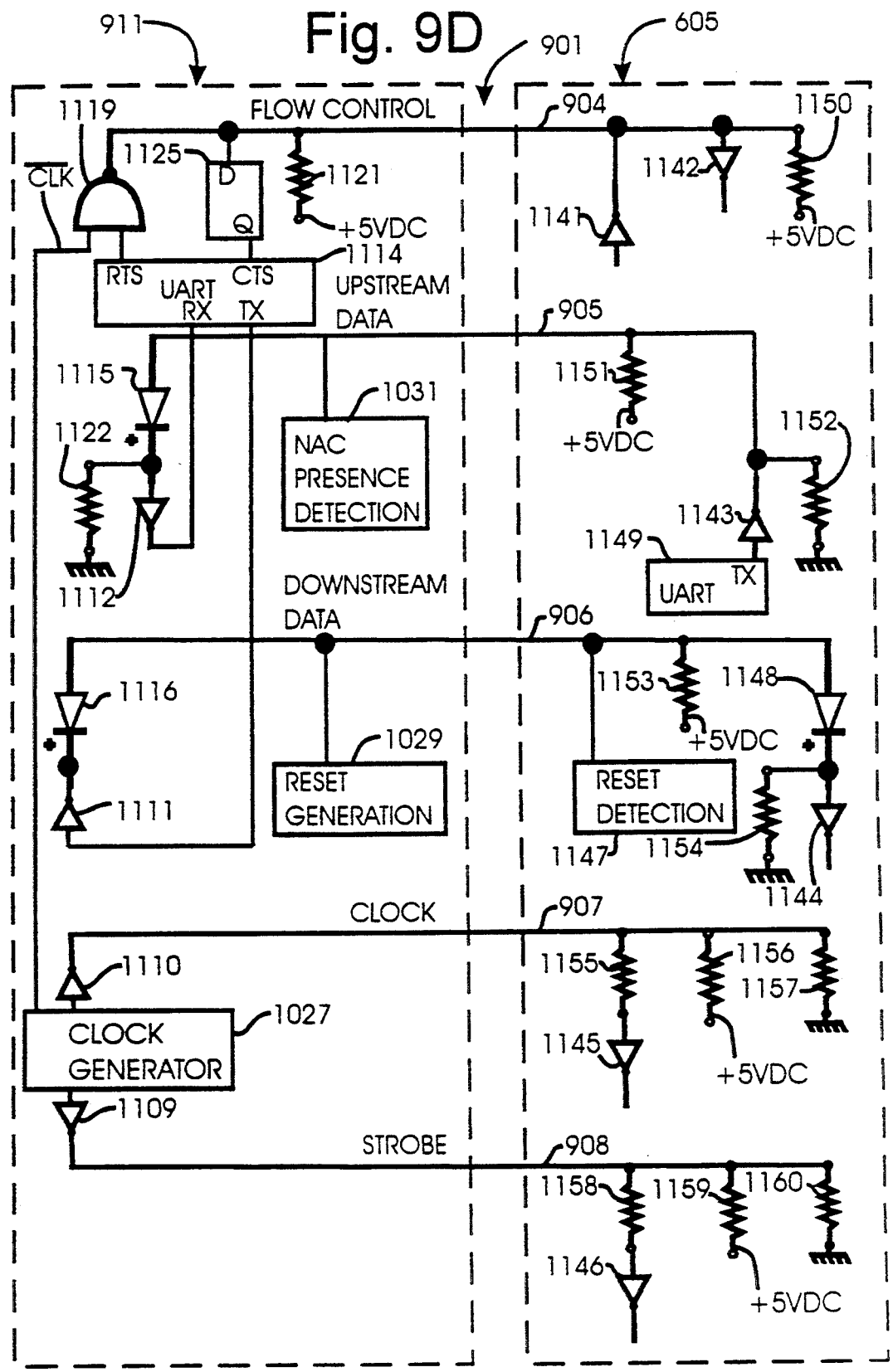
FIG. 9D is a schematic block diagram of a preferred form of management bus interface of the type shown in FIG. 8C.

As shown in FIG. 9D, NMC 911 comprises driver amplifiers 1109-1112, diodes 1115-1116, a NAND gate 1119, resistors 1121-1122 and a D-type flipflop, all connected as shown. Gateway NAC 605 comprises driver amplifiers 1141-1146, a reset detection circuit 1147, a diode 1148, a UART 1149 and resistors 1150-1160 connected as shown. The other NACs have identical components coupled as shown in FIG. 9D to management bus 901.

Data transferred between NMC 911 and the NACs is organized in a standard asynchronous data format. Data is transmitted by loading a UART with a byte of data. The UART converts this parallel byte of data into a serial bit stream and transmits it out the TX output using the data clock on line 907 to clock out the data. The first bit transmitted is a start bit followed by 8 data bits (LSB first) and then 1 stop bit. At the receiver, a UART accepts serial data over management bus 901 and converts it into parallel data for a CPU to read. All NACs interfacing to management bus 901 configure their UARTs for this format.

Data clock line 907 is a common line that is driven by NMC 911 to all NACs. The clock is used for synchronous serial data transfer between NMC 911 and the NACs. The clock also is used for multiplexing the NMC and NAC flow control information onto a single bi-directional line (e.g., line 904). Resistors 1156, 1157, 1159 and 1160 are termination resistors. Resistors 1155 and 1158 damp any overshoot or undershoot on the inputs of the receiver and provide some isolation, since lines 907-908 are common to all NACs.

There are eight dedicated downstream data lines that run from the Tx output of an NMC 911 DUART to the Rx input of an NAC UART. One of the lines, 906, and one of the UARTs, 1114, are shown in FIG. 9D. The downstream data lines also are used for NAC reset by NMC 911. Each NAC bus has a reset detecting circuit, such as gateway NAC reset detection circuit 1147 shown in FIG. 9D.

Figure 9E:
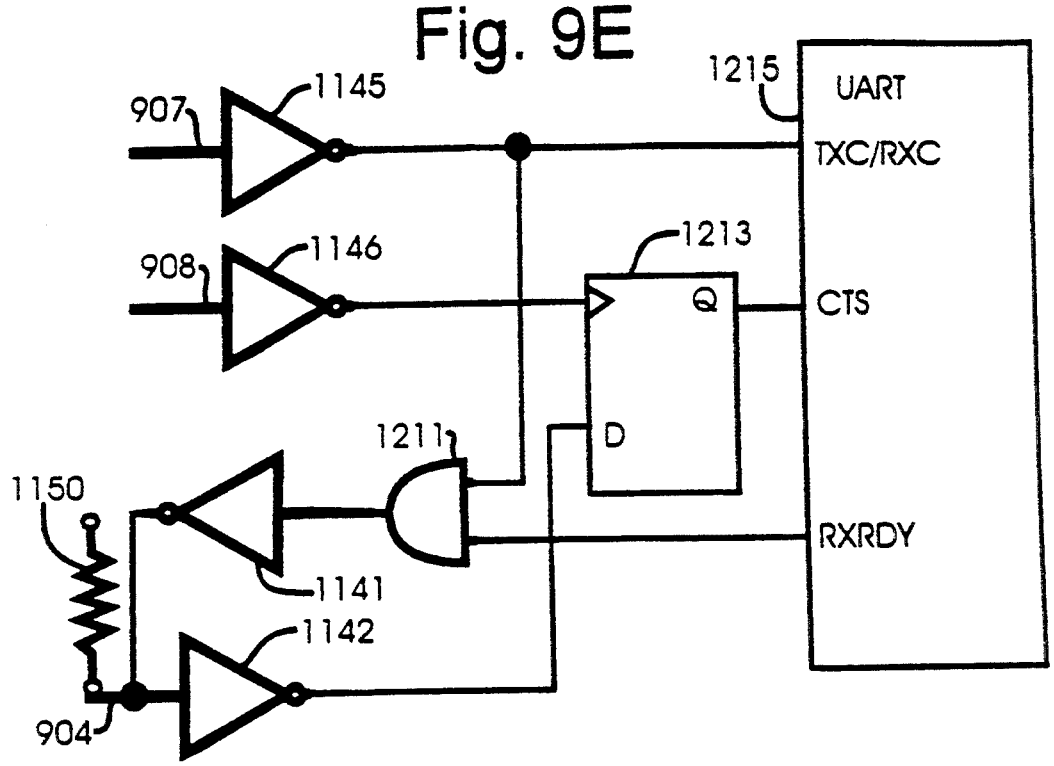
FIG. 9E is a schematic block diagram of a preferred form of flow control circuit for the management bus interface.
Figure 9F:
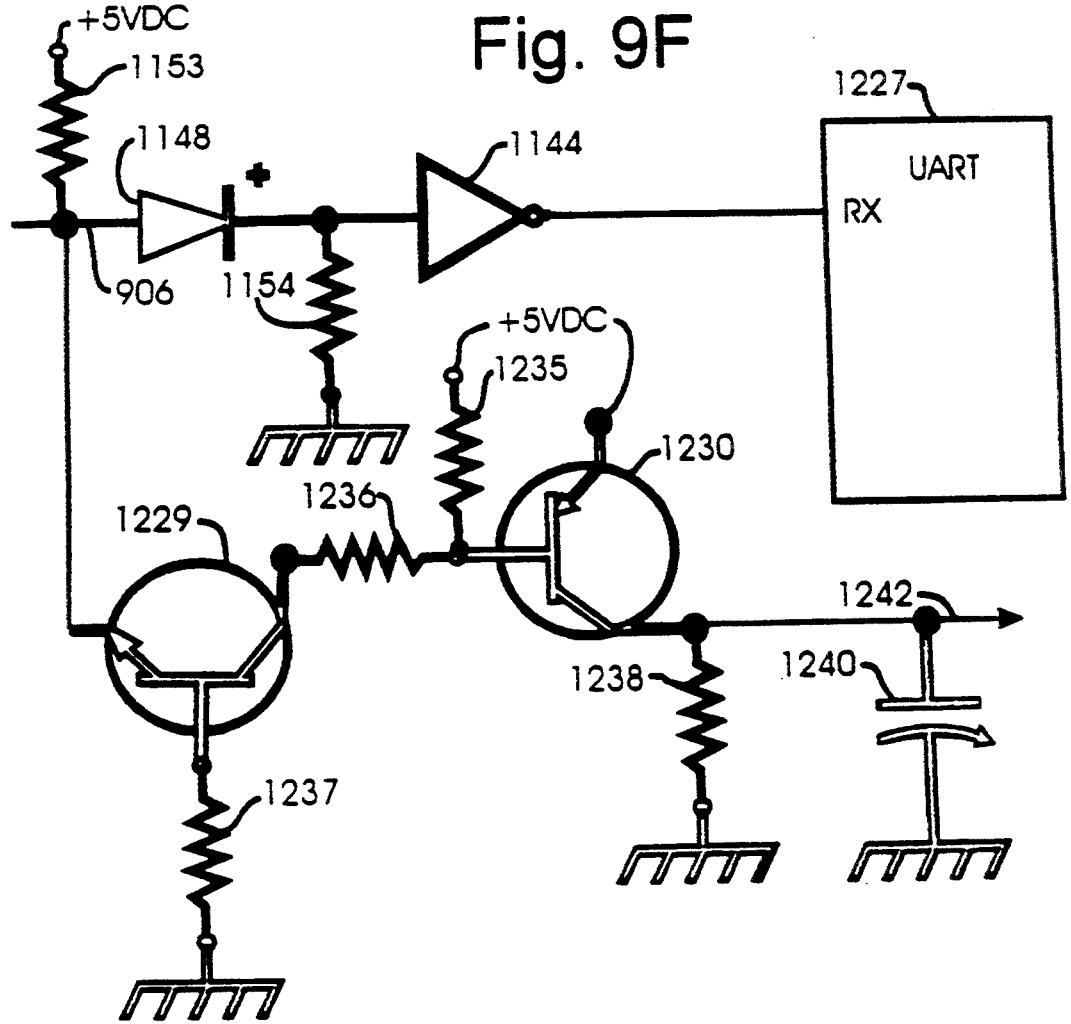
FIG. 9F is a schematic block diagram of a preferred form of reset detection circuit shown in FIG. 9D.

Reset detection circuit 1147 is shown in detail in FIG. 9F and comprises a UART 1227, transistors 1229-1230, resistors 1235-1238, a capacitor 1240 and an output conductor 1242, all connected as shown.

Referring to FIG. 9D, termination resistors for the downstream data lines are located on each individual NAC. Diodes 1116 and 1148 protect drivers 1111 and 1144 from the −5 VDC reset signal that is generated from reset generation circuit 1029 on NMC 911. Resistor 1153 is used to drive the driver 1144 input to Vih when the driver 1111 output is at Voh. Diode 1116 is off and diode 1148 conducts when the driver 1111 output is at Voh. Resistor 1154 is used to drive the driver 1144 input to Vol (min), thus maintaining Iil (min) when diode 1148 is off. Diode 1116 conducts and diode 1148 is off when the driver 1111 output is at Vol. Driver 1144 must be a CMOS schmitt trigger inverter (HCT14) in order to clean up the edges of the serial data line after diodes 1116 and 1148.

Still referring to FIG. 9D, there are eight dedicated upstream data lines that run from the Tx output of an NAC UART (e.g., UART 1149) to the Rx input of an NMC 911 DUART (e.g., DUART 1114). One of the lines is 905. The upstream data lines also are used for NAC presence detection by NMC 911.

Resistor 1122 is used to drive the receiver 1112 input to Vol (min) and to maintain Iil (min) when diode 1115 is off. Diode 1115 protects receiver 1112 from the −5 VDC generated by presence detection circuit 1031.

Diode 1115 also prevents reverse leakage current from receiver 1112 in tripping presence detection circuit 1031. Receiver 1112 must be a CMOS schmitt trigger inverter to clean up the edges of the serial data line after diode 1115. Resistor 115 1 is used to ensure Vih (min) on receiver 1112 when the 1143 driver output is at Voh. Resistor 1152 is used to detect the presence of an NAC by NMC 911 when the NAC's +5 VDC fuse has blown. This resistor provides the current necessary for the NAC presence detection circuit 1031 on NMC 911.

There are eight dedicated bi-directional flow control lines that run between NMC 911 and all 8 NACs. One such line is 904 shown in FIG. 9D. The UARTs used for management bus 901 automatically assert hardware flow control (without CPU intervention) when no more data characters can be received by the UART's receiver, thus preventing data loss.

Devices 1119 and 1141 must be either open-collector or tristatable drivers. Line 904 is driven by both NMC 911 and NAC 605 at different time intervals. Resistors 1121 and 1150 are used to keep line 904 at +5 VDC when neither device 1119 nor device 1141 is driving to ground potential.

The flow control circuit for gateway NAC 605 is shown in FIG. 9E and includes receivers 1145–1146, an AND gate 1211, a D flipflop 1213 and a UART 1215, connected as shown. A similar flow control circuit is located in each of the other NACs.

Flow control line 904 is used by NAC 605 to flow control NMC 911 and is used by NMC 911 to flow control NAC 605 and the other NACs. To accomplish this bi-directional flow control on a single line, time division multiplexing is used. During one half of the NAC clock cycle, flow control information from NMC 911 is presented to NAC 605 and during the other half of the cycle, NAC 911 presents flow control information to NMC 605.

NAC 911 uses the flow control strobe line 908 to store the flow control information in a register. Line 908 is a common line to all NACs and is driven by NMC 911.

Referring to FIGS. 9D and 9F, NMC 911 can assert a hardware reset to individual or multiple NACs at any time during data transmission. NMC 911 might reset an NAC to remove it from service or because NMC 911 lost communications with it. The port which NMC 911 uses to reset an NAC is registered, allowing NMC 911 to hold an NAC in reset indefinitely, thus removing it from service.

Reset of an NAC is performed when NMC 911 asserts a −5 VDC signal on the downstream data lines. Both NAC and NMC driver or receivers are protected from the negative voltage with clamping diodes 1116 and 1148. Each NAC has a reset detection circuit which senses this negative voltage and asserts reset when detected. The −5 VDC reset signal can be asserted by NMC 911 when the downstream data line is at MARK or a SPACE condition (+5 V or ground potential). The reset signal out of the detection circuit is active high (Reset=+5 V.No Reset=Ground) and is located on conductor 1242.

NAC reset performs a hardware reset to all major integrated circuits on each NAC. This includes all components having a reset input. These devices are attached to the reset out of NAC reset detection circuit 1147.

NMC 911 uses presence detection to indicate if an NAC is installed or not. NMC 911 may use this detection method if it cannot communicate with a particular NAC. In an error scenario, such as a blown fuse on an NAC, NMC 911 will be capable of detecting presence. NMC 911 detects the presence of an NAC by selecting one of the eight upstream data lines (e.g., 905) through an 8:1 analog mux (not shown). After the mux has been set, a read port indicates the presence or absence of a selected NAC by detecting the current caused by the NAC driving the upstream data line. Session tear down is not required to detect presence, since NMC 911 can sample the line during data transfer. The 8:1 analog mux on NMC 911 is disabled while not detecting presence.

Referring to FIG. 9G, management token ring interface card 1301 is substantially identical to token ring interface card 671 and comprises a ring interface 1313, a ring buffer 1315, a token ring controller 1317, an AT buffer 1321 and an RS-232 port 1319 that are interconnected by busses 1325–1330 as shown. As shown in FIG. 2, bus 1337 is connected through a conventional modem 1341 to an analog telephone line T2. As will explained in detail later, modem 1341 can be used to manage server NAS1 via telephone line T2.

Figure 2A:
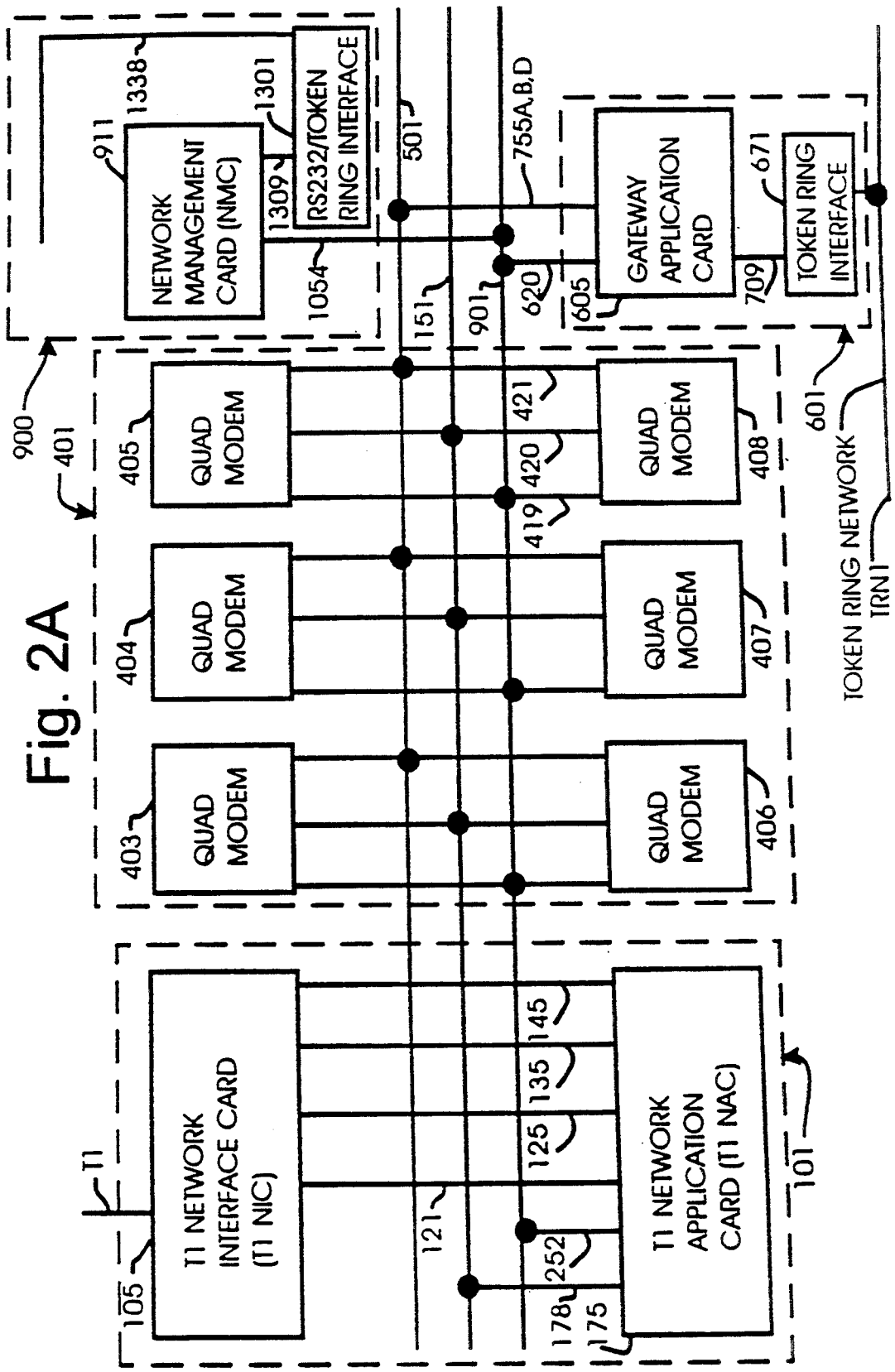
FIG. 2A is a schematic block diagram illustrating an alternative network arrangement for the modules shown in FIG. 2.

As shown in FIG. 2A, NMC 911 alternatively may be coupled to a management station through interface 1301 and another network 1338. Using network 1338 for management and TRN1 for communication is an important feature that speeds communications for some applications.

The operation by which server NAS1 processes incoming calls and outgoing calls will be described in connection with FIGS. 10 and 11 and in connection with the following terms:

Span line T1 refers to twenty-four 64 kilo bits per second DS0 channels on line T1 that are multiplexed into the 1.544 megabytes per second DS1 rate, with each DS0 channel carrying the digital telephone signal representation of an analog voice channel.

A trunk is a communications channel between two switching systems. In the context of this specification, the term "trunk" will refer to a single DS0 channel. A trunk group will refer to multiple DS0 channels.

A seizure is an off-hook signal transmitted on a previously idle trunk. Detection by T1 NAC 105 of a seizure will indicate an incoming call.

There are two types of wink signals: off-hook winks and on-hook winks. This specification will refer to an off-hook wink type only. An off-hook wink signal is the transition to the off-hook state from an on-hook state, then back to an on-hook state after a short period of time. T1 NAC 175 uses the wink signal as a response to a trunk seizure.

MF tones are made up of six frequencies that provide 15 two-frequency combinations for indicating digits 0–9 and KP/ST signals. In the feature group B (FGB) service, these tones will represent the called number (DNIS) and the calling number (ANI) information.

An answer is an off-hook signal from the called equipment and indicates that the call has been properly answered. This is the time at which telephone company billing begins. T1 NAC 175 is responsible for transmission of this signal when answering an incoming call and monitoring this signal when dialing an outgoing call.

A disconnect is an on-hook signal applied to the called trunk or from the called trunk which ends the call connection.

In-band signalling is signalling that uses the same path or DS0 channel as a customer's PCM data. The term "in-band signalling" is generic and can take the form of PCM encoded MF tones, rob bit signalling or call connection patterns.

E and M signalling is a traditional type of call signalling for an analog voice service from the telephone company's equipment. E and M type II signalling includes wink start and answer supervision. E and M is an acronym for ear and mouth, and in an analog service are the wires which provide the signalling path between the customer and the telephone company. The E and M wires are usually referred to as leads. In a typical plain-old-telephone service (POTS) application, the telephone company uses the E-lead to transmit signals towards the customer's equipment and uses the M-lead to receive signals from the customer's equipment. The E and M leads each provide two signalling states, on-hook and off-hook. When the analog phone line between the customer's equipment and the telephone company's equipment is idle, the E and M leads are in the on-hook state. The telephone company initiates a call towards the customer's equipment with a trunk seizure, an E-lead off-hook signal. A trunk seizure will persist until the end of the call. The customer's equipment will acknowledge the trunk seizure with an M-lead off-hook signal which is detected by the telephone company's equipment. This traditional method of signalling is one way the telephone company's equipment provides call signalling to the customer's equipment.

T1 equipment (i.e., DS-1 level service) does not use separate signalling leads to handle call signalling, but instead uses in-band signalling. The telephone company in-band signalling is accomplished by use of A and B signalling bits. The A and B signalling bits occur at the sixth and twelfth frames of every T1 superframe (SF) and occupy the least significant bit (LSB) position of all 24 DS0 channels during each of these frames. The telephone company's in-band signalling will overwrite or replace the LSB of the DS0 channel data. This method of in-band signalling is referred to as robbed bit signalling. The A and B signalling bits indicate what signalling state each T1 DS0 channel is in. The signalling bits translate directly to the E and M leads described above.

T1 NAC 175 can monitor and detect changes in signalling states of the A and B bits by use of T1 framer 229 which gives T1 NAC 175 the ability to detect incoming calls from the telephone company's switching equipment. The T1 framer 229 also provides T1 NAC 175 with the capability to transmit A and B signalling bit information for all 24 DS0 channels to the telephone company which allows T1 NAC 175 to respond to trunk seizures, answer calls and initiate disconnects.

Multifrequency (MF) in-band signalling is used to transmit numerical information and control signals from the telephone company's equipment to the customer's equipment. Quad modem cards 403–408 decide the MF tones during call set-up. The following paragraphs explain the MF tones, their sequences, and how they are used by the quad modem cards.

As shown in Table 1, MF signalling is made up of six frequencies which are paired up to make 15 MF tone combinations:

TABLE 1

| Frequencies in HZ | Digit or Control Signal |
| --- | --- |
| 700 + 900 | 1 |

TABLE 1-continued

| Frequencies in HZ | Digit or Control Signal |
| --- | --- |
| 700 + 1100 | 2 |
| 700 + 1300 | 4 |
| 700 + 1500 | 7 |
| 700 + 1700 | ST''' or ringback |
| 900 + 1100 | 3 |
| 900 + 1300 | 5 |
| 900 + 1500 | 8 |
| 900 + 1700 | ST' |
| 1100 + 1300 | 6 |
| 1100 + 1500 | 9 |
| 1100 + 1700 | KP |
| 1300 + 1500 | 0 |
| 1300 + 1700 | ST'' |
| 1500 + 170 | ST |

The MF tones indicate digits 0 through 9 and the special KP/ST tones indicate the beginning and end of an MF tone sequence. The MF sequence received from the telephone company in the case of a feature group B service is −KP+950+XXXX+ST. The 950-XXXX portion of the sequence represents the carrier access code (CAC) which is the number dialed by the originating caller. The MF tones will be transmitted by the telephone company 70 milliseconds (ms) after T1 NAC 175 responds to the trunk seizure. The duration of each MF tone in the KP+950+XXXX+ST sequence is as follows: (1) the KP signal length will be 90 to 120 ms; (2) the ST and digit signals will be 58 to 75 ms; and (3) the interval between all MF signals will be 58 to 75 ms. The entire MF sequences will have maximum duration of 1.32 seconds.

The MF tones represent the dialed 950 number from the originating caller. The 950 numbers can be used to indicate to modem module 401 what type of modulation scheme (or other configuration parameters) to use for that call. For example, numbers may be assigned the following modulation schemes:

(1) 950-1754 can be assigned to 300, 1200 and 2400 baud V.22 BIS asynchronous modulation used for credit card verification with limited training by modems 403–408;

(2) 950-1772 can be assigned to 300 to 14.4K baud using various asynchronous modulation schemes for any speed interactive asynchronous communications with normal training by modems 403–408; and (3) 950-1755 can be assigned to Bell 208B 4800 baud half-duplex synchronous modulation.

Assigning 950 numbers to certain modulation schemes reduces the time quad modem cards 403–408 will spend training on the modulation scheme being sent from the calling modem, thus reducing the overall call connection time. Modem module 401 has the ability to execute a pre-configured AT command string based on the CAC.

The following section describes the process and signalling details of an incoming call, from call set-up and call connection, to call disconnect. This section will start with the processing sequence of an incoming call from the telephone company by T1 NAC 175 for a typical scenario of a feature group B with E and M signalling, wink start and answer supervision. A description of how the in-band signalling sequences between T1 NAC 175 and the quad modems 403–408 are accomplished, and how the connections between the telephone company and the modems are completed is summarized in FIG. 10.

Server NAS1 is capable of enabling full duplex data communication between all of computers C1–C12 and C13–C24 (FIG. 1) simultaneously. The communication between any pair of computers C1–12 and C13–24 is handled in the same manner. As a result, an explanation of the communication between computer C1 and computer C13 also explains simultaneous communication between other pairs of computers C1–C12 and computers C13–C24.

Assume computer C1 initiates a call to computer C13. Processor FEP1 has the capability of routing calls placed to a particular telephone number to an assigned one of computers C13–C24. Computer C1 provides call set-up information, including the telephone number assigned to computer C13, and digital data signals representing digital data. Assume that computer C13 is available on number 950-XXXX. Modem M1 converts the set-up information and digital data to analog telephone signals on line A1. Network TC1 converts the signals to digital T1 telephone signals. The telephone company network TC1 then initiates a call to T1 NAC 175 via span line T1. Assume that the T1 channel receiving the call is assigned to modem 447 (FIG. 7).

Figure 10:
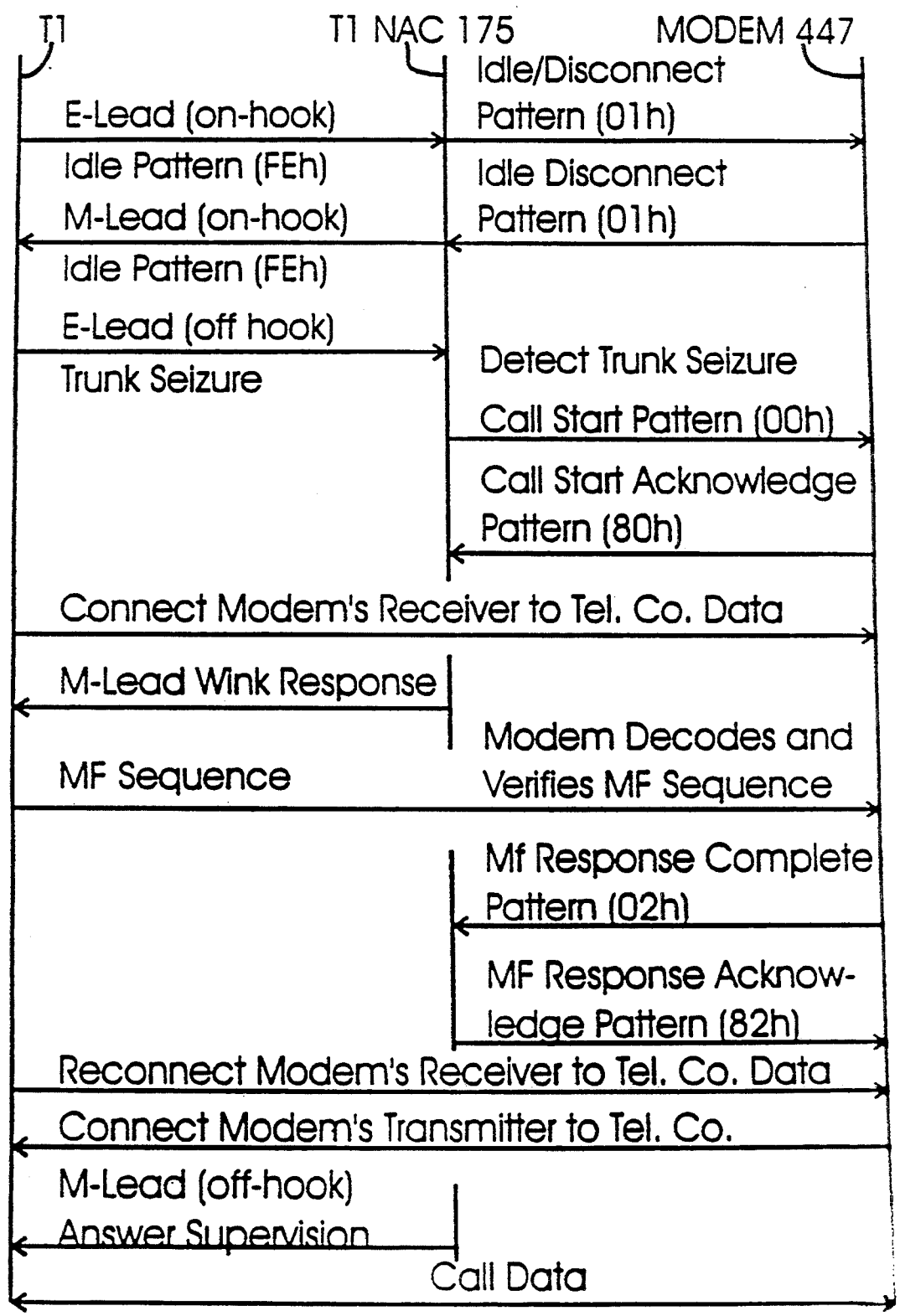
FIG. 10 is a flow diagram showing the processing of an incoming call from telephone company network TC1 by the network access server shown in FIG. 1.

FIG. 10 shows call set-up signals flowing from line T1 to T1 NAC 175 and data signals being transmitted between line T1 and modem 447. The remaining signals shown in FIG. 10 are call control signals.

The trunk is considered to be in the idle state when not in a call connection. During the idle state, the telephone company is transmitting E-lead on-hook (via A and B signalling bits) and T1 NAC 175 is transmitting M-lead on-hook. The modem assigned to that trunk (modem 447) is not connected to the telephone company at this time. T1 CPU 241 has programmed time/space switch 203 to transmit the idle/disconnect pattern (01 h) to modem 447 via TDM bus 151 and idle pattern (FEh) to the telephone company via bus 230, T1 framer 229 and line interface unit 123. Modem 447 is in the idle condition transmitting the idle/disconnect pattern to T1 NAC 175 and waiting to receive the call start pattern (00 h) from T1 NAC 175. T1 CPU 241 monitors (via unit 123, framer 229 and bus 230) for the E-lead off-hook signal from the telephone company which initiates a call set-up sequence.

Switch 203, bus 230 and TDM bus 151 (FIG. 3) offer a unique advantage for processing incoming and outgoing calls. T1 CPU 24 1 can control the transmission of call control signals to and from modem 447 via bus 230, switch 203 and TDM bus 151 during one time period. During another time period, T1 CPU 24 1 can communicate with line T1 via bus 230, T1 framer 229 and line interface unit 123. At other times, T1 CPU 241 can control the transmission of data between modem 447 and line T1 via TDM bus 151, switch 203, bus 203, framer 229, and line interface unit 123. The arrangement of components shown in FIG. 3 provides a fast and economical technique for processing both incoming and outgoing calls.

The call set-up sequence begins with a trunk seizure. The trunk seizure is done by the telephone company equipment transmitting an E-lead off-hook signal (FIG. 10). The seizure is shown in FIG. 11 on the E-lead line. Using T1 framer 229 to detect the off-hook state of the E-lead, T1 NAC 175 debounces and verifies the trunk seizure within 40 ms from the time it was received by T1 CPU 241.

Once T1 CPU 241 has determined that the E-lead seizure is valid, it uses an in-band signalling pattern to notify modem 447 via bus 230, switch 203 and TDM 151. T1 CPU 241 programs the call start pattern (00 h) into time/space switch 203 which begins transmitting this pattern to modem 447 via TDM bus 151 during every frame of the TDM bus time-slot. At this time, modem 447 is not connected to the telephone company trunk and is not receiving telephone company data or transmitting data to the telephone company. T1 CPU 241 expects a call start acknowledge pattern (80 h) from modem 447 and uses time/space switch 203 to detect this pattern via TDM bus 151 and bus 230. T1 CPU 241 requires approximately 16 ms to detect and verify any pattern from a modem received via TDM bus 151, switch 203 and bus 230.

When T1 CPU 241 has detected and verified the acknowledge pattern (80 h) from modem 447, it programs time/space switch 203 to connect the modem's receive data to the incoming telephone company trunk via TDM bus 151, bus 230, T1 framer 229 and line interface unit 123. The modem's transmit data is not connected to the telephone company trunk at this time. The modem's receive data connection is made in preparation for the receipt of the MF tone sequence from the telephone company. Before the wink is sent to the telephone company, 210 ms must elapse from the time of the E-lead seizure (time period B, FIG. 11). T1 CPU 241 then sends the M-lead wink response pulse, which is a transition to the off-hook state for 200 ms, then back to on-hook (time period C, FIG. 11).

If no acknowledge pattern is received from modem 447 after 4 seconds, T1 CPU 241 records the event and will not respond to the telephone company. If a time-out occurs, T1 CPU 241 programs time/space switch 203 to transmit idle/disconnect pattern (01 h) to modem 447. At this time, no connection between the telephone company and modem 447 exists and modem 447 should return to the idle condition during which modem 447 transmits the idle/disconnect pattern (01 h) to T1 NAC 175.

Figure 11:
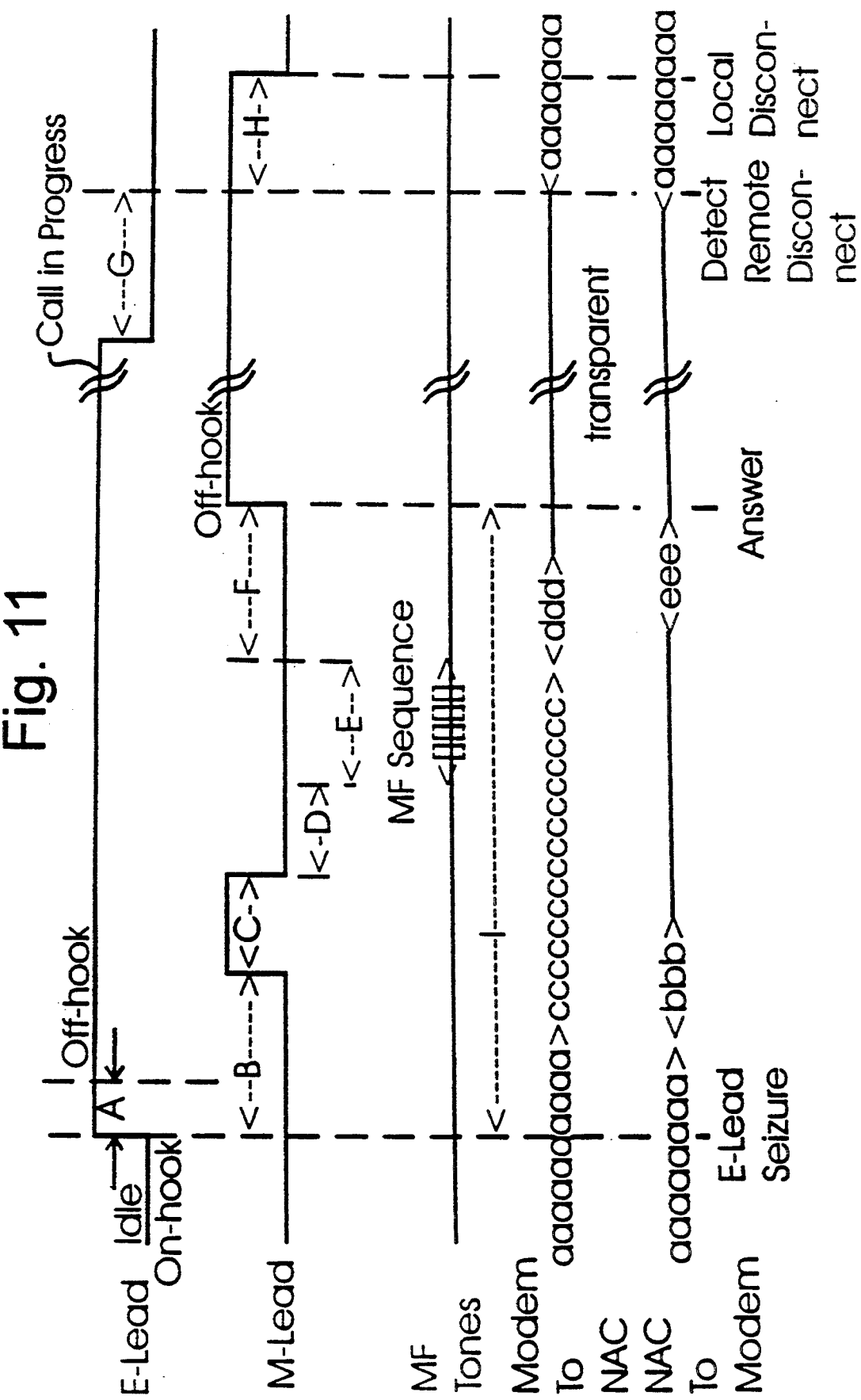
FIG. 11 is a timing diagram showing the processing of an incoming call of the type shown in FIG. 10.

The telephone company begins transmitting the MF sequence 70 ms after it detects the M-lead wink (time period E, FIG. 11). Modem 447 receives the KP+950+XXXX+ST MF sequence (via unit 123, framer 229, bus 230, switch 203 and TDM bus 151) during a time period of approximately 1.32 seconds. Immediately after modem 447 detects the ST tone, it verifies the entire MF sequence, and then transmits the MF complete pattern (02 h) to T1 NAC 175. T1 CPU 241 detects the MF complete pattern (via TDM bus 151, switch 203 and bus 230) in approximately 16 ms and programs time/space switch 203 to send the MF complete acknowledge pattern (82 h) to modem 447 via TDM bus 151. T1 CPU 241 transmits the 82 h pattern for 20 ms and then completes the connection of modem 447 to the telephone company by programming time/space switch 203 to connect TDM bus 151 to bus 230, framer 229 and line interface unit 123. The connection between the modem and the telephone company is now complete and the modem begins to look for incoming carrier from calling modem M1. Full duplex communication between modems M1 and 447 is enabled.

Modem 447 demodulates the digital telephone signals received over TDM bus 151 to form corresponding digital network bus signals comprising packets of digital timespaced signals representing data and call setup information without creating analog telephone signals. The digital network bus signals are transmitted over packet bus 501 in a manner to be described. The network bus signal is processed and transmitted over network TRN1 to computer C13 for display.

Conversely, digital network signals originating at computer C13 and over packet bus 501 are modulated by modem 447 to form digital telephone signals without creating analog telephone signals. The unique operation of modem processor 473 which enables this result is described in connection with FIG. 28. The modulated digital telephone signals are transferred over TDM bus 151, through switch 203 and over bus 230 to T1 framer 229. The framed signals are multiplexed in unit 123 and transmitted to line T1 (FIG. 3).

The digital telephone signals are converted to analog form by network TC1 and are reconverted to digital data signals by modem MI. The digital data signals are then displayed by computer C1.

If for any reason modem 447 cannot verify the MF sequence, it will not respond to T1 NAC 175 with the MF complete pattern (02h). After 4 seconds, T1 CPU 241 times out and programs time/space switch 203 to transmit idle/disconnect pattern (01h) to modem 447. T1 CPU 241 does not respond to the telephone company in this case and maintains the M-lead on-hook state and logs the event. The telephone company network time-outs when it does not receive the answer signal on the M-lead (FIG. 11) from T1 NAC 175 and also logs the event. The telephone company returns the trunk to the idle state and is ready to assign another call.

After the connection of the telephone company to modem 447 is complete, T1 NAC 175 must respond with an answer signal (M-lead off-hook) (FIG. 10). This will indicate to the telephone company that the call connection should be completed. However, there must be a 100 ms delay from the time the ST tone is received by the modem to the time the answer signal is transmitted to the telephone company. Once the signal delay condition is satisfied, T1 CPU 241 programs T1 framer 229 to transmit the M-lead off-hook answer signal to the telephone company. The M-lead off-hook answer signal persists for the duration of the call connection. At this point, the call connection is complete and the calling modem M1 and modem 447 begin communicating.

From the information given in FIG. 11, assuming a 1 DNIS address digit is received, a time period of 0.910 seconds normally is required from the time of trunk seizure to the time modem 447 actually is connected to the telephone company. The maximum time for such a connection is 2.37 seconds.

A timing diagram of the dial-in call processing shown in FIG. 10 is provided in FIG. 11. The E-lead, M-lead and MF tones signals shown in FIG. 11 appear in digital form on line T1. The letters used in FIG. 11 have the following meanings and time durations in which "Typ" means typical:

| Symbol | Description | Min | Typ | Max | Units |
| --- | --- | --- | --- | --- | --- |
| A | E-lead seizure debounce | 40 | 45 | 50 | ms |
| B | Seizure to wink delay | 210 | 220 | 230 | ms |
| C | Off-hook wink duration | 140 | 200 | 210 | ms |
| D | Wink to multifrequency (MF) delay | 70 | 100 | | ms |
| E | Multifrequency (MF) sequence duration | 0.26 | .47 | 1.4 | sec |
| F | ST tone to call answer supervision delay | 100 | 110 | 120 | ms |
| G | E-lead on-hook call disconnect delay | 300 | 315 | 320 | ms |
| H | E-lead on-hook to M-lead on-hook delay | | 20 | 50 | ms |
| I | Trunk seizure to answer supervision | 0.78 | 1.1 | 4.0 | sec |

| Symbol | Pattern |
| --- | --- |
| a | Idle/disconnect pattern (01h) |
| b | Call start pattern (00h) |
| c | Call start acknowledge pattern (80h) |
| d | MF complete pattern (02h) |
| e | MF complete acknowledge pattern (82h) |

Figure 12:
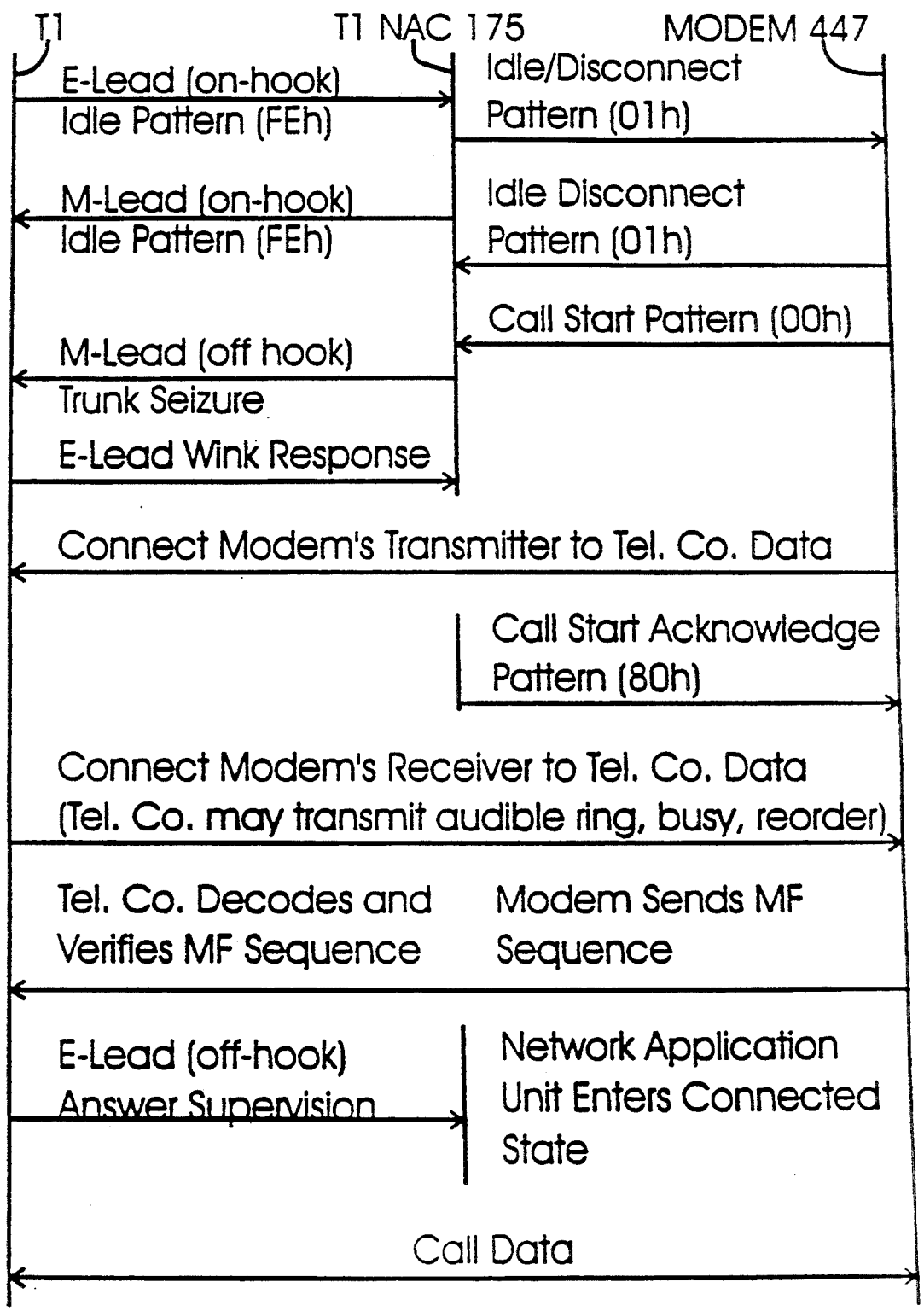
FIG. 12 is a flow diagram illustrating the processing of an outgoing call from the network access server shown in FIG. 1.

FIG. 12 depicts the event flow between the telephone company line T1 and modem module 401 when making an outgoing tone dial call from modem module 401. For this example, assume that modem 447 (FIG. 6) receives network digital data signals from computer C13 that are to be sent to computer C1 (FIG. 1). The digital data from computer 13 is received via network TRN1 (FIG. 1) and packet bus 501 (FIG. 6). Modem 447 also receives from computer C13 call setup information including the telephone number assigned to computer C1.

FIG. 12 illustrates the call set-up MF sequence transmitted by modem 447 that results from the call set-up information received from computer C13. FIG. 12 also illustrates the call control signals transmitted between T1 NAC 175 and modem 447, as well as the call control signals transmitted from T1 NAC 175 to line T1.

Dial out calls begin with line T1, T1 NAC 175 and modem 447 in an idle state. Modem 447 initiates the call by sending a "call start" pattern (00 h) to T1 NAC 175, which in return seizes the M-lead to the telephone company via switch 203, bus 230, framer 229 and unit 123 (FIG. 12). The telephone company winks back with the E-lead response at which time T1 NAC 175 creates the data path from modem 447's transmitter to the telephone company via TDM bus 151, switch 203, bus 230, framer 229 and unit 123. When the data path is complete, T1 NAC 175 sends the "call start acknowledge" pattern (80 h) to modem 447 to tell modem 447 that it can send the MF tones to dial the phone number. After the MF tones are sent and the telephone company is beginning to actually dial the call, modem 447 will end the "MF complete" pattern to T1 NAC 175. This informs T1 NAC 175 to connect modem 447's receive data path to the telephone company. At this time, the telephone company may send call progress information, such as audible rings, busy or reorder messages.

Assuming that the call is successfully completed, the telephone company responds with an E-lead off-hook, answer supervision. T1 NAC 175 temporarily breaks the data path to modem 447 and send the "MF complete acknowledge" pattern to inform modem 447 that the call has been answered, and then reconnects modem 447's receiver to the telephone company so that full duplex call data communication can take place between modem 447 and modem M1.

Figure 13:
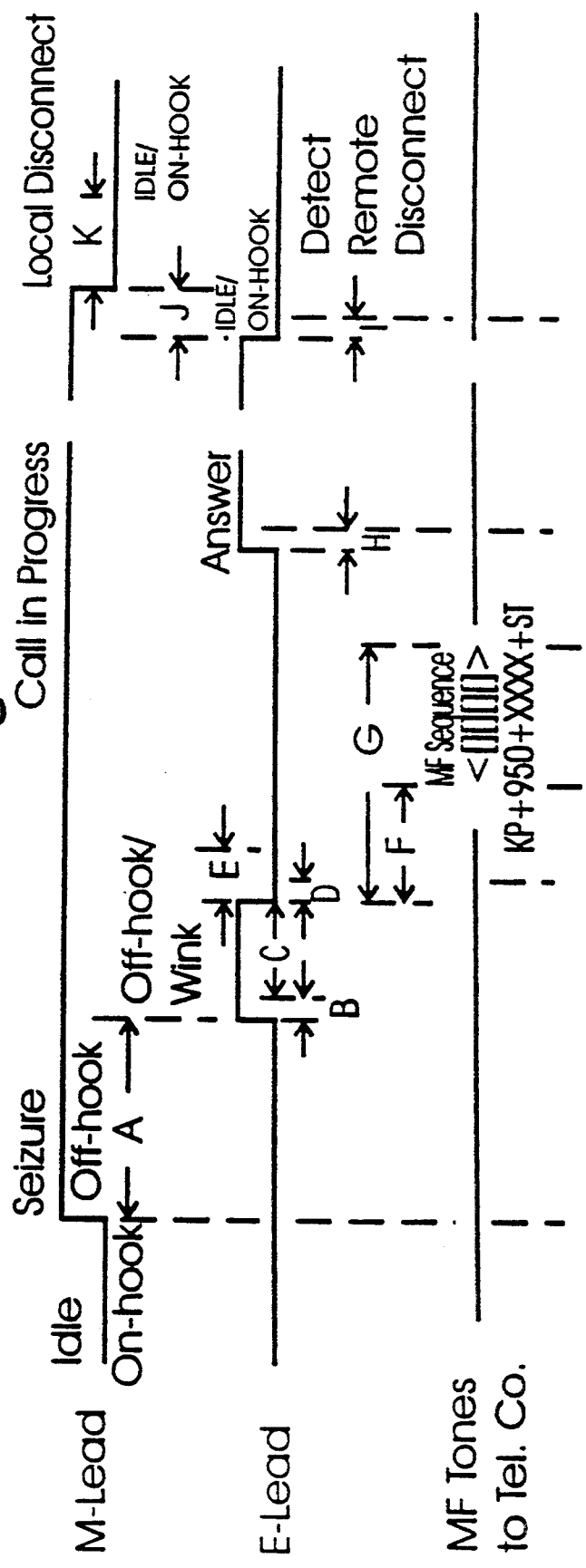
FIG. 13 is a timing diagram showing the processing of an outgoing call of the type shown in FIG. 12.

FIG. 13 depicts the timing associated with making a dial out call. The overall actual time to make a dial out call depends on several factors, including the telephone company's response times and the number of digits and speed of the dialed telephone numbers. The M-lead, E-lead and MF tones signals shown in FIG. 13 appear in digital form on line T1.

The letters used in FIG. 13 have the following meanings and time durations in which "Typ" means typical:

| Symbol | Description | Min | Typ | Max | Units |
|---|---|---|---|---|---|
| A | E-lead seizure to wink | 210 | 220 | 5000 | ms |
| B | E-lead start of wink debounce | 40 | 45 | 50 | ms |
| C | Off-hook wink duration | 70 | 200 | 290 | ms |
| D | M-lead end wink debounce | 40 | 45 | 50 | ms |
| E | Wink to multifrequency delay | 70 | xx | xx | ms |
| F | Wink to first MF digit | 0 | xx | 5 | sec |
| G | Wink to last MF digit | 0 | xx | 15 | sec |
| H | E-lead answer debounce | 40 | 45 | 50 | ms |
| I | E-lead disconnect bounce | 40 | 45 | 50 | ms |
| J | E-lead disconnect to M-lead disconnect | 300 | xx | xx | ms |
| K | M-lead on-hook call disconnect delay | 250 | xx | xx | ms |

| Symbol | Pattern |
|---|---|
| a | Idle/disconnect pattern (01H) |
| b | Call start pattern (00H) |
| c | Call start acknowledge pattern (80H) |
| d | MF complete pattern (80H) |
| e | MF complete acknowledge pattern (82H) |
| f | Call fail pattern (xxH) |

After the telephone company goes on-hook to disconnect the call at time I of FIG. 13, the billing clock is not stopped until (1) T1 NAS 175 goes on-hook for 250 ms (time K); or (2) a time-out period of up to 20 seconds elapses. If the called CPE returns the trunk to an off-hook condition before either of the above events occur, the call will not be disconnected.

Hits are defined as on-hook to off-hook to on-hook pulses lasting less than 70 ms. These should not be taken as answers or winks.

In-band tones, such as audible ringing, busy and reorder, may be present from the telephone company after the address digits have been received by the telephone company. These in-band signals can be used by modem 447 to hang up the call if it is busy or reorder.

A standard interpolation algorithm enables modem processor 473 to convert the digital telephone signals on line T1 into the form which can be used for demodulation by existing modems of the type used in quad modems 403–408. Another standard interpolation algorithm enables modem processor 473 to convert its standard modulated signals into a form which can be transmitted on Line T1. A modem processor controlled by such an algorithm offers an advantage because it enables modulation and demodulation without converting digital telephone signals to analog telephone signals while saving the time and expense of designing new modem circuits for modulation and demodulation.

Communication between modem module 401 and gateway application card 605 is achieved over packet bus 501 which uses packet data switching, a method of sending data in messages, or packets, only when there is data to transmit. That is, blocks of data are transmitted asynchronously. Packet bus 501 only requires a virtual connection, and does not require a dedicated amount of bus bandwidth to support a connection. Therefore, the available bandwidth can be statistically shared among many devices. Packet bus 501 does not use up any bandwidth when it has nothing to send, and it uses the full bus bandwidth when it does have something to send.

Packet bus 501 is a statistical time division multiplexed bus. The word "statistical" denotes that the bus bandwidth is not necessarily divided evenly among the devices accessing the bus, but is provided on demand. This type of bus makes use of the fact that data is bursty, and therefore, all of the devices will usually not have data to send at the same time.

Packet bus 501 can make use of the maximum available bandwidth at a given time, as opposed to an assigned fraction of the available bandwidth, as is done on a TDM bus 151. On TDM bus 151, data is transmitted synchronously in assigned time slots that occur periodically at regular time intervals. Due to the bursty nature of data communications, the data throughput of packet bus 501 typically is many times larger than that of a synchronous circuit switched time division multiplex bus, such as TDM bus 151, with the same bit transfer rate.

Packet bus 501 is a transport mechanism between modem module 401 and gateway application card 605. The available bandwidth is divided among modems that currently have data to transmit across bus 501.

Packet bus 501 conforms closely to the ANSI/IEEE NuBus standard and is a 32-bit parallel bus operating at 10 MHz. It utilizes a multiplexed address/data bus and supports multiple bus masters, with deterministic arbitration and fairness. The maximum data transfer rate of bus 501 is 40 Mbytes per second. Because the address and data busses are multiplexed, the actual data transfer rate is slightly lower than the maximum value. Bus 501 supports block transfers, where a block transfer is an address cycle followed by multiple data transfer cycles. A typical data transfer rate over a 32-bit implementation of bus 501 using 64 byte block transfers is approximately 36 Mbytes per second.

Data is passed between the modems on cards 403–408 and gateway card 605 in frames. Each modem accessing the bus 501 has a data link layer entity that builds/parses the outgoing/ingoing frames. The function of the data link layer is to provide a transparent interface between multiple devices over packet bus 501. The data link layer removes the details of this interface from upper layers that need to access the bus. The data link layer segments data into messages or frames. Each frame is transmitted across bus 501 via a NuBus block transfer. Exactly one frame is transmitted per block transfer.

The data link layer offers a connectionless service, and a connection oriented service, with sliding window flow control as well as physical layer flow control. The connection oriented services are a subset of the IEEE 802.2 type 2 connection oriented logical link control (LLC). All signals on packet bus 501 conform to section 3.3.2 "DC and AC specifications of packet bus signals" of ANSI/IEEE Std. 1196–1987 (NuBus).

Packet bus 501 uses the following data transfer signals:

PB_AD0-31 (address and data) (active low) These lines are multiplexed to carry address information at the beginning of a transaction and 8, 16 or 32 bits of data later in the transaction.

PB_TM0-1 (transfer mode) At the beginning of the transaction, these two lines indicate the type of transaction being initiated. Later in the transaction, the responding module uses them to indicate success or failure of the requested transaction.

PB_START (start signal) (active low) This signal is asserted at the start of a transaction, and also initiates an arbitration contest. Additionally, when asserted in conjunction with the PB_ACK line, it denotes special non-transaction cycles called attention cycles.

PB_ACK (transfer acknowledge) (active low) The usual use of this signal is to indicate the ending cycle of a transaction. It has a special use if asserted during the same cycle with PB_START.

The functions of IEEE 802.2 used by the data link layer are link setup and recovery, parameter negotiation and sliding window flow control. All data transferred over packet bus 501 resides in a layer 2 frame. Each frame consists of header 15 information, followed by user data. The following types of frames are implemented:

| Frame Types | Abbreviation | 802 Equivalent |
| --- | --- | --- |
| Link-Start | LS-Frame | SABME |
| Link-Start Acknowledge | LSA-Frame | UA |
| Unnumbered Info. Frame | UI-Frame | UI |
| Information Frame | I-Frame | I |
| Exchange Identification | XID-Frame | XID |
| Receiver Ready (RR) | RR-Frame | RR |

The link-start and link-start acknowledge flames are used in data link set-up and recovery. XID flames are used, once the link is brought up, for parameter negotiation. The I-flame contains send and receive sequence numbers, Seq(s) and Seq(r), used to implement layer 2 flow control. The UI frames do not have sequence numbers and are not subject to flow control, so they are normally used for sending data that cannot be flow controlled. The purpose of the RR frame is to acknowledge flames that a card has previously received.

Any device that wishes to communicate with another device over packet bus 501 must set up a connection (or link) to the device with which it wishes to communicate. The link is accomplished using IEEE 802.2 link set-up procedures. Each device maintains a variable for each link that it is defined to have, indicating the condition of the link.

The link-start frame and the LSA frame are used to bring up a link between two cards (e.g., modem card 408 and gateway application card 605). Once the link is up, the cards are said to be in the link negotiation state. Before the link is brought up, several link state variables have to be initialized. Link setup procedures begin by setting Seq(s) and Seq(r) to 0, then the ACK_WAIT, and ACK timers should be stopped. At this point, an LS or an LSA frame can be sent.

When modem 447 on card 408 wishes to bring up a link with gateway card 605, it sends a link-start (LS) message to card 605 and starts the ACK_WAIT timer. When card 605 receives the link-up message, it responds with a link start acknowledge (LSA) frame. At the time that card 605 sends the LSA frame, it marks the link between the two cards as up. At the time that modem 447 receives the LSA, it marks the link as up.

If the ACK_WAIT timer were to time-out while waiting for the LSA, modem 447 would send another link-start frame. Modem 447 continues to send link-start frames indefinitely until it receives an LSA or until it is told to stop.

If a device is not waiting for an LSA-frame on a particular link, and it receives an LSA from that link, it discards the frame and the link state will not change.

When a device is in the "link up" condition and it receives a link-state frame, it should mark this line as down; initialize all link state variables and timers; return all user data buffers to the free buffer pool; send an LSA-frame and mark this link as up.

If modem 447 sends a link-start frame to card 605 and is waiting for an LSA response, but instead receives a link-start frame from card 605, then modem 447 proceeds as though it had received an LSA-frame from card 605 and marks the link as up.

In the event of any unrecoverable error that occurs affecting the communications between modem 447 and card 605, the device detecting the error marks the link as being "down" in the link state variable. The device then initiates the above link setup procedures.

When a link is brought from the link up state to the link down state, all link state variables must be reset and all buffers currently queued in either direction for this link are returned to the free buffer pool. Additionally, link setup procedures attempt to reestablish a link several times (as determined by the session down counter) before informing any third party equipment. The default value of the session down counter is 3.

After a card (e.g., modem card 408) sends an LS frame, it will start the "LS retransmission timer." This timer is initialized with the value of the system parameter LS_Timer. The value of LS_Timer is programmable. The default value is 5 seconds. Modem 447 continues to send LS frames indefinitely, or until it receives an LSA response.

The "link-up" state has two sub-states, the "link negotiation" state and the "information transfer" state. The link negotiation state is entered at the same time that the link up state is entered. While in the link negotiation state, each card sends an XID frame to the other card (e.g., card 605) in the link. The XID frame contains information that is used to get both cards in a link to agree on certain parameters, such as receive window size and packet bus block size. After a card in the link negotiation state has sent and received an XID frame, it stores the various agreed upon parameters and marks the link as being in the information transfer state. The parameters agreed upon after exchanging XID frames cannot be changed during a communication session. For example, the receive window size the packet bus block size, once agreed upon by both cards, cannot be changed during the session. A new session has to be started to change these parameters.

When a card is in the link negotiation state, it sends an XID frame to the other end of the link, start the ACK_WAIT timer and waits for an XID frame from the other end of the link. If the card has not received a valid XID frame before the ACK_WAIT timer expires, the link is marked down and link setup procedures begin again. When it receives an XID, it stops the ACK_WAIT timer.

When a link state changes to "information transfer," all link state variables must be reset. These variables include Seq(s); Seq(r); ACK timer; and ACK_Wait timer. When a device is in the "link up" condition and it receives a link-start frame, it must reset all above link state variables and return all user data buffers to the free buffer pool. It then sends an LSA-frame to the device that sent it the link-up frame.

In the information transfer state, two types of information frames can be exchanged: unnumbered information (UI) frames and information (I) frames. UI frames provides connectionless datagram services. They are not sequenced and are not subject to flow control. I frames provide connection oriented services. They are sequenced and are subject to flow control.

UI frames are used to send messages that cannot be flow controlled, such as disconnecting a call immediately, since the UI frames are not subject to flow control as are I (information) frames. For example, if for some reason card 605 is flow-controlled by a modem, there is no way for card 605 to send an immediate disconnect command to the modem using an I frame. However, card 605 can send the immediate disconnect command to the modem in a UI frame without being flow-controlled.

All cards reserve some buffers for accepting UI frames, separate from those allocated for the I frames. In this way, when a card exhausts all its buffers allocated for the I frames and flow-controls its communicating partner, there are reserved buffers to accept UI frames. The buffers allocated for UI frames are used in a circular fashion, i.e., they are circular buffers. Each card has at least one buffer large enough to accept one UI frame. In this situation, the one and only buffer will be overwritten every time a UI frame arrives, i.e., it is a one-buffer circular buffer.

Once a link is in the information transfer state, the NAS1 cards use a sliding window protocol to implement flow control. A sliding window protocol uses sequence numbers and acknowledgements to keep track of how many more packets a card can transmit to another card before it will begin to overflow that card. In this way, a transmitting card can throttle itself before it wastes CPU time trying to transmit a message that a remote card will not be ready to receive.

In order to implement such a protocol, each I frame contains a "send sequence number," referred to as "Seq(s)." The current value of Seq(s) is inserted into every I frame transmitted. After storing Seq(s) into the current outgoing I frame, Seq(s) will be incremented by one. The send sequence number is not incremented past 127, but instead wraps around to 0. Every acknowledge frame has a "receive sequence number," referred to as "Seq(r)." When a card sends a frame with a receive sequence number field, the value used for Seq(r) will be the value of the last received I frame's Seq(s) +1. That is, the Seq(r) that is sent to a card identifies the next expected frame, not the last received frame. Both I flames and RR flames have Seq(r) fields and can be used to acknowledge previously received flames. A set of sequence numbers (as well as all other state variables) is kept for each link that a card may have. Before gateway card 605 can have 24 links with modem module 401, it must maintain 24 sets of link state variables.

In a sliding window protocol, many received I frames can be acknowledged with one RR frame or one I frame. Therefore, a card can send multiple frames to another card without receiving any acknowledgement. So that a card cannot overflow another card with data, each card is restricted to a maximum number of outstanding (i.e., unacknowledged) I frames that it may transmit to another card. This maximum number of outstanding frames that a card may receive is called the "receive window size" (or just the "window size"). When two cards have a link with each other, each card must inform the other card of its receive window size. The window sizes need not be the same in both directions. The value of the window size is determined by a card's ability to buffer data that it receives from the packet bus. If cards A and B are communicating, and if card A has a much larger buffering capacity than card B, card B should be allowed to send more outstanding frames to card A than card A is allowed to send to card B. Therefore each side of a link may have a different receive window size. Additionally, a card (e.g., card C) may choose to use one receive window size for a link with card A, and a different receive window size for a link with card B.

The default window size is 8 and the maximum allowable value for the window size is 127. A card determines if it can transmit an I frame to another card by subtracting its local value of Seq(s) (the sequence number of the next I frame that the card will send) from the last received Seq(r). If the result is less than the window size, then that card may transmit another I frame. A card can always transmit an RR frame regardless of the number of outstanding I flames.

If a card wishes to use a window size other than the default, it must inform the other side of the link by including the receive window size in the XID frame. The XID frame must be sent between cards during the link negotiation state.

Two timers are implemented to support the sliding window protocol. The ACK timer is used to tell a card when it must send an RR frame to another card. There will be one ACK timer for each link that a card has (e.g., gateway card 605 can have up to 24 ACK timers, one for each modem channel). The ACK timer is started whenever a card receives an I frame and the ACK timer is not already running. A card stops the ACK timer for a link whenever it acknowledges all received frames, by sending an I frame or an RR frame. When the ACK timer for a link expires, a card sends an RR frame with a current value of Seq(r) across the link.

The other timer that a card must maintain for each link is the ACK_WAIT timer. This timer tells a card how long to wait for an acknowledgement before resetting the link. This timer is started when an I frame is transmitted if it is not already running. This timer is stopped whenever the most recently transmitted I frame is acknowledged. This timer is restarted whenever a frame is received with Seq(r) greater than the last received Seq(r), and Seq(r) < Seq(s) of the most recently transmitted I frame. When this timer expires, the link is marked as down and link setup procedures are started.

The default values are ACK timer=100 ms and ACK wait timer=500 ms. If a device determines that it must temporarily stop receiving frames, it will write a 1 to the "NAK all frames" register. When this register contains a 1, the packet bus control logic forces a NAK (with a status, indicated by PO_TM0 and PB_TM1, of "try again later") on the first cycle following the start cycle for every frame it receives. The control logic continues to do this until CPU 633 clears the "NAK ALL frames" register.

Since the sliding window protocol provides flow control capability, the physical layer flow control is normally exerted when a card has some catastrophic errors that prevent it from receiving any data. Therefore, physical layer flow control should be treated as severe an error as a bus error. For this reason, a card experiencing physical layer flow control marks the link as down, initializes all link state variables and timers, and starts the link set-up procedure again to recover the link.

Figure 14:
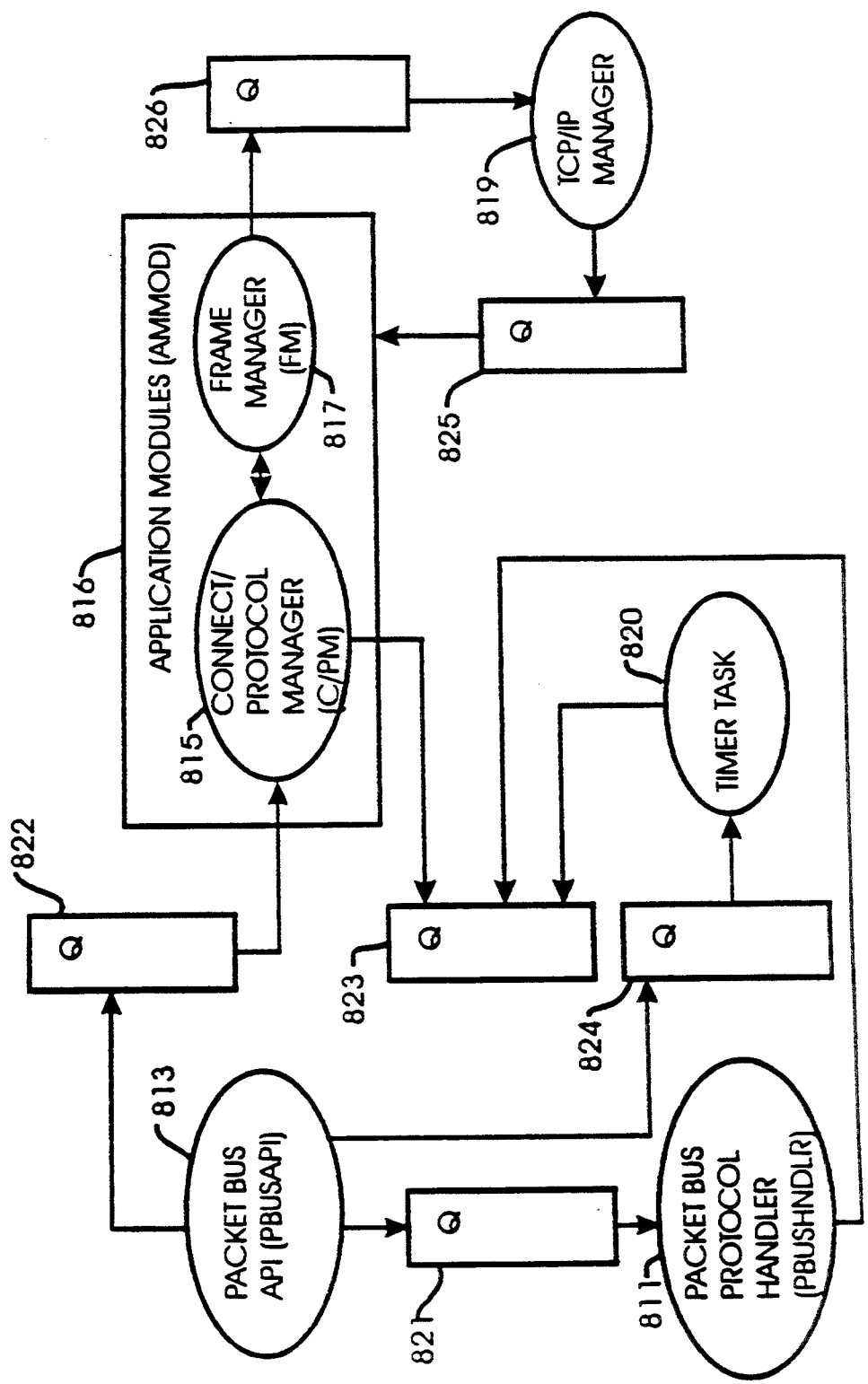
FIG. 14 is a flow diagram illustrating computer programs that control the flow of signals between the modems and the token ring network shown in FIG. 2.
Figure 14A:
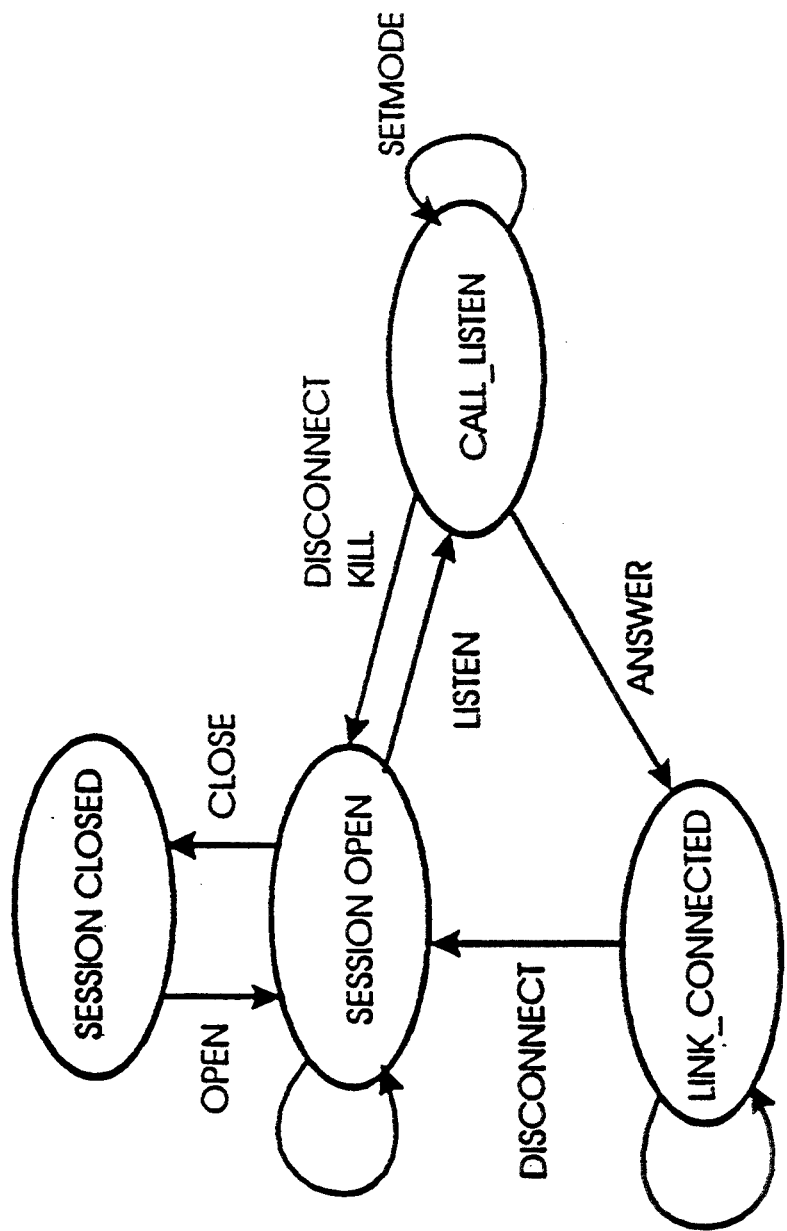
FIG. 14A is a state transition diagram showing various states of the pBusAPI program illustrated in FIG. 14.
Figure 14B:
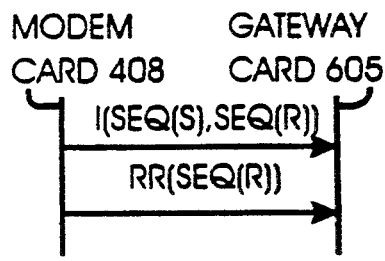
FIG. 14B is a flow diagram showing notation for I frames and RR frames illustrated in FIGS. 14C and 14D.

FIG. 14B depicts I frames with the send sequence and receive sequence numbers shown within parentheses. FIG. 14B shows how sequence numbers are illustrated in FIGS. 14C–14E.

Figure 14C:
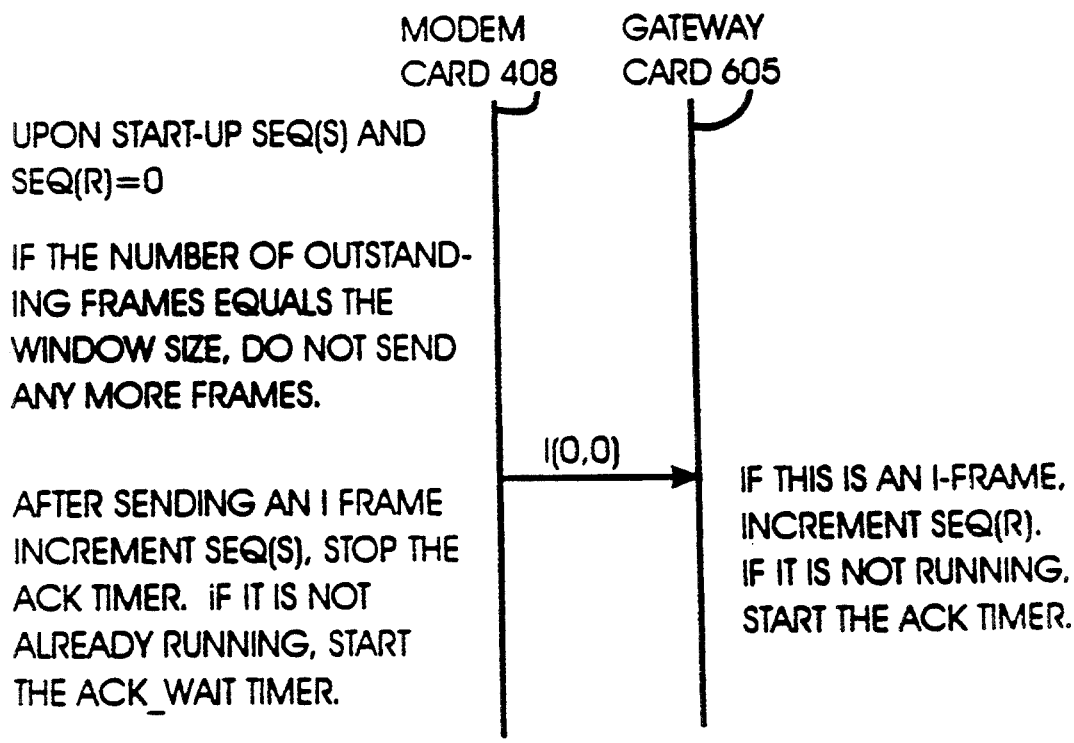
FIG. 14C is a flow diagram showing functions performed to maintain flow control between the modems and the gateway card illustrated in FIG. 2.

FIG. 14C is a call flow diagram depicting the functions performed on each card to maintain flow control between gateway card 605 and modem cards, such as card 408.

Figure 14D:
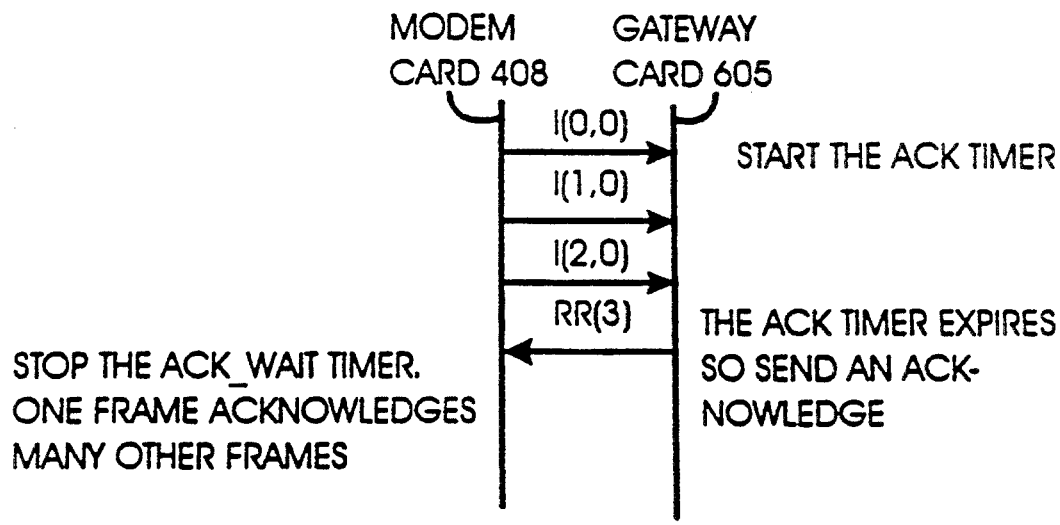
FIG. 14D is a flow diagram showing signal traffic between the modems and the gateway card illustrated in FIG. 2.
Figure 14E:
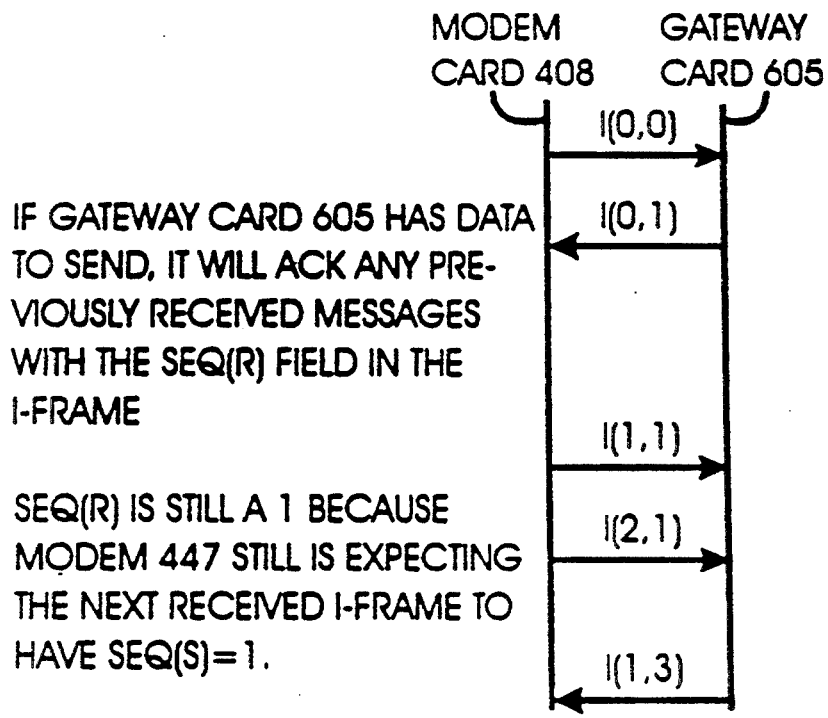
FIG. 14E is a flow diagram showing data flowing in both directions between the modems and the gateway card illustrated in FIG. 2.

FIG. 14D is a data flow diagram depicting the traffic between gateway card 605 and modem 447 on card 408. Data is predominantly moving from modem 447 to gateway card 605. After receiving the first I frame, gateway card 605 starts the ACK timer if it is not already running. If gateway card 605 has no I frames to send, the ACK timer expires and card 605 sends an acknowledge. The receive sequence number is 3, indicating that the next expected sequence number in a received frame is 3.

In FIG. 14D, gateway card 605 sends an RR frame with a receive sequence number of 3. Seq(r) identifies the next expected I frame, not the last received I frame. If gateway card 605 would have sent an I frame to modem 447, card 605 would have used the value of 3 for Seq(r).

In FIG. 14D, if gateway card 605 had sent an RR with Seq(r)<3, modem 447 would not have stopped the ACK_WAIT timer. Instead, the modem would have restarted the ACK_WAIT timer. The ACK_WAIT timer is only stopped when a frame is received with Seq(r) one greater than the Seq(s) of the last transmitted frame.

FIG. 14E is a flow diagram in which data is transversing the packet bus in both directions between modem 447 and gateway card 605. Although gateway card 605 starts the ACK timer when it receives an I frame, the timer never expires. This is because the timer is stopped when gateway card 605 sends an I frame to modem 447. Because the I frame serves as an acknowledgement, there is no longer a need to send another acknowledge frame after the I frame is sent.

Assume that computer C24 is the host computer for network TRN1. The operation of the network control module 601 and packet bus 501 will be described in connection with the following terms and abbreviations:

pBusHndlr is a software subsystem performing packet bus data link level handling functions;

pBusAPI is a software subsystem handling all application interfaces to the packet bus via pBusHndlr;

CM is a connect manager that establishes initial modem connection and monitors incoming calls;

PM is a protocol manager that configures a modem before answering an incoming call;

C/PM is a connect/protocol manager;

FM is a frame manager, a software subsystem handling the packing and unpacking of TRN1 bound frames, implemented as FTM and FRM;

FTM is a frame transmit manager, a portion of the FM subsystem handling the transmission of data from gateway application card 605 onto TRN1, implemented as a stand alone task;

FRM is a frame receive manager, a portion of the FM subsystem handling the receiving of data from TRN1 onto card 605, implemented as a stand alone task;

AIC is an administration information cluster, a global information reservoir accessible by all card 605 software subsystems;

PAP is a packet bus application protocol—used by card 605 to communicate with external devices over packet bus 501; and AMMODs are application modules, including C/PM and FM. (AMMOD is synonymous with "application module.")

Referring to FIG. 14, there are six key software subsystems making up most of the software functional requirement of gateway application card 605: packet bus handler (pBusHndlr) 811, packet bus/modem API (pBusAPI) 813, connect/protocol manager (C/PM) 815, frame manager (FM) 817, a transmission control protocol/internet protocol (TCP/IP) manager 819 and a timer task 820. The subsystems control sequencing by reading and leaving messages in software queues 821–826, and are implemented as independent tasks, functioning as service providers, service users, or both. C/PM 815 provides services to the TRN1 host computer C24, utilizing the services of pBusAPI 813 and FM 817. pBusAPI 813 provides services to AMMODs 816, which include C/PM 815, utilizing the services of pBusHndlr 811. FM 817 provides services to AMMODs 816, utilizing the services of the TCP/IP manager 819. Timer task 820 initiates timer service requests to start "blocked" operations. These "blocked" operations are functions waiting on shared resources or functions that have been delayed a specific amount of time.

Assume a phone call intended for computer C13 comes in from computer C1 on line T1 through modem 447 (FIG. 6). Server NAS1 is capable of enabling simultaneous communication between any pair of computers from the groups C1–C12 and C13–C24. Therefore, the communications between any of the pairs of computers is apparent from a description of the communications between computer C1 and computer C13.

Modem 447 demodulates the call setup information generated by computer C1 and sent to line T1 to form a digital network bus signal message comprising packets of digital time-spaced signals representing the call setup information. The call setup information includes signals that identify computer C13 as the destination for the data from computer C1 and also identify the telephone number assigned to computer C1. The message is transmitted over packet bus 501 in order to notify pBusAPI 813 (FIG. 14) by sending the message through pBusHndlr 811. After the message is assembled and stored in queue 822 (FIG. 14), pBusAPI 813 translates and analyzes the message and extracts the calling phone number (i.e., the phone number assigned to computer C1). This phone number is passed along to C/PM 815, which uses it to determine the line and modem protocol for modem 447.

The protocol management (PM) function of C/PM 815 looks up the protocol parameters associated with the phone number of computer C1 and configures modem 447 by passing command requests to pBusAPI 813. Any of the set mode parameters described later in this specification can be used to set the modem standard used by modem 447. This is a unique advantage which enables precise software control over modem module 401 and enables any of the modems to be tailored to handle an incoming call efficiently. pBusAPI 813 translates the commands into PAP format and sends them to modem 447 via pBusHndlr 811. Modem 447 then demodulates the telephone signals from computer C1 according to the modulation standard dictated by the set mode parameters transmitted to modem 447 over packet bus 501.

In the same manner, responses from modem 447 are relayed to C/PM 815. If the configuration was successful, C/PM 815 picks up the phone call by requesting modem 447 to answer it. If modem 447 answers the call successfully, C/PM 815 notifies TRN1 host computer C13 that a call is successfully connected and data is forthcoming. To do so, C/PM 815 sends a start-of-call message to frame manager (FM) 817, which in turn converts it to a special format before forwarding the message to host computer C13.

The TCP/IP protocol is employed to provide an end-to-end connection-oriented path to host computer C13. TCP/IP is a common protocol used for local area networks, such as network TRN1. Other protocols could be substituted for TCP/IP. At the point of transmission, FM 817 submits the TRN1 bound message to TCP/IP manager 819 which puts the data from computer C1 into the TCP/IP protocol used by network TRN1. The data is routed to computer C13 by TRN1 and can be displayed or processed by computer C13. Since modem 447 now links computer C1 with computer C13, data is transmitted from computer C13 to computer C1 by the reverse of the above-described procedure. This completes an incoming call cycle.

For an outgoing call, assume that a phone call comes in from computer C14 on TRN1 that is to be routed to computer C2. The network TRN1 signals from computer C2 are in the TCP/IP protocol used by TRN1. In general, the network signals comprise blocks of digital time-spaced signals that include call setup information identifying a phone number associated with computer C14 and a phone number associated with computer C2. After the network signals are stored in queue 822 (FIG. 14), pBusAPI 813 translates and analyzes the signals and extracts the calling phone number. This phone number is passed along to C/PM 815 which uses it to determine the modem protocol for modem 448 which is assigned to the call. The protocol management (PM) function of C/PM 815 looks up the protocol parameters associated with the phone number of computer C14 and configures modem 448 by passing command requests to pBusAPI 813. Any of the set mode parameters described later in this specification can be used to set the modem standard used by modem 448. pBusAPI 813 translates the commands into PAP format and sends them to modem 448 via pBusHndlr 811. Modem 448 then modulates the network signals from computer C14 according to the modulation standard dictated by the set mode parameters transmitted to modem 448 over packet bus 501. In the same manner, responses from modem 448 are relayed to C/PM 815. If the configuration was successful, C/PM 815 picks up the phone call by requesting modem 448 to answer it. If modem 448 answers the call successfully, C/PM 815 asks modem 448 to notify computer C2 that a call is successfully connected and data is forthcoming. Computer C2 is notified by standard EIA signalling used by standard modems over an RS-232 bus.

Computers C2 and C14 are linked via line T1 and telephone network TC1 in the manner previously described. Computer C2 and C14 have full duplex communication capability via modem 448.

For both incoming and outgoing calls, communications between network TRN1 and the modems operate under control of pBusAPI. For purposes of the following description, it is assumed that modem 447 (FIG. 6) is assigned to the communication. The pBusAPI subsystem reads from its own message queue 822 to obtain commands from AMMOD, converts the commands to a PAP message, and sends it to the modem by placing the PAP message in pBusHndlr's message queue 821. pBusAPI also reads modem responses in PAP message format from its own queue 822, converts them to DE equivalent before replying to AMMOD 816.

pBusAPI tasks are created at system initialization. There is a pBusAPI task for every C/PM task. Each pBusAPI task and C/PM task has its own message queue 822 to receive input. To output messages, a task simply sends them to the destination task's input queue.

pBusAPI subsystem 813 is partitioned into three major functional code segments: parameter verification, command processing and protocol conversion. pBusAPI verifies the parameters loaded into a command control blocks (CCBs) by checking for null pointer values and range checking for non-pointer parameters.

Protocol conversion is required because pBusAPI and an associated modem communicate using the packet bus application protocol (PAP). The CCB is converted into a PAP message before sending to a modem. Likewise, responses from the modem are translated from a PAP message.

Response from the modem is treated as the equivalent of a device end (DE) completion status signal, which is intercepted by pBusHndlr and placed into pBusAPI's input message queue 822. Upon receipt, pBusAPI examines the completion status (DE), translates it to the appropriate DE value, and relays it back to the application. There is an acknowledgement for every PAP frame sent by pBusAPI to modem 447 via pBusHndlr 811.

For a token ring network application, PAP is used to facilitate communications over packet bus 501 with the modems on quad modem cards 403–408. Source and destination address is supplied by the pBusHndlr subsystem, through which all data traffic between the modem and pBusAPI will channel.

A PAP frame (hereafter referred to as a PAP message) is made up of two sections: (1) the control word, and (2) the indicators section. Layout of the indicators section can be any mixture of indicators only, individual indicators followed by infobytes, and individual indicators followed by instance specifier and/or infobytes.

Modem commands are translated to a PAP message by pBusAPI and submitted to pBusHndlr for transmission.

AMMOD submits a command request in the form of a command control block (CCB)(FIG. 15). Multiple CCBs can be chained together and submitted. However, pBusAPI will traverse the chain and execute each CCB individually. Some modem commands require additional parameters, which are contained in a command block extension (CBX) (FIG. 16), linked to the CCB. To specify even more parameters, a formatted option block (FOB) is used, the address of which is stored in CBX.

To submit modem commands, AMMOD invokes the library function nas_modem_request0, which performs parameter checking on the CCBs before posting it on pBusAPI's queue 822.

The CCB and CBX blocks illustrated in FIGS. 15–16 include the following parameters:

| Command Control Block (CCB) | |
|---|---|
| Parameter | Description |
| CCB_CMD | Command code |
| CCB_MID | Target modem ID (1–24) |
| CCB_FLAGS | CCB specific flags (CCB_CHAIN indicates CCB_CB is populated) |
| CCB_CBX | Pointer to a CBX (six bytes long) |
| CCB_CCB | Pointer to next CCB in chain |
| CCB_DE | Completion (device end) status |
| CCB_RC | Reason code |
| CCB_RCX | Additional reason code |

-continued

Command Control Block (CCB)

| Parameter | Description |
| --- | --- |
| CBX_FLAGS | CBX specific flags (CBX_FOBV indicates CBX_BUFF_FOB is populated. CBX_CRC generates CRC for outgoing data when CCB_CMD is XMIT.) |
| CBX_BCOUNT | Byte count (number of bytes: (1) to receive; (2) to send, or (3) size of FOB) |
| CBX_BUFF_FOB | Pointer to XMIT/RECV buffer or FOB |
| CBX_TIMER1 | Timer 1 in milliseconds |
| CBX_TIMER2 | Timer 2 in milliseconds |

Each number preceded by plus signs on the left side of FIGS. 15-16 (as well as FIGS. 19-22 and 25-27) identifies the starting bit of the word described to the right of the number.

After the CCB parameters and any associated CBX parameters are validated for accuracy, the CCB command is entered into the pBusAPI state machine for processing. A CCB command is an external event to pBusAPI that may alter its internal operating state, and may trigger event notification to other subsystems. The state transition table in the next section of this specification details the handling of each event/command.

Referring to FIG. 14A, the pBusAPI subsystem operates in four basic states: SESSION_OPEN, SESSION_CLOSED, CALL_LISTEN and LINK_CONNECTED. Upon start-up, pBusAPI is at the SESSION_CLOSED state. At this state, no command from AMMOD is processed, except for the OPEN command. Upon receiving an OPEN command, pBusAPI will attempt to establish a connection to the modem through packet bus 501 via pBusHndlr 811. If successful, pBusAPI returns a successful DE value to AMMOD 816, and changes state to SESSION_OPEN. When a CLOSE command is received from AMMOD, pBusAPI tears down the packet bus connection and changes state to SESSION_CLOSED.

In the SESSION_OPEN state, a logical session has been established with AMMOD and a packet bus connection has been established with a modem. However, in this state, the modem does not have an active phone connection setup and therefore any AMMOD request to transmit data over the link will be denied. AMMOD issues the LISTEN command to cause pBusAPI to change to the CALL_LISTEN state.

In the CALL_LISTEN state, pBusAPI is expecting a phone call to come in through the modem (e.g., modem 447) and thus establish an active phone connection. For pBusAPI to be in this state, it is most likely that AMMOD has just issued a CCB chain in the command order of LISTEN, SETMODE and ANSWER. The SETMODE command will not be carried out until a call has arrived at the modem. Not until the modem has successfully configured itself with the SETMODE parameters values will the incoming call be picked up. The ANSWER command will take the call off-hook and cause pBusAPI to change to LINK_CONNECTED state.

In the LINK_CONNECTED state, an active end-to-end phone connection has been established between a remote calling endpoint (e.g., computer C1) and the pBusAPI task. This enables AMMOD to transmit and receive data over the modem link to and from the remote endpoint. This modem link will remain connected until AMMOD disconnects it, thereby hanging up the phone connection. At this point, pBusAPI will return to the SESSION_OPEN state.

In summary, pBusAPI uses the state transition table to (1) enforce the order and context of AMMOD command requests; and (2) flag invalid responses from the pBusHndlr. A state transition, if necessary, will always occur after a CCB command is successfully executed. This means transition takes place only after the modem replies with a PAP message indicating successful execution. A state transition is represented by event/action. The event triggers the transition. The action is taken as a result of the event. No action is taken if none is specified.

After translating a modem command (CCB) into PAP indicators and packing them into a PAP message, the PAP message is chopped contiguously into fragments. Each fragment is the same size as a packet bus packet. These packets are then chained together into a list and submitted to pBusHndlr for transmission to the modem over packet bus 501. In the same manner, the modem replies in the form of a PAP message, but the message is chopped into a linked list of packets. When pBusAPI requests to receive a message, pBusHndlr satisfies the request by returning a pointer to the linked list received. It is up to pBusAPI to reassemble the list into a PAP message.

A messaging mechanism is used for interfacing between pBusHndlr and pBusAPI. Except for one instance, pBusAPI always initiates a request message, and pBusHndlr always replies with an acknowledgement message. pBusHndlr guarantees acknowledgement. Therefore, there is no timeout required between request and acknowledgement messages.

Although not explicitly drawn, all pBusHndlr service request and acknowledgement message structures are preceded by four signature bytes. The content of the signature bytes is populated by the client process executed by host computer C24 and remains transparent to pBusHndlr for all message exchanges. Usage of the signature bytes includes message sequence number, asynchronous message identification and related parameters.

Whenever pBusHndlr replies with an acknowledgement message, it means that the requesting message has been transmitted over the packet bus and received by the modem. However, this does not imply acceptance of the request by the modem. The status as a result of modem execution is returned as a separate PAP message.

pBusHndlr provides datalink layer services over packet bus 501 and an application interface similar to the Berkeley sockets. After a connection is made, pBusAPI receives a designated socket descriptor with which pBusHndlr can identify all future data traffic between a particular pBusAPI task and a modem.

Figure 17:
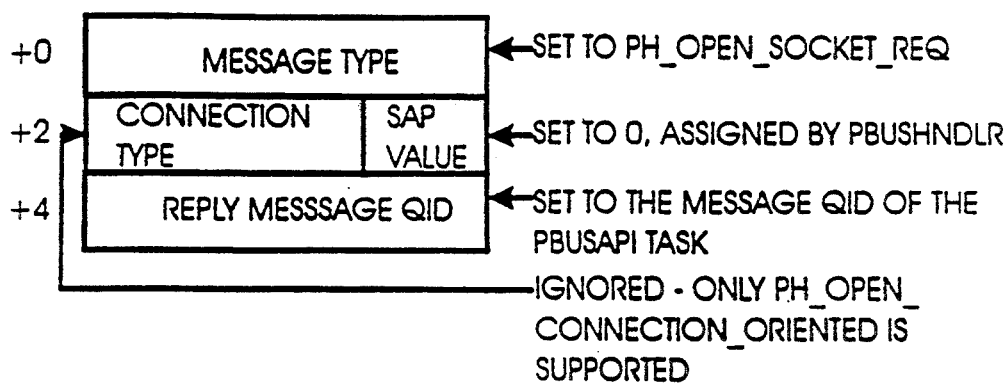
FIG. 17 is a schematic diagram of a preferred form of message type PH Open Socket$_{13}$Req used by the programs illustrated in FIG. 14.
Figure 18:
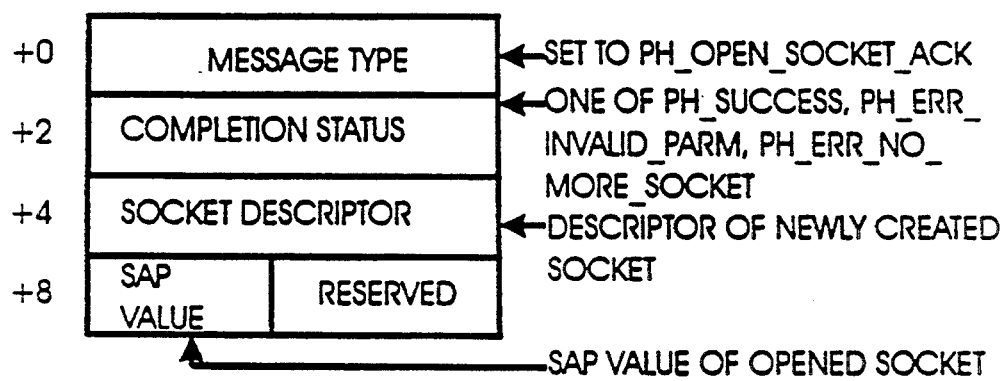
FIG. 18 is a schematic diagram of a preferred form of message type PH Open Socket$_{13}$Ack used by the programs illustrated in FIG. 14.
Figure 19:
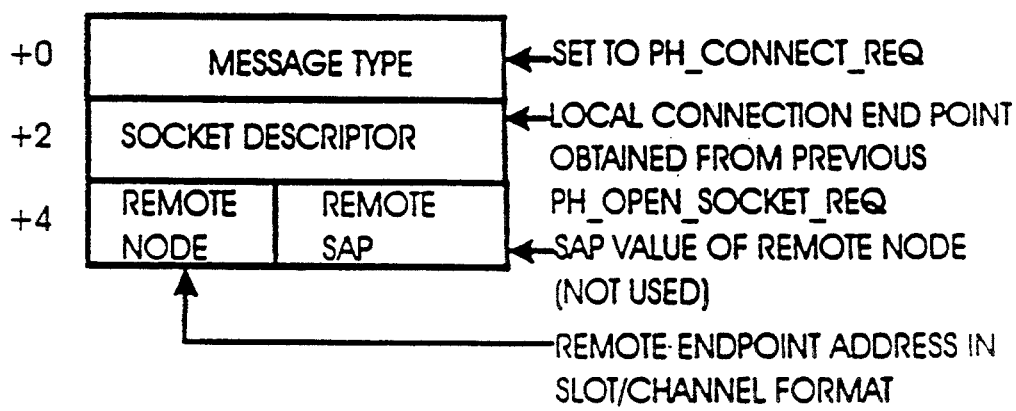
FIG. 19 is a schematic diagram of a preferred form of message type PH Connect_Req used by the programs illustrated in FIG. 14.
Figure 25:
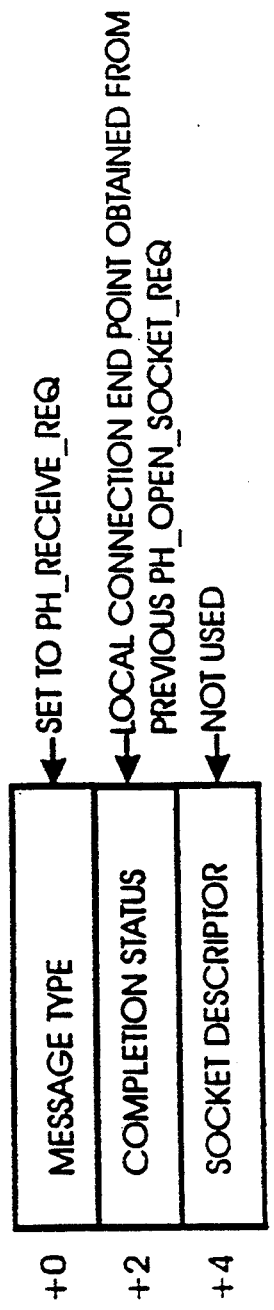
FIG. 25 is a schematic diagram of a preferred form of message type PH Receive_Req used by the programs illustrated in FIG. 14.
Figure 26:
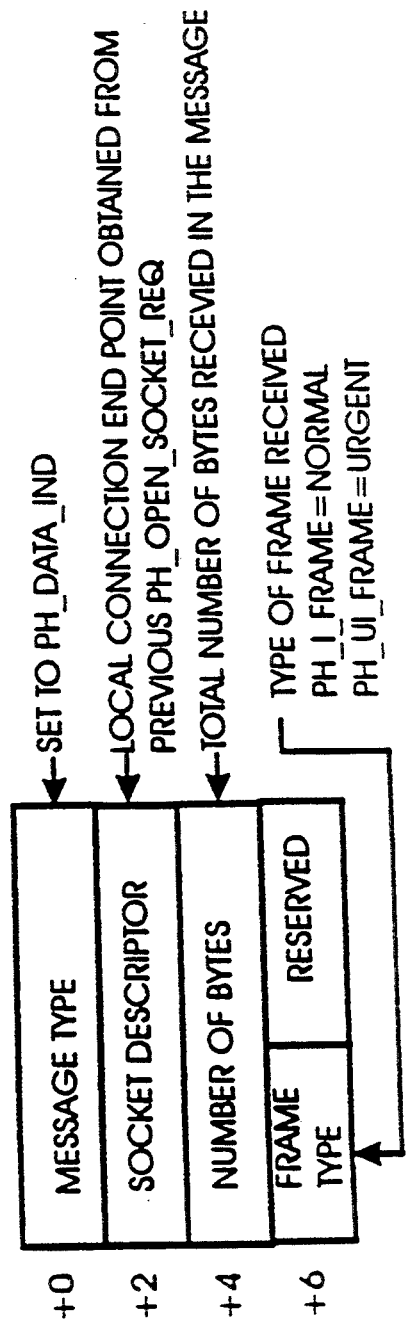
FIG. 26 is a schematic diagram of a preferred form of message type PH Data_Ind used by the programs illustrated in FIG. 14.

Creating a connection with a modem that is ready for sending and receiving data involves two steps. First, a socket needs to be created. This is done by sending pBusHndlr a 'PH_OPEN_SOCKET REQ' message (FIG. 17) and receiving a 'PH_OPEN_SOCKET_ACK' reply (FIG. 18). Second, a physical data pipe needs to be established. This is done by sending pBusHndlr a 'PH_CONNECT_REQ' (FIG. 19) and receiving a 'PH_CONNECT_ACK' reply (FIG. 20).

Once a socket connection is established, data can be transmitted over packet bus 501 by sending a PH_SEND_REQ (FIG. 21) message to pBusHndlr and receiving a PH_SEND_ACK reply (FIG. 22). An element of the PH_SEND_REQ message header (FIG. 21) points to the list of linked fragments of a PAP message, which contains the data to be sent onto the modem link. The memory occupied by the linked list is allocated by pBusAPI when it builds the list. pBusHndlr has the responsibility to free this memory when it is done with the linked list.

A PAP message is fragmented into packet bus packets before submitting to pBusHndlr for transmission. pBusHndlr also presents messages received from the modem to pBusAPI in the same manner.

FIGS. 23-24 depict the fragmentation process employed by pBusAPI. FIG. 23 assumes a PAP message length of 1024 bytes and a packet bus packet size of 256 bytes. FIG. 23 shows a sample PAP message (not to scale) being fragmented. FIG. 24 shows how the fragments created by the process of FIG. 23 are linked together. The 'data_ptr' shown in FIG. 24 is passed to pBusHndlr in the 'data pointer' field of the PH_SEND_REQ message (FIG. 21).

Figure 27:
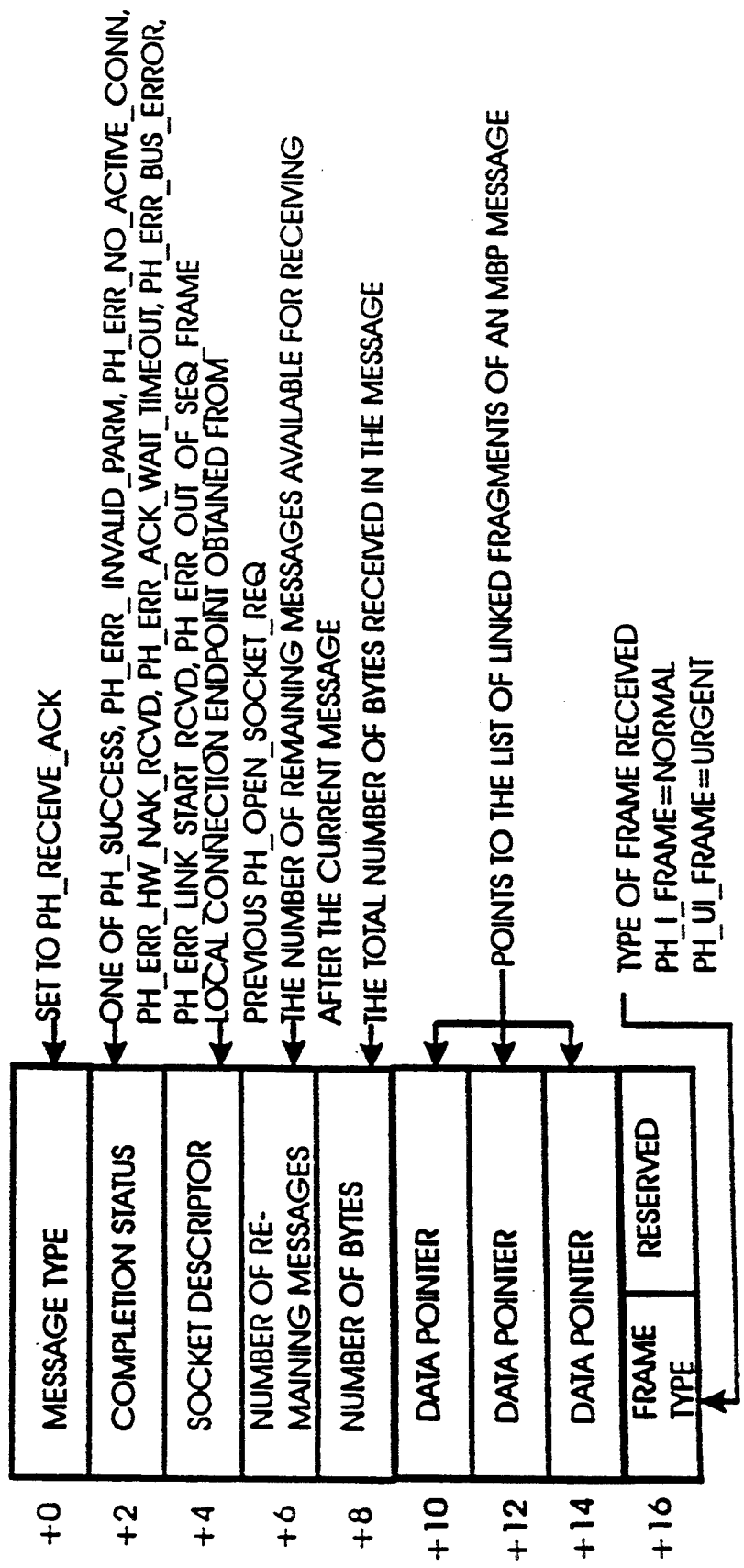
FIG. 27 is a schematic diagram of a preferred form of message type PH Receive_Ack used by the programs illustrated in FIG. 14.

Once a socket connection is established, data can be received from the modem over packet bus 501 by sending the PH_RECEIVE_REQ message (FIG. 25) to pBusHndlr and receiving a PH_RECEIVE_ACK reply (FIG. 27). An element of the PH_RECEIVE_ACK message header points to the list of linked fragments of a PAP message, which contains the data that was received by the modem. The memory occupied by the linked list is allocated by pBusHndlr when it builds the list. pBusAPI has the responsibility to free this memory when it is done with the linked list.

If no data was available for receiving at the time of the request, pBusHndlr immediately returns a PH_RECEIVE_ACK message (FIG. 27) with the number of received bytes set to zero. Later on when a complete message has arrived from the modem, pBusAPI submits a PH_RECEIVE_REQ message (FIG. 25) to receive it. Commands from AMMOD are translated to equivalent PAP command indicators. In most cases, there will not be a one-to-one mapping and AMMOD requires a series of PAP indicators to carry out the command. The following is the mapping between the two command sets:

| Modem API Commands | PAP Control Word |
| --- | --- |
| OPEN | none |
| CLOSE | none |
| XMIT | DATA |
|  | EVENT |
|  | SERVICE REQUEST |
| RECV | DATA |
|  | QUERY |
| LISTEN | EVENT |
| ANSWER | SERVICE REQUEST |
| DISCONNECT | SERVICE REQUEST |
| FLUSH | none |
| KILL | none |
| SETMODE | CONFIGURE |

When 'none' appears in the PAP indicator column, the corresponding modem API commands are for logical operations between AMMOD and pBusAPI and have no effect on the modem.

All modem configuration indicators and their values can be sent in one or more unsolicited PAP messages under the CONFIGURE control word.

The following PAP command/indicators are sent to setup the default operating environment in the modem by pBusAPI upon start-up:

| PAP Indicators | Default Value |
| --- | --- |
| CALL_DESTINATION | Packet bus address of TRC at modem connection setup |
| MODEM_TDM_SLOT | Automatically determined by modem |
| DNIS_AT_STRING | None specified |
| BILLING_DELAY | 2 seconds |
| ANSWER_TONE_DURATION | Minimum allowed by CCITT (2600ms) |

In addition, pBusAPI configures the modem with the default SETMODE values listed below at start-up. The modem is also configured on a per call basis by C/PM. Whenever a pBusAPI returns a successful LISTEN to C/PM, it replies with a SETMODE command containing all the modem parameter values to be configured. The SETMODE parameters are translated to PAP indicators using the following mapping. If no value is specified for a SETMODE field, the default value is used.

| SETMODE Parameters | PAP Indicators |
| --- | --- |
| SOB_PARITY | LNK_PARITY |
| SOB_EVENP | LNK_PARITY |
| SOB_FDX | LNK_DUPLEX |
| SOB_CRC12 | BCC_TYPE |
| SOB_CRC16 | BCC_TYPE |
| SOB_LRC | BCC_TYPE |
| SOB_NRZI | LINE_ENCODING |
| SOB_AT | EXEC_AT_STRING |
| SOB_TRAIN | LNK_MODULATION |
| SOB_B103 | LNK_MODULATION |
| SOB_B212 | LNK_MODULATION |
| SOB_V22BIS | LNK_MODULATION |
| SOB_V32 | LNK_MODULATION |
| SOB_V32BIS | LNK_MODULATION |
| SOB_B208 | LNK_MODULATION |
| SOB_VFAST | LNK_MODULATION |
| SOB_MNPDEF | LNK_MNP |
| SOB_MNP4 | LNK_MNP |
| SOB_MNP5 | LNK_MNP |
| SOB_BIT | LNK_CHAR_SIZE |
| SOB_STOPB | LNK_STOP_BITS |
| SOB_ADT | EXEC_AT_STRING |
| SOB_STIMER | SYNC_INSERT_TIMER |
| SOB_ITIMER | INTER_CHAR_DELAY |
| SOB_COD | COD_CHAR |
| SOB_IDLE | IDLE_CHAR |
| SOB_FFLAG | FFLAG_CHAR |
| SOB_SYNC | SYNC_CHAR |
| SOB_BOB | BOB_CHAR |

The BOB parameter defines beginning-of-block character(s), i.e., character(s) prepended to a data block. The COD parameter defines change-of-direction character(s), i.e., character(s) appended to a data block. The FFLAG parameter defines framing flag character(s) used in bit-oriented protocols. The SYNC parameter defines a sync character (e.g., SYN in BSC). The IDLE parameter defines character(s) transmitted or received when no outgoing or incoming data is present.

Messages from a modem arrive via packet bus 501 through the pBusHndlr subsystem in PAP message format. These messages belong to one of two categories: (1) a response to a previous pBusAPI request, or (2) an unsolicited message notifying pBusAPI of an asynchronous event, such as RECVD_DATA.

In all cases, responses from the modem are translated to an equivalent DE value whenever applicable. pBusAPI puts this DE value in the 'DE' field of the corresponding CCB (CCB_DE)(FIG. 15). Additional return values are stored in fields CCB_RC and/or CCB_RCX as tabulated below. For all modem API commands not shown in the table, no CCB_RC nor CCB_RCX is returned.

| Modem Command | CCB_DE | CCB_RC | CCB_RCX |
|---|---|---|---|
| OPEN | AE | Failure reason code | n/a |
| CLOSE | AE | Failure reason code | n/a |
| XMIT | AE or NC | Failure reason code | Actual bytes sent |
| RECV | Error matrix | Error matrix | Error matrix |

Figure 28:
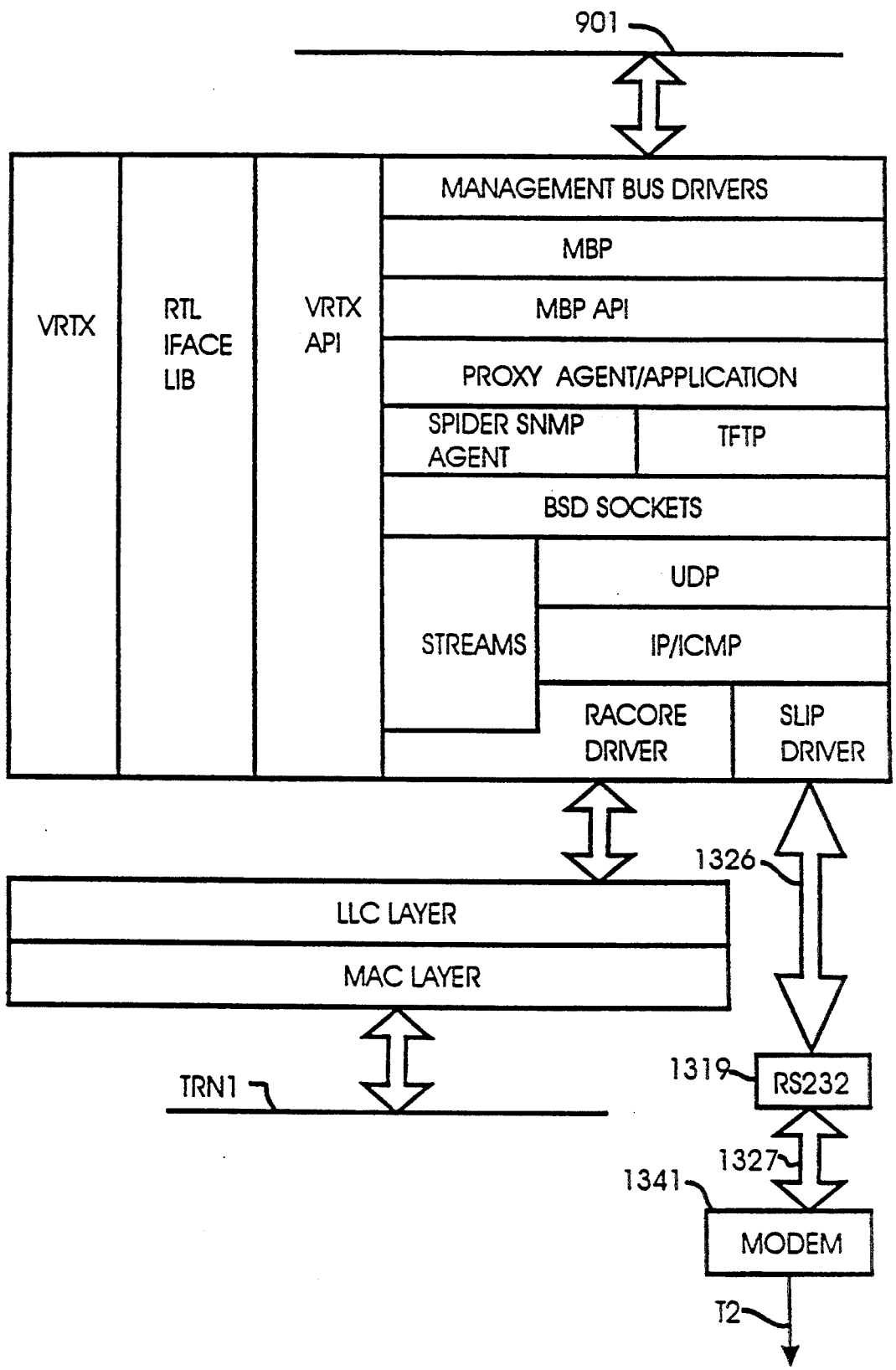
FIG. 28 is a schematic block diagram of a preferred form of management software architecture suitable for use in connection with the present invention.

The NMC 911 software architecture is illustrated in FIG. 28. NMC 911 must function in real time, and uses a real-time operating system known as VRTX that is available from Ready Systems.

The RTL Interface Library is available from Ready Systems and consists of typical C language library functions that are designed to be reentrant for use with the VRTX operating system.

A VRTX application interface (API) defines a clean separation between application code written for NMC 911 and the VRTX operating system itself.

The management bus drivers are low level drivers written specifically for management bus 901.

Management Bus Protocol (MBP) is the mechanism through which NMC 911 communicates with all NACs in server NAS1. NMC 911 accomplishes most of its functions through MBP. MBP is essentially the same as the Control Bus protocol used in Total Control, a modem management system for dial-up data centers available from U.S. Robotics, Inc. Skokie, Ill.

MBP API defines a separation between MBP and the proxy agent software by which requests are serviced.

The proxy agent listens for SNMP request messages, services the messages and sends response messages back to the requesting management station. Many of the application software routines are invoked through SNMP requests. This layer is built on the Spider SNMP agent. The Spider agent does not support any of the proxy functions that NMC 911 requires. These requirements are handled by the proxy agent code.

Simple Network Management Protocol (SNMP) is a standard management protocol that is executed by a host computer (e.g., computer C23) connected to network TRN1 and by an agent station, such as NMC 911.

Trivial File Transfer Protocol (TFTP) is used to download files. A file can be downloaded when appropriate portions of TFTP are executed by a client (such as computer C23) and an agent (such as NMC 911).

BSD Sockets are a standard software interface at the UDP layer. UDP is part of the transport layer for the Internet suite of protocols. UDP is the User Datagram Protocol, which provides connectionless transport services. SNMP provides better interoperability with other equipment if SNMP runs over UDP.

The IP/ICMP layer of protocol code is available from Spider Systems. IP stands for Internet Protocol, a connectionless-mode network protocol. Its main purpose is to provide simple datagram transmission and reception. The IP address is used to route IP datagrams to the appropriate place. ICMP stands for Internet Control Message Protocol. The ICMP provides some basic control messages used for error reporting to provide feedback about how well the IP is running.

The Racore driver is stored partially in NMC 911 and partially in token ring NIC and is the software driver for the token ring.

Portions of the Serial Line IP (SLIP) driver is executed by management station (such as computer C23) and NMC 911 in order to do management over an RS-232 port.

The TRN1 local area network protocol interface layers (i.e., the LLC and MAC layers shown in FIG. 28) are very similar to the LAN protocol layers for gateway NAC 605 that were previously described.

The streams coding is available from Spider Systems and are used to tie all of the layers of the TRN1 protocol interface together.

Still referring to FIG. 28, network management card (NMC) 911 maintains constant communication with all application cards (NACs) within server NAS1. The proxy agent executed by NMC 911 consolidates data from all NACs. A management information base (MIB) that is supported by NMC 911 allows all device functions to be monitored and controlled from any standard SNMP management system. NMC 911 performs the following network management objectives:

(1) monitors the status of all NACs;
(2) monitors the status of the external networks (e.g., TRN1) connected to the NACs;
(3) configures all soft parameters supported by the NACs;
(4) issues commands to the NACs, such as reset or terminate connection;
(5) collects statistics from the NACs, such as the number of data errors, line quality, etc.;
(6) performs tests, such as self-tests, loopbacks and application specific tests, such as 105 responder testing; and
(7) downloads operating software to all NACs.

All network management of server NAS1 and associated network application cards (NACs) is administrated via NMC 911. Network management bus 901 is provided between NMC 911 and all NACs. NMC 911 supports the simple network management protocol (SNMP) over UDP/IP sessions to a host management station, such as computer C23, coupled to network TRN1 through token ring interface 1301, coupled to telephone line T2 through RS-232 port 1319 (FIG. 2), or coupled to network 1338 (FIG. 2A).

The NMC 911 proxy agent handles the management of all NACs. The responsibility of the proxy agent is to provide the conversion of SNMP on the TRN1 network or RS-232 interface side of NMC 911 to the NAS1 management bus protocol (MBP) used by the devices in server NAS1. By using the proxy agent, devices not connected to TRN1, such as modems and T1 NAC 175, are manageable from an SNMP based management host, such as computer C23. NACs and TCP/IP connections are not directly manageable by the SNMP host, but rather are manageable via the NMC 911 proxy agent in order to eliminate the complexity of having multiple management entry points.

A packet of SNMP network management signals is transmitted to the proxy agent via network TRN1. The packet of SNMP is converted to management bus protocol (MBP) signals by the proxy agent, and the MBP signals are transmitted to the proper devices in the proper NAC via management bus 901. The NACs each are responsive to the management instruction signals generated by the proxy agent in order to carry out the foregoing management objectives. Each NAC generates management response signals representing one or more conditions of the NAC. The management response signals are processed by the proxy agent and are converted to a packet of SNMP signals which is transmitted to host computer C23 via network TRN1.

NMC 911 itself provides various management services, such as the caching of real-time information of the devices in the NAS1 chassis. This information is then quickly accessible by the SNMP host application. One such example is the collection of statistics for the past 24 hours on the performance of span line T1. This information can be easily provided to the host management application while all of the complication of acquiring the data is hidden from the host management application.

Individual parameters of each NAC (i.e., T1 NAC 175, quad modem NACs 403-408 and gateway NAC 605) are configurable via configuration SNMP "set" commands. The SNMP set commands, although directed by the management host (e.g., computer C23) to an individual card, are actually implemented by the NMC 911 proxy agent as configure request signals in MBP.

NMC 911 provides a programmed settings table of configuration parameters of all NAC devices (e.g., modems) in server NAS1. Each row in the table represents a physical NAC. The columns in the table contain every possible configuration parameter known to that type of device (e.g., individual modems on each of cards 403-408). For example, the set mode parameters described previously in connection with gateway NAC 605 can be stored in the programmed settings table. The management host can set any parameter value for any device (row) in the table. For example, with respect to modem 447, one memory location in the table can store a first parameter signal for modulating and demodulating according to a first predetermined modulation standard and a second memory location in the table can store a second parameter signal for modulating and demodulating according to a second predetermined modulation standard different from the first standard. High-level SNMP set commands are provided to restore factory defaults to any row in the table or to apply any row in the table to its associated device. By using such set commands, devices in server NAS1 can be configured by only changing the table parameters that differ from the factory defaults and configuring the device with the resultant programmed settings.

The programmed settings table is maintained in non-volatile storage (e.g., FLASH SIMM 925 (FIG. 9A)) in NMC 911. Individual parameters sent to NAC devices (e.g., modems) also are stored in non-volatile memory in the device itself. For example, the previously described first and second modulation standard parameter signals are stored in separate memory locations in modem 447. Once configured, devices use their stored configuration upon power-up.

Management host computer C23 performs "actions" or "commands" via the SNMP set commands. These commands do not affect device configuration parameters, but result in some kind of action that usually changes the state of a device. Examples would be to command T1 card 175 to busy out a DS0 trunk (i.e., raise the M lead) or to command modem 447 to disconnect a call.

Network management host computer C23 receives a response that indicates the success or failure of any SNMP command sent to NMC 911. In the case of SNMP set operations for configuration or commands, one possible such error is that the device is not in a state that it can safely execute the configuration change or the command. For example, modem configuration changes will normally not be accepted when the modem is in an active call where the configuration change may jeopardize the call. In this example, the management host application can decide to delay the set command until it determines that the modem is in an allowable state, or repeat the command telling NMC 911 to "force" the set operation no matter what the possible consequences.

A requesting packet of SNMP get commands is issued to request the status of various items, such as parameter settings, status values, counters, etc. of any device. As a general rule, every parameter of any type can be read or queried, including any parameter that can be set such as the programmed settings table. In response to the requesting packet, the proxy agent reads the memory locations holding the requested parameter signals, and generates a SMNP packet of status reporting signals that are transmitted to computer C23 via TRN1.

In addition to SNMP standard traps, NMC 911 has the capability of reporting many other non-standard device and system SNMP traps in response to occurrence of various events. NMC 911 is capable of generating management response signals for reporting the following non-standard events as SNMP traps:
moduleInserted
moduleRemoved
psuWarning
psuFailure
tempWarning
fanFailure
entityWatchdogTimeout
entityMgtBusFailure NMC 911 is capable of generating management response signals for reporting the following standard SNMP events:
coldStart
linkDown
linkUp
authenticationFailure Each of quad modem cards 403-408 is capable of generating management response signals for reporting the following non-standard events:
incoming ConnectionEstablished
outgoingConnectionEstablished
incoming ConnectionTerminated
outgoingConnectionTerminated
connectAttemptFailure
connectTimerExpired
dte TransmitDataIdle
dtrTrue
dtrFalse
blerCountAtThreshold
fallbackCountatThreshold
noDialtone
noLoopCurrent
modemResetByDte T1NAC 175 is capable of generating management response signals for reporting the following non-standard events:
yellowAlarm
redAlarm
LossOfSignal
alarmIndicationSignal transmitTimingSourceSwitch For the preceding events, dte means data terminal equipment, dtr means data terminal ready and bler means block error.

These reports of events can be redirected over a TCP connection to a network storage device where they can be used in database applications for troubleshooting, traffic analysis, log reports, etc. Essentially, the purpose of the SNMP traps is to provide a means to store a signal representing network management events in an efficient manner for subsequent inspection.

The management host filters SNMP traps by configuring a table of possible system and device traps with the desired response to either enabled or disabled. Any event that is to be logged will be time stamped, assigned a sequence number and sent to the network application.

Test execution can be triggered by management host computer C23 issuing a testing packet SNMP set command for the appropriate test. The testing packet is converted by the proxy agent to testing management instruction signals in MBP. The instruction signals are transmitted to the proper NAC over management bus 901. After the NAC performs the test, the results are stored as a parameter in a memory location. The test results can be obtained by having the proxy agent query the parameter in the memory location. The parameter is used by the proxy agent to generate a packet of SNMP signals that are sent to computer C23 via TRN1 in order to report the test results.

105 responder testing is initiated by the management host via an SNMP set command. The SNMP set command informs NMC 911 which DSO(s) to test, which tests to perform, the duration of the tests, and the phone number of the remote responder. NMC 911 commands T1 NAC 175 and modem cards 403–408 to set up the appropriate calls, commands the modems to execute the specified tests, collects the test results and tears down the call(s) when the tests are complete. The management host queries test progress and queries the test results when the tests are completed.

Software download is a cooperative file transfer application that resides in NMC 911 and the management host. It is triggered by issuing a download packet SNMP set command that describes the physical device and device type that is to be downloaded. The file transfer application passes portions of the executable file to NMC 911. In response to the download packet, the proxy agent generates a download management instruction signal in MBP which forwards the file to the appropriate NAC(s). The software in all NACs is programmed into flash memory until all portions of the executable file are successfully transferred. Software download can be performed to multiple devices of the same type at the same time.

Computer C23 is programmed to execute SNMP which utilizes a simple request/response protocol:
(1) GetRequest→GetResponse;
(2) GetNextRequest→GetResponse; and
(3) SetRequest→GetResponse.

SNMP includes a few traps:
(1) boot;
(2) link state change;
(3) authentication failure; and
(4) vendor-specific extensions.

SNMP has variable management. Managed objects are accessed via a virtual information store named the management information base or MIB. Objects in the MIB are defined and named using abstract syntax notation one (ASN.1). The virtual information store is organized conceptually as a tree. The object instances (variables) are at leaves of the tree. The path from the root through the tree to the object identifies the object.

Management communication between computer C23 and NMC 911 is divided between three cooperating software modules:
(1) A management station portion of SNMP residing in computer C23;
(2) a Spider SNMP agent residing in NMC 911 (FIG. 29); and
(3) a proxy agent residing in NMC 911 (FIG. 29).

The management station portion of SNMP performs the following functions:
(1) issues a GetRequest packet and waits for and processes a response packet;
(2) issues a GetNextRequest packet and waits for and processes a response packet;
(3) issues a SetRequest packet and waits for and processes a response packet; and
(4) listens for a trap message packet and alters behavior as appropriate.

The Spider SNMP agent performs the following functions:
(1) receives GetRequest/fetch information/return GetResponse packets;
(2) receives GetNextRequest/fetch information/return GetResponse packets;
(3) receives SetRequest/set information/return GetResponse packets; and
(4) receives detect event/send trap message packets.

The proxy agent performs the following functions:
(1) receives a GetRequest information packet from the Spider agent, translates the SNMP information packet into MBP, sends the request to remote devices, such as modems on cards 403–408, T1 NAC 175 and gateway NAC 605, receives responses from the remote devices, translates device information from MBP into an SNMP packet, and returns the SNMP information packet to the Spider agent;
(2) receives a GetNextRequest information packet from the Spider agent, translates the SNMP information packet into MBP, sends requests to remote devices, receives responses from the remote devices, translates the devices information from MBP into SNMP packets, and returns the SNMP information packet to the agent;
(3) receives a SetRequest information packet from the agent, translates the SNMP information packet into MBP, sends requests to remote devices, receives responses from the remote devices, translates the devices information from MBP into an SNMP packet and returns the SNMP information packet to the agent; and
(4) detects an event/and/or receives an MBP message from a remote device indicating a problem or event occurrence, creates an SNMP trap packet, and sends an SNMP packet to the Spider agent.

The proxy agent translates a single SNMP packet into a plurality of requests for remote devices from SNMP into a plurality of management bus protocol (MBP) transactions by using MBP maps and records. The MIB data is defined to allow proxy agent MIB object instances to be mapped into MPB records.

The proxy agent creates and sends the MBP records to a device manager task that translates the MBP record(s) into actual MBP (indicators and data, etc.), sends the MBP to remote devices in server NAS1, and waits for a response. When a response is received, the device manager task sends the proxy agent an MBP record with response information and then the proxy agent translates the MBP response back into SNMP format (i.e., into a packet) that is returned to the Spider agent.

The Spider SNMP agent running in NMC 911 performs the following functions:

(1) receives SNMP packets;
(2) handles all manipulation of Internet MIB (MIB-1) variables (all MIB-1 information is in local NMC 911 storage);
(3) if the requested MIB object instance is not in MIB-1, calls the proxy agent and sends it SNMP data to have the proxy agent MIB tables checked;
(4) receives SNMP data back from the proxy agent; and
(5) sends SNMP response packets to computer C23 via network TRN1.

The ASN.1 object identifier for MIB-1 is: ISO(1-).ORG(3).DOD(6)INTERNET(1).MGMT(2).MIB-1(1) OR (1.3.6.1.2.1). MB-1 consists of objects of type:
system (1.3.6.1.2.1.1.x)
(2) interfaces (1.3.6.1.2.1.2.x)
(3) address translation (1.3.6.1.2.1.3.x)
(4) internet protocol (IP) (1.3.6.1.2.1.4.x)
(5) internet control message protocol (ICMP) (1.3.6.1.2.1.5.x)
(6) transmission control protocol (TCP) (1.3.6.1.2.1.6.x)
(7) user datagram protocol (UDP) (1.3.6.1.2.1.7.x)

The proxy agent in NMC 911 handles all manipulation of server NAS1 specific MIBs. A very small amount of information is obtained via an MBP transaction that is sent to remote devices in NAS1. For requests directed to NAS1 devices, the proxy agent: (a) receives an SNMP information packet from the Spider agent, (b) translates an SNMP packet into a corresponding MBP transaction via a MBP record, (c) sends the MBP record(s) to a device manager task, (d) waits for an MBP response record from the device manager task, (e) translates the MBP transaction response record back into an SNMP packet, and (f) returns the SNMP information packet back to the Spider agent.

The ASN.1 object identifier for NAS1 MIBs is: ISO(2).ORG(3).DOD(6).INTERNET(1).-PRIVATE(4).ENTERPRISE(1).USR(429).NAS(1) or (1.3.6.1.4.1.429.1).

NAS1 MIBs consist of:
Mib1 (1.3.6.1.2.1.x)
(2) DS 1 Mib (1.3.6.1.3.2.x)
(3) USR Chassis Mib (1.3.6.1.4.429.1.1.x)
(4) NMC Mib (1.3.6.1.4.429.1.2.x)
(5) T1 Mib (1.3.6.1.4.429.1.3.x)
(6) USR DS1 Mib (1.3.6.1.4.429.1.4.x)
(7) DS0 Mib (1.3.6.1.4.429.1.5.x)
(8) Modem Mib (1.3.6.1.4.429.1.6.x)

For both SNMP GETs and SETs, the SNMP NAS1 MIB object instance is parsed by the proxy agent, and the associated data structures for this object instance are returned. A function call usr_var_mbp0 is then made to do the actual SNMP GETs/SETs via MBP transactions to remote devices in NAS1.

The usr_var_mbp0 function does the following:
SNMP GET requests are done as follows:
(1) Does a MBP record exist for the MBP map number associated with this object instance? (Map number is obtained from the usr_elem_entry structure.)
(a) If yes, go to step 2.
(b) If no:
(i) allocate space for a new MBP record based on the MBP map number associated with this object instance;
(ii) set the map number in the MBP record header;
(iii) set all the handshake bits in the MBP record header (this will retrieve all values in this MBP record in case they are needed later. Setting all the handshake bits requires only one message per MBP record);
(iv) send the MBP query request to a remote device via a device manager task;
(v) receive the MBP query response from device manager task; and
(vi) if no errors, save the MBP records in the proxy agent GET cache based on MBP map number.
(2) Retrieve the value for the required object instance from the MBP record based on MBP indicator associated with the object instance.
(3) Build data retrieved into an SNMP output packet.
(4) Send the SNMP output packet back to Spider agent.

SNMP SET requests are done in two passes:
(1) Is doSet=0?
(a) If no, go to step 2.
(b) If yes, SET the first pass:
(i) retrieve the value to set an object instance to from an SNMP packet;
(ii) if value to set the object instance to is out of range for object instance, return SNMP_ERR_BADVALUE here without doing an MBP transaction;
(iii) does a MBP record already exist for the MBP map number associated with this object instance?
1) If yes, go to step (iv).
2) If no:
a) allocate space for a new MBP record based on the MBP map number associated with this object instance;
b) set the map number in the MBP record header; and
c) clear all the handshake bits in the MBP record header.
(iv) set one handshake bit based on MBP indicator associated with the MIB object instance;
(v) save the MBP record in the proxy agent SET cache based on MBP map number for this object instance;
(vi) return to Spider SNMP agent;
(vii) MBP transaction will be done on second pass.
(2) SET doSET=1, do the second pass.
(3) Does an MBP record already exist for the MBP map number associated with this object instance?
(a) If no, return an error, because an MBP record should have been done in the first pass;
(b) If yes, got to step 4.
(4) Send the MBP configure request to the remote device via a device manager task. Only values with handshake bits set will be configured on the remote device. One MBP configure is done for each map number that was stored in the first pass. Object instances may be clustered on a few maps, or spread over several maps. This depends on what was requested.
(5) Receive the MBP configure response.
(6) If no errors are reported, the MBP configure was successful, so the SNMP SET was successful.

(7) Build SET success data into an SNMP output packet.

(8) Send the SNMP output packet back to the Spider agent.

Referring to FIGS. 2, 9G and 29, the management function of NMC 911 also can be performed through busses 1326 and 1327, RS-232 port 1319, modem 1341 and telephone line T2. Line T2 is connected to a host computer that replaces computer C23. A slip driver (FIG. 29) communicates with the Spider agent instead of a Racore driver. By using this alternative arrangement, server NAS1 can be managed from a remote location linked by a conventional telephone line T2.

As another alternative, LLC and MAC layers (FIG. 29) can be disconnected from network TRN1 and coupled to a second token ring network 1338 (FIG. 2A) separate from network TRN1. By using this arrangement, server NAS1 can be managed from network 1338 which is separate from TRN1 that communicates with modem NACs 403–408 via packet bus 501.

Those skilled in the art will recognize that the preferred embodiment described in the specification may be altered and modified without departing from the true spirit and scope of the invention as defined in the following claims.

We claim:

1. In a system comprising a telephone line carrying a first telephone signal resulting from modulation by a first modem of a first digital computer signal representing digital first data from a digital first computer, said telephone line also carrying a second telephone signal resulting from modulation by a second modem of a second digital computer signal representing digital second data from a digital second computer, said system also comprising a network for transmitting a digital first network signal representing digital third data from a digital third computer, for transmitting a digital second network signal representing digital fourth data from a digital fourth computer, and for transmitting digital network management signals adapted for use by a management station executing a predetermined management application using a predetermined first management protocol, improved apparatus for managing transmission of said digital data between said telephone line and said network comprising in combination:

first modem means responsive to said first network signal and said first telephone signal for enabling communication between said first computer and said third computer, responsive to management instruction signals for executing predetermined management objectives and for generating management response signals representing one or more conditions of said first modem means;

second modem means responsive to said second network signal and said second telephone signal for enabling communication between said second and fourth computers, responsive to management instruction signals for executing predetermined management objectives and for generating management response signals representing one or more conditions of said second modem means;

telephone control means for transmitting said first, second, third and fourth digital telephone signals between said telephone line and said first and second modem means, responsive to management instruction signals for executing predetermined management objectives and for generating management response signals representing one or more conditions of said telephone control means;

network control means for transmitting said first, second, third and fourth network signals between said first and second modem means and said network, responsive to management instruction signals for executing predetermined management objectives and for generating management response signals representing one or more conditions of said network control means; and management means responsive to said network management signals for generating said management instruction signals, for independently addressing said management instruction signals to one or more of said first modem means, second modem means, telephone control means and network control means, for converting said management response signals to said network management signals, and for transmitting said network management signals to said management station, whereby said management station can manage said first and second modem means, said telephone control means and said network control means in real time while said first and second modem means enable bilateral communication among said first, second, third and fourth computers.

2. Apparatus, as claimed in claim 1, wherein said management means comprises:

processor means for generating said management instruction signals according to a second management protocol different from said first management protocol; and management bus means for transmitting said management instruction signals and said management response signals among said processor means, first and second modem means, telephone control means and network control means.

3. Apparatus, as claimed in claim 1, wherein said management means comprises means for detecting the presence of said first modem means, second modem means, telephone control means and network control means without interrupting said data communication among said computers.

4. Apparatus, as claimed in claim 1, wherein said management means comprises means for resetting said first modem means, second modem means, telephone control means and network control means without transmitting management instruction signals to said first modem means, second modem means, telephone control means and network control means.

5. Apparatus, as claimed in claim 2, wherein said management bus means comprises means for transmitting said management instruction signals and management response signals a periodically at irregular intervals of time.

6. Apparatus, as claimed in claim 5, wherein said management bus means comprises an asynchronous bus.

7. Apparatus, as claimed in claim 1, wherein said management objectives include configuring, status reporting and event monitoring and wherein said first and second modem means each comprise means for operating in response to parameter signals stored in memory locations.

8. Apparatus, as claimed in claim 7, wherein said management means comprises means for generating configuring management instruction signals for storing said parameter signals, whereby said first modem means and said second modem means can be individually configured with predetermined parameter signals in response to said configuring management instruction signals.

9. Apparatus, as claimed in claim 1, wherein said management objectives include configuring, status reporting and event monitoring and wherein said first and second modem means, said telephone control means and said network control means each comprises means for operating in response to parameter signals stored in memory locations.

10. Apparatus, as claimed in claim 9, wherein said network management signals comprise a configuring packet of signals for configuring said parameter signals, and wherein said management means comprises means responsive to said configuring packet for generating configuring management instruction signals for storing said parameter signals, whereby at least two of said first modem means, second modem means, telephone control means and network control means can be individually configured with predetermined parameter signals in response to said configuring packet.

11. Apparatus, as claimed in claim 10, wherein said first and second modem means each comprise means for storing parameter signals including a first parameter signal and a second parameter signal, means responsive to said first parameter signal for modulating and demodulating according to a first predetermined modulation standard and responsive to said second parameter signal for modulating and demodulating according to a second predetermined modulation standard, and wherein said management means comprises means responsive to said configuring packet for generating a first one of said configuring management instruction signals for storing said first parameter signal in a first memory location so that said first modem means operates according to said first predetermined modulation standard and responsive to said configuring packet for generating a second one of said configuring management instruction signals for storing said second parameter signal in a second memory location so that said second modem means operates according to said second predetermined modulation standard.

12. Apparatus, as claimed in claim 9, wherein said network management signals include a status requesting packet of signals requesting the status of two or more of said parameter signals stored in two or more of said memory locations and wherein said management means comprises means responsive to said status requesting packet for reading said two or more parameter signals stored in said two or more memory locations, for generating one of said network management signals comprising a status reporting packet of status reporting signals for reporting the status of said two or more parameter signals and for transmitting said status reporting packet over said network means, whereby the status of said two or more parameter signals is reported to said management station.

13. Apparatus, as claimed in claim 9, wherein said first and second modem means, said telephone control means and said network control means each comprise means for generating one of said management response signals representing the occurrence of a predetermined event and wherein said management means comprises means responsive to said one management response signal for generating one of said network management signals and for transmitting said one network management signal over said network means, whereby said event is monitored and reported to said management station.

14. Apparatus, as claimed in claim 1, wherein said management objectives include testing and wherein said first and second modem means, said telephone control means and said network control means each comprises means for testing, wherein said network management signals include a testing packet of signals identifying a test, and wherein said management means comprises means responsive to said testing packet for generating a testing management instruction signal and for transmitting said testing management instruction signal to two or more of said first and second modem means, said telephone control means and said network control means, whereby two or more of said first modem means, second modem means, telephone control means and network control means can be independently tested in response to said testing packet.

15. Apparatus, as claimed in claim 1, wherein said management objectives include software download and wherein said first and second modem means, said telephone control means and said network control means each comprises means for storing software, wherein said network management signals include a download packet of signals defining software to be downloaded and wherein said management means comprises means responsive to said download packet for generating a download management instruction signal and for transmitting said download management instruction signal to two or more of said first and second modem means, said telephone control means and said network control means, whereby two or more of said first modem means, second modem means, telephone control means and network control means can be independently downloaded with software in response to said download packet.

16. Apparatus, as claimed in claim 1, wherein said telephone control means comprises circuit switched time division multiplex telephone bus means for transmitting said signals between said telephone control means and said first and second modem means.

17. Apparatus, as claimed in claim 16, wherein said network control means comprises packet bus means for transmitting said signals between said first and second modem means and said network control means in the form of packets of blocks of digital time-spaced signals.

18. Apparatus, as claimed in claim 1, wherein said network comprises a first network coupling said third and fourth computers to said network control means and a second network coupling said management station to said management means.

19. A method suitable for use with a system comprising a digital telephone line carrying a digital first telephone signal resulting from modulation by a first modem of a first digital computer signal representing digital first data from a digital first computer, said telephone line also carrying a digital second telephone signal resulting from modulation by a second modem of a second digital computer signal representing digital second data from a digital second computer, said system further comprising network means for transmitting a digital first network signal representing digital third data from a digital third computer, for transmitting a digital second network signal representing digital fourth data from a digital fourth computer, and for transmitting digital network management signals adapted for use by a management station executing a predetermined management application using a predetermined first management protocol, said system further comprising first modem means for enabling data communication between said first and third computers and second modem means for enabling data communication between said second and fourth computers, said method managing transmission of said digital data between said digital telephone line and said network means and comprising in combination the steps of:

modulating signals representing said third data and demodulating signals representing said first data in said first modem means so that said first data and said third data are communicated between said first and third computers;

executing predetermined management objectives directed to said first modem means in response to management instruction signals;

generating first management response signals representing one or more conditions of said first modem means;

generating first digital network management signals in response to said first management response signals;

transmitting said first digital network management signals over said network means;

modulating signals representing said fourth data and demodulating signals representing said second data in said second modem means so that said second data and said fourth data are communicated between said second and fourth computers;

executing predetermined management objectives directed to said second modem means in response to management instruction signals;

generating second management response signals representing one or more conditions of said second modem means;

generating second digital network management signals in response to said second management response signals;

transmitting said second digital network management signals over said network means;

generating said management instruction signals according to a second management protocol different from said first management protocol in response to said network management signals;

transmitting said management instruction signals to said first and second modem means while said steps of modulating and demodulating are being carried out;

processing said management response signals while said steps of modulating and demodulating are being carried out, whereby said first and second modem means are managed while data communication between said first and third computers and between said second and fourth computers is enabled.

20. A method, as claimed in claim 19, wherein said step of transmitting said management instruction signals comprises the step of transmitting said management instruction signals to said first and second modem means over said telephone line, said method further comprising the step of transmitting said management response signals over said telephone line.

21. A method, as claimed in claim 19, wherein said management objectives include configuring, status reporting and event monitoring and wherein said method further comprises the steps of:

storing a first parameter signal in said first modem;

storing a second parameter signal in said second modem;

operating said first modem means in response to said first parameter signal; and operating said second modem means in response to said second parameter signal.

22. A method, as claimed in claim 21, wherein said network management signals comprise a configuring packet of signals for configuring said parameter signals, and wherein said step of generating said management instruction signals comprises the step of generating configuring management instruction signals for storing said first and second parameter signals in response to said configuring packet, whereby said first modem means and second modem means can be individually configured with said first and second parameter signals in response to said configuring packet.

23. A method, as claimed in claim 22, wherein the step of modulating signals representing said third data and demodulating signals representing said first data in said first modem means comprises the steps of modulating and demodulating according to a first predetermined modulation standard in response to said first parameter signal, wherein the step of modulating signals representing said fourth data and demodulating signals representing said second data in said second modem means comprises the steps of modulating and demodulating according to a second predetermined modulation standard in response to said second parameter signal and wherein said step of generating configuring management instruction signals comprises the steps of:

generating a first one of said configuring management instruction signals for storing said first parameter signal in response to said configuring packet so that said first modem means operates according to said first predetermined modulation standard; and generating a second one of said configuring management instruction signals for storing said second parameter signal in response to said configuring packet so that said second modem means operates according to said second predetermined modulation standard.

24. A method, as claimed in claim 23, wherein said network management signals include a status requesting packet of signals requesting the status of said first and second parameter signals and wherein said step of generating said management instruction signals comprises the step generating status requesting management instruction signals for reading said first and second parameter signals in response to said status requesting packet, wherein said steps of generating said management response signals representing one or more conditions of said first and second modem means comprises the steps of generating a first management response signal representing the status of said first parameter signal and generating a second management response signal representing the status of said second parameter signal, said method further comprising the steps of:

generating one of said network management signals comprising a status reporting packet of status reporting signals for reporting the status of said first and second parameter signals in response to said first and second management response signals; and transmitting said status reporting packet over said network, whereby the status of said first and second parameter signals is reported.

25. A method, as claimed in claim 19, wherein the steps of generating management response signals representing one or more conditions of said first and second modem means each comprises the step of generating one of said management response signals representing the occurrence of a predetermined event in one of said first modem means and second modem means, wherein the step of generating digital network management signals comprises the step of generating one of said network management signals in response to said one management response signal, whereby said event is reported.

26. A method, as claimed in claim 19, wherein said management objectives include testing and wherein said first and second modem means each comprises means for testing, wherein said network management signals include a testing packet of signals identifying a test, wherein said step of generating said management instruction signals comprises the step of generating a testing management instruction signal in response to said testing packet, whereby said first modem means and said second modem means can be independently tested in response to said testing packet.

27. A method, as claimed in claim 19, wherein said management objectives includes software download, wherein said first and second modem means comprise means for storing software, wherein said network management signals include a download packet of signals defining software to be downloaded, and wherein said step of generating said management instruction signals comprises the step of generating a download management instruction signal in response to said download packet, whereby said first modem means and second modem means can be independently downloaded with software in response to said download packet.

* * * * *